United States Patent
McCormick et al.

(10) Patent No.: US 12,074,683 B1
(45) Date of Patent: Aug. 27, 2024

(54) CONFIGURABLE ORTHOGONAL FREQUENCY DIVISION MULTIPLEXING (OFDM) SIGNAL AND TRANSMITTER AND RECEIVER FOR SATELLITE TO USER TERMINAL DOWNLINK COMMUNICATIONS

(71) Applicant: Space Exploration Technologies Corp., Hawthorne, CA (US)

(72) Inventors: Martin S. McCormick, El Segundo, CA (US); Torbjorn Larsson, Escondido, CA (US); Alazar Tamrat, Torrance, CA (US); Jeffrey C. Strait, Reno, NV (US); Chen Chen, Irvine, CA (US); Philip J. Treigherman, Fountain Valley, CA (US); Stephan O. Roche, Rancho Palos Verdes, CA (US); Ronald Gottula, San Mateo, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 42 days.

(21) Appl. No.: 17/186,706

(22) Filed: Feb. 26, 2021

Related U.S. Application Data

(60) Provisional application No. 62/983,644, filed on Feb. 29, 2020, provisional application No. 62/983,651, (Continued)

(51) Int. Cl.
*H04B 7/185* (2006.01)
*H04L 5/00* (2006.01)
*H04W 72/0453* (2023.01)

(52) U.S. Cl.
CPC ....... *H04B 7/18513* (2013.01); *H04L 5/0048* (2013.01); *H04W 72/0453* (2013.01)

(58) Field of Classification Search
CPC ............. H04B 7/18513; H04B 7/212; H04B 7/18515; H04B 7/18541; H04B 7/2041; H04L 5/0048; H04W 72/0453
See application file for complete search history.

(56) References Cited

U.S. PATENT DOCUMENTS

| 4,169,286 A | 9/1979 | Uzunoglu et al. |
| 4,567,485 A | 1/1986 | Oshima et al. |

(Continued)

FOREIGN PATENT DOCUMENTS

| CN | 1957539 A | 5/2007 |
| CN | 101079863 A | 11/2007 |

(Continued)

OTHER PUBLICATIONS

Bin Cheng, et al., "A Predistortion Linearizer for Ka-band Power Amplifier in Integrated Fin-line Technique," Microwave Conference Proceedings (CJMW), 2011 Chinese-Japan Joint, 3 pages.
(Continued)

*Primary Examiner* — Mounir Moutaouakil
(74) *Attorney, Agent, or Firm* — Polsinelli PC

(57) ABSTRACT

A modem is configurable on a satellite, user terminal or gateway generates a radio frequency (RF) signal using an orthogonal frequency division multiplexing (OFDM) protocol including a radio frame including one or more bursts. A burst of the one or more bursts includes a first portion including burst detection data, a second portion including channel characteristic estimation data, a third portion including payload data, and fourth and fifth portions including pilot data. The first portion in a time domain is included in the burst prior to the second, third, fourth, and fifth portions. The first portion can include a pseudo-random noise sequence inserted in the time domain. The same physical modem can be configured to transmit signals on an uplink or (Continued)

downlink between a user terminal and a satellite or on the uplink or downlink between the satellite and the gateway.

24 Claims, 48 Drawing Sheets

Related U.S. Application Data filed on Feb. 29, 2020, provisional application No. 62/983,641, filed on Feb. 29, 2020, provisional application No. 62/983,649, filed on Feb. 29, 2020.

(56) References Cited

U.S. PATENT DOCUMENTS

| | | | |
|---|---|---|---|
| 6,072,841 A | 6/2000 | Rahnema | |
| 6,128,487 A * | 10/2000 | Wiedeman | H04B 7/18567 455/445 |
| 6,154,499 A | 11/2000 | Bhaskar et al. | |
| 6,157,812 A * | 12/2000 | Sarraf | H04B 7/18515 370/316 |
| 6,212,566 B1 | 4/2001 | Vanhoof et al. | |
| 6,363,131 B1 | 3/2002 | Beidas et al. | |
| 6,373,858 B1 | 4/2002 | Soleimani et al. | |
| 6,377,561 B1 * | 4/2002 | Black | H04B 7/18584 370/330 |
| 6,522,643 B1 * | 2/2003 | Jacomb-Hood | H04B 7/18539 370/332 |
| 6,556,828 B1 | 4/2003 | Carlin et al. | |
| 6,570,935 B1 | 5/2003 | Sugita | |
| 6,625,129 B1 * | 9/2003 | Olds | H04B 7/2041 370/320 |
| 6,678,337 B1 | 1/2004 | Sugita | |
| 6,693,983 B1 | 2/2004 | Moher et al. | |
| 6,957,078 B1 * | 10/2005 | Yousefi | H04B 7/18515 455/12.1 |
| 7,030,824 B1 | 4/2006 | Taft et al. | |
| 8,111,646 B1 * | 2/2012 | Chang | H04J 14/00 375/232 |
| 8,248,975 B2 | 8/2012 | Fujita et al. | |
| 8,275,069 B2 | 9/2012 | Murakami et al. | |
| 8,363,740 B2 | 1/2013 | Stadelmeier et al. | |
| 8,446,979 B1 | 5/2013 | Yee | |
| 8,665,696 B2 | 3/2014 | Van Nee | |
| 9,264,216 B1 | 2/2016 | Vu et al. | |
| 9,510,310 B1 | 11/2016 | Ibison | |
| 9,641,206 B2 | 5/2017 | Pratt et al. | |
| 10,333,764 B1 | 6/2019 | Arditti Ilitzky | |
| 10,581,469 B1 | 3/2020 | O'Shea et al. | |
| 2002/0126764 A1 | 9/2002 | Murakami et al. | |
| 2002/0151273 A1 | 10/2002 | Marko | |
| 2002/0159403 A1 * | 10/2002 | Reddy | H04W 8/04 370/316 |
| 2003/0081696 A1 | 5/2003 | Kim et al. | |
| 2003/0179831 A1 | 9/2003 | Gupta et al. | |
| 2003/0189916 A1 * | 10/2003 | Cornett, Jr. | H04W 72/0406 370/345 |
| 2003/0193970 A1 | 10/2003 | Kim et al. | |
| 2003/0227978 A1 | 12/2003 | Magee et al. | |
| 2004/0006771 A1 | 1/2004 | Dale et al. | |
| 2004/0047284 A1 | 3/2004 | Eidson | |
| 2004/0066802 A1 | 4/2004 | Ro et al. | |
| 2004/0105396 A1 | 6/2004 | Eudes et al. | |
| 2004/0165650 A1 | 8/2004 | Miyazaki et al. | |
| 2004/0174812 A1 | 9/2004 | Murakami et al. | |
| 2004/0184399 A1 | 9/2004 | Chiou | |
| 2004/0209584 A1 * | 10/2004 | Bargroff | H04N 7/20 455/180.1 |
| 2004/0213365 A1 | 10/2004 | Murakami et al. | |
| 2004/0246891 A1 | 12/2004 | Kay et al. | |
| 2004/0252229 A1 | 12/2004 | Jiang et al. | |
| 2005/0058229 A1 | 3/2005 | Alagha | |
| 2005/0118966 A1 | 6/2005 | Anvari | |
| 2005/0152326 A1 | 7/2005 | Vijayan et al. | |
| 2005/0201268 A1 | 9/2005 | Aoki et al. | |
| 2005/0249180 A1 | 11/2005 | Murakami et al. | |
| 2005/0286405 A1 | 12/2005 | Sun et al. | |
| 2006/0007885 A1 | 1/2006 | Pollack et al. | |
| 2006/0063524 A1 | 3/2006 | Hwang | |
| 2007/0030918 A1 | 2/2007 | Kobayaski et al. | |
| 2007/0098103 A1 | 5/2007 | Murakami et al. | |
| 2007/0133716 A1 | 6/2007 | Kim | |
| 2007/0133727 A1 | 6/2007 | Kim et al. | |
| 2008/0008257 A1 | 1/2008 | Yonesi et al. | |
| 2008/0095135 A1 | 4/2008 | Cleveland | |
| 2008/0225936 A1 | 9/2008 | Hong et al. | |
| 2009/0022085 A1 | 1/2009 | Dankberg et al. | |
| 2009/0046818 A1 | 2/2009 | Murakami et al. | |
| 2009/0052561 A1 | 2/2009 | Baxley et al. | |
| 2009/0190491 A1 | 7/2009 | Miller | |
| 2009/0196421 A1 | 8/2009 | Okuda | |
| 2009/0285137 A1 | 11/2009 | Fujita et al. | |
| 2009/0296680 A1 | 12/2009 | Suzuki et al. | |
| 2010/0039985 A1 | 2/2010 | Kim et al. | |
| 2010/0054116 A1 | 3/2010 | Ishill et al. | |
| 2010/0128661 A1 | 5/2010 | Becker et al. | |
| 2010/0195563 A1 | 8/2010 | Jong | |
| 2010/0232350 A1 * | 9/2010 | Leong | H04B 7/1858 370/317 |
| 2011/0044255 A1 | 2/2011 | Ikeda | |
| 2011/0074504 A1 | 3/2011 | Jang | |
| 2011/0150143 A1 | 6/2011 | Han et al. | |
| 2011/0164526 A1 | 7/2011 | Zhu et al. | |
| 2011/0211617 A1 | 9/2011 | Li et al. | |
| 2011/0268206 A1 | 11/2011 | Ge et al. | |
| 2012/0045028 A1 | 2/2012 | Schmitt et al. | |
| 2012/0057872 A1 | 3/2012 | Freda et al. | |
| 2012/0087263 A1 | 4/2012 | Li et al. | |
| 2012/0147939 A1 | 6/2012 | Han et al. | |
| 2012/0224651 A1 | 9/2012 | Murakami et al. | |
| 2013/0033317 A1 | 2/2013 | Hawkes | |
| 2013/0077490 A1 | 3/2013 | Sela et al. | |
| 2013/0114752 A1 | 5/2013 | Murakami et al. | |
| 2013/0121441 A1 | 5/2013 | Murakami et al. | |
| 2013/0129017 A1 | 5/2013 | Sahin et al. | |
| 2013/0166259 A1 | 6/2013 | Weber et al. | |
| 2013/0223544 A1 | 8/2013 | Becker | |
| 2013/0331026 A1 * | 12/2013 | O'Neill | H04W 88/16 455/12.1 |
| 2014/0140194 A1 | 5/2014 | Fechtel | |
| 2014/0146859 A1 | 5/2014 | Ram et al. | |
| 2014/0146918 A1 | 5/2014 | Ryan et al. | |
| 2014/0219293 A1 | 8/2014 | Williams et al. | |
| 2014/0226682 A1 | 8/2014 | Becker et al. | |
| 2014/0294057 A1 | 10/2014 | Joung et al. | |
| 2014/0348140 A1 * | 11/2014 | Atkinson | H04L 12/417 370/336 |
| 2015/0049843 A1 | 2/2015 | Reuven et al. | |
| 2015/0071374 A1 | 3/2015 | Oh et al. | |
| 2015/0162881 A1 | 6/2015 | Hammi | |
| 2015/0195670 A1 | 7/2015 | Agee | |
| 2015/0200765 A1 | 7/2015 | Bonaccio et al. | |
| 2015/0214987 A1 | 7/2015 | Yu et al. | |
| 2015/0270890 A1 | 9/2015 | Vasavada et al. | |
| 2015/0333944 A1 | 11/2015 | Bae et al. | |
| 2016/0087736 A1 | 3/2016 | Murakami et al. | |
| 2016/0094895 A1 | 3/2016 | Stadelmeier et al. | |
| 2016/0191148 A1 | 6/2016 | Harrington et al. | |
| 2016/0278033 A1 | 9/2016 | Wu et al. | |
| 2016/0286012 A1 | 9/2016 | Yu et al. | |
| 2016/0308594 A1 | 10/2016 | Sanderovich | |
| 2017/0048092 A1 | 2/2017 | Murakami et al. | |
| 2017/0149493 A1 | 5/2017 | Arapoglou et al. | |
| 2017/0150528 A1 | 5/2017 | Becker et al. | |
| 2017/0201315 A1 | 7/2017 | Avellan et al. | |
| 2017/0245231 A1 | 8/2017 | Huang et al. | |
| 2017/0257201 A1 | 9/2017 | Eitan et al. | |
| 2017/0294957 A1 | 10/2017 | Ravishankar et al. | |
| 2018/0053997 A1 | 2/2018 | Noto et al. | |
| 2018/0115390 A1 | 4/2018 | Beidas et al. | |
| 2018/0159483 A1 | 6/2018 | Masood et al. | |
| 2018/0167133 A1 | 6/2018 | Choquette | |
| 2018/0210089 A1 | 7/2018 | Wang et al. | |

(56) References Cited

U.S. PATENT DOCUMENTS

| | | |
|---|---|---|
| 2018/0279241 A1 | 9/2018 | Lee et al. |
| 2018/0375707 A1 | 12/2018 | Bala et al. |
| 2019/0013892 A1 | 1/2019 | Chen et al. |
| 2019/0044588 A1 | 2/2019 | Hong et al. |
| 2019/0045675 A1 | 2/2019 | Li et al. |
| 2019/0053229 A1 | 2/2019 | Kim et al. |
| 2019/0081842 A1 | 3/2019 | Kim et al. |
| 2019/0097859 A1 | 3/2019 | Bala et al. |
| 2019/0109628 A1 | 4/2019 | Murakami et al. |
| 2019/0132044 A1 | 5/2019 | Hreha et al. |
| 2019/0132247 A1 | 5/2019 | Zhang et al. |
| 2019/0173640 A1 | 6/2019 | Luo et al. |
| 2019/0222179 A1 | 7/2019 | Doi |
| 2019/0245724 A1 | 8/2019 | Wang et al. |
| 2019/0296950 A1 | 9/2019 | Murakami et al. |
| 2019/0356515 A1 | 11/2019 | Murakami et al. |
| 2019/0363676 A1 | 11/2019 | Megretski et al. |
| 2020/0052948 A1 | 2/2020 | Sahin et al. |
| 2020/0157958 A1* | 5/2020 | Takemoto ............... F01D 9/047 |
| 2020/0252123 A1 | 8/2020 | Boutillon |
| 2020/0373886 A1 | 11/2020 | Hou et al. |
| 2020/0395662 A1 | 12/2020 | Tervo et al. |
| 2021/0175858 A1 | 6/2021 | Su et al. |
| 2021/0194573 A1 | 6/2021 | Jong et al. |
| 2021/0194614 A1 | 6/2021 | Ricker |
| 2021/0203386 A1 | 7/2021 | Gao et al. |

FOREIGN PATENT DOCUMENTS

| | | |
|---|---|---|
| CN | 104170260 A | 11/2014 |
| EP | 1487166 A2 | 12/2004 |
| EP | 1691519 A1 | 8/2006 |
| EP | 2736208 A2 | 5/2014 |
| JP | 2017092555 A | 5/2017 |
| JP | 2019140590 A | 8/2019 |
| WO | 3001710 A2 | 1/2003 |
| WO | 2005101840 A2 | 10/2005 |
| WO | 2008/121413 A1 | 10/2008 |
| WO | 2014124661 A1 | 8/2014 |

OTHER PUBLICATIONS

Choi et al.: Digital Predistortion Based on Combined Feedback in MIMO Transmitters. IEEE Communications Letters 16(10): 1572-1575 (2012).

Abdelaziz, M.: Digital Predistortion for Hybrid MIMO Transmitters. https://arxiv.org/pdf/1804.02178.pdf. 10 Total Pages (Apr. 2018).

Ba, S.N.: Efficient Digital Baseband Predistortion for Modern Wireless Handsets. PhD Thesis. 133 Total Pages (2009).

Jiang et al.: Digital Predistortion for Power Amplifiers Using Separable Functions. IEEE Transactions on Signal Processing 58(8): 4121-4130 (2010).

Liu et al.: Single-PA-Feedback Digital Predistortion for Beamforming MIMO Transmitter. In Microwave and Millimeter Wave Technology (ICMMT). 2016 IEEE International Conference. 3 Total Pages (2016).

Morgan et al.: A Generalized Memory Polynomial Model for Digital Predistortion of RF Power Amplifiers. IEEE Transactions on Signal Processing 54(10): 3852-3860 (2006).

Morgan et al.: Reducing Measurement Noise Effects in Digital Predistortion of RF Power Amplifiers. In Communications, 2003. ICC'03. IEEE International Conference vol. 4, pp. 2436-2439 (May 2003).

Spall, J. C.: Multivariate Stochastic Approximation Using a Simultaneous Perturbation Gradient Approximation. IEEE Transactions on Automatic Control 37(3): 332-341 (1992).

Tervo et al.: Digital Predistortion of Amplitude Varying Phased Array Utilising Over-the-Air Combining. IEEE. 1165-1168 (2017).

Akima, Hiroshi. Sharing of the Band 12.2-12.7 GHz Between the Broadcasting-satellite and Fixed Services. vol. 80, No. 32. Department of Commerce, National Telecommunications and Information Administration, 1980.

\* cited by examiner

| ERROR SOURCE | IMPACTED SUBSYSTEM | CFO | SFO |
|---|---|---|---|
| TRANSMITTER Ref. XO | BASEBAND DSP & DAC SAMPLE RATE | | X |
| TRANSMITTER Ref. XO | LOCAL OSCILLATOR UPCONVERSION FREQUENCY | X | |
| RELATIVE MOTION (DOPPLER) | RF PROPAGATION | X | X |
| RECEIVER Ref. XO | LOCAL OSCILLATOR DOWNCONVERSION FREQUENCY | X | |
| RECEIVER Ref. XO | BASEBAND ADC & DSP SAMPLE RATE | | X |

FIG. 13C

SUPPORTED BANDS

2200

| USE CASE | TRANSMIT CHANNEL BW |
|---|---|
| SAT-UT DL (Ku) | 250 MHz |
| SAT-UT UL (Ku) | 62.5 MHz |
| SAT-UT UL (Ku) | 2x62.5 MHz |
| SAT-SAG DL (Ka) | 250 MHz |
| SAT-SAG UL (Ka) | 500 MHz |

FIG. 22

CONFIGURABLE ORTHOGONAL FREQUENCY DIVISION MULTIPLEXING (OFDM) SIGNAL AND TRANSMITTER AND RECEIVER FOR SATELLITE TO USER TERMINAL DOWNLINK COMMUNICATIONS

PRIORITY CLAIM

The present application claims priority to U.S. Provisional Application No. 62/983,641, filed Feb. 29, 2020, the contents of which are incorporated herein by reference. The present application also claims priority to U.S. Provisional Application No. 62/983,649, filed Feb. 29, 2020; U.S. Provisional Application No. 62/983,651, filed Feb. 29, 2020; and U.S. Provisional Application No. 62/983,644, filed Feb. 29, 2020, the contents of which are each incorporated herein by reference.

FIELD OF THE INVENTION

The present disclosure relates to a new physical chip structure for a modem that enables the same physical chip to process configurable waveforms and other parameters for use with satellite, satellite access gateway and user terminal signal transmission and reception. The configurable waveform can adapt to the different characteristics and need for error correction for communication between the satellite, the satellite access gateway and one or more user terminals.

BACKGROUND

A wireless communication system permits communication to occur between components located at different locations without the need for wired connections. A satellite-based wireless communication system includes different nodes such as a satellite in a low-Earth orbit that communicates with a ground station such as a user terminal on a person's home; a terminal on a boat, car, truck, bus, airplane, or space launch vehicle; a satellite access gateway on the surface of the Earth; or the like. In this environment, the signals or waveforms that are used for communication between the different nodes ideally may differ. For example, a waveform that is useful for communication between a user terminal and the satellite may not be desired for communication between a satellite access gateway and the satellite. Accordingly, different modems are developed for each node depending on its requirements for transmission and reception of signals to or from other nodes. Another example can apply for signals that may differ for an uplink communication (a ground station to the satellite) versus a downlink communication (the satellite to a ground station). Typically, modems are used that can process different signals depending on the type of recipient node, the type of transmitting node, and/or direction of communication between the nodes. Developing a separate modem for each application adds complexity to the overall system design, signal formats, bandwidth requirements and/or communication protocols in general.

Furthermore, in the satellite wireless communication system, because satellites travel at high relative velocities and the distance between nodes can be much larger than cellular telephone ranges, Doppler effects and a variety of signal-to-noise ratio (SNR) issues can impact signal quality. Such issues can also vary depending on which two nodes are in communication and depending on the respective signal characteristics. Multiple user terminals can also simultaneously communicate with a satellite, which also adds to the complexity of the satellite wireless communication system. Typically, a specialized modem for each node is deployed to address the various issues raised above in the satellite wireless communication system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The following is a summary of four possible embodiments that are disclosed herein. A first embodiment covers a general modem 500 shown in FIG. 5 that can be configurable in any of the nodes shown in FIG. 1, including a satellite (SAT) 104, a satellite access gateway (SAG) 106 or a user terminal (UT) 102 and enable the transmission and reception of waveforms as needed for the respective application and furthermore to perform pre-transmission or post-reception waveform compensation for error correction of various types.

A second embodiment will address the modem 500 and methods of providing communication between a UT 102 and a SAT 104 on an uplink (UL). Multiple UTs 102 will combine their user data into a single radio frame over the air interface which is then received by the SAT 104. Thus, the UT—SAT UL has some specific characteristics that are covered in one embodiment.

A third embodiment focuses on the SAT—UT downlink (DL) and the characteristics and configurable parameters for that communication channel.

A fourth embodiment will focus on both the UL and the DL for the communication channel between the SAT 104 and the SAG 106. The radio frame structure of this communication channel is generally similar on the UL and the DL, although different bandwidths are used. Therefore, this embodiment covers the radio frame structure for both the UL and the DL between the SAT 104 and the SAG 106.

With respect to the first embodiment, a modem can include a first component configured to process a single waveform which can be used for transmission and reception of waveforms in a satellite, a gateway and a user terminal and a second component configured to configure the single waveform for one or more parameters related to: a bandwidth, a number of pilots, a number of channel estimation (CE) symbols, a choice of a unique word (UW), a cyclic prefix-and-postfix (CPP) length, a DC null, a burst length, an antenna delay adjustment and a carrier frequency. The modem can further include an orthogonal frequency division multiplexing baseband processing component and a digital front-end processing component for at least one of digital pre-distortion and a channel frequency response (CFR). In another aspect, the modem can include one or more of an integrated digital-to-analog converter/analog-to-digital converter for use with analog front-ends for both a receiver and a transmitter, a digital interface for performing analog array processing (AAP) for use with digital phased arrays, a digital Doppler correction component including at least one of a sampling frequency offset error correction and a carrier frequency offset error correction and a burst detection component that performs an estimation of a carrier frequency offset associated with a received waveform.

The burst detection component can use a repeated pseudo-noise sequence to perform the estimation of the carrier frequency offset. The burst detection component can enable multiple users to overlap by detecting individual user carrier frequency offsets. The burst detection component further can identify a phase rotation of a set of peaks associated with differential metrics in the received waveform to determine the estimation of the carrier frequency offset.

The modem can further include a fast-Fourier transformer (FFT) that utilizes the estimation of the carrier frequency offset to trigger a proper symbol FFT timing and a decoder that utilizes the estimation of the carrier frequency offset to apply frequency correction. The single waveform can include an orthogonal frequency division multiplexing (OFDM) signal including a radio frame having one or more bursts. A burst of the one or more bursts can include a first portion including burst detection data, a second portion including channel characteristic estimation data, a third portion including payload data, and fourth portion including first pilot data and a fifth portion including second pilot data. The first portion in a time domain can be included in the burst prior to the second, third, fourth, and fifth portions in the time domain. In one aspect, the first portion can include a pseudo-random noise sequence inserted in the time domain.

When the modem is deployed in the satellite and the satellite is communicating with the user terminal, the modem can be configured with a bandwidth between 220-270 MHz, inclusive. When the modem is deployed in the satellite and is communicating with the gateway, the modem can be configured with a bandwidth between 220-270 MHz, inclusive. When the modem is deployed in the gateway and is communicating with the satellite, the modem can be configured with a bandwidth between 480-520 MHz, inclusive. When the modem is deployed in the user terminal and is communicating with the satellite, the modem can be configured with a bandwidth between 60-65 MHz, inclusive.

In another aspect of the first embodiment covering the general modem, a system can include a gateway having a gateway modem chip with a multi-use physical configuration, a user terminal having a user terminal modem chip with the multi-use physical configuration and a satellite configured with a satellite modem chip have the multi-use physical configuration. The satellite modem chip can generate a first waveform for communicating with the user terminal and can generate a second waveform for communicating with the gateway. The gateway modem chip can generate a third waveform for communicating with the satellite and the user terminal modem chip can generate a fourth waveform for communicating with the satellite.

The multi-use physical configuration can enable the satellite modem chip, the gateway modem chip and the user terminal modem chip to each configure one or more of: a bandwidth, a number of pilots, a number of channel estimation (CE) symbols, a choice of a unique word (UW), a cyclic prefix-and-postfix (CPP) length, a DC null, a burst length, an antenna delay correction and a carrier frequency offset correction.

The multi-use physical configuration further can apply to a receiver. The receiver can include a burst detection component that uses a repeated pseudo-noise sequence to perform an estimation of a carrier frequency offset of a received waveform. The burst detection component can enable multiple users to overlap by detecting individual user carrier frequency offsets. The burst detection component further can identify a phase rotation of a set of peaks associated with differential metrics in the received waveform to determine the estimation of the carrier frequency offset.

In another aspect, the system can include a fast-Fourier transformer (FFT) that utilizes the estimation of the carrier frequency offset to trigger a proper symbol FFT timing and a decoder that utilizes the estimation of the carrier frequency offset to apply frequency correction.

The system can further include a pilot processing block that corrects for at least one of (1) a residual channel frequency offset (CFO), a sampling frequency offset (SFO), and a phase noise which may impact a transmitter local oscillator or a receiver local oscillator. The system can also include a resampling block that corrects for at least one of the CFO and the SFO.

In another aspect of the first embodiment, a modem is disclosed having a configuration for use in one or more of a satellite, a user terminal, and a gateway. The modem includes a transmitter and a receiver. The modem can be configured to be set for use in one or more of a satellite-to-user terminal (SAT-UT) downlink (DL) mode, a SAT-UT uplink (UL) mode, a SAT-satellite access gateway (SAG) DL mode, and a SAT-SAG UL mode. The modem can configure one or more parameters including: a time-domain cyclic guard band, a resource block in a radio frame, user allocation amongst users in the SAT-UT UL mode, a radio frame size, channel estimation symbols, pilot symbols, a pilot band offset, a pilot averaging value, a DC guard band and a modulation and coding scheme based on channel signal-to-noise conditions and target error rages.

The receiver of the modem further can include a burst detection component that uses a repeated pseudo-noise sequence to perform an estimation of a carrier frequency offset of a received waveform. The receiver further can include a FFT that utilizes the estimation of the carrier frequency offset to trigger a proper symbol FFT timing; and a decoder that utilizes the estimation of the carrier frequency offset to apply frequency correction.

The modem can include a pilot processing block that corrects for at least one of (1) a residual CFO, a SFO, and a phase noise which may impact a transmitter local oscillator or a receiver local oscillator. The modem can also include a resampling block that corrects for at least one of the CFO and the SFO.

In another aspect of the first embodiment, a modem can include a transmitter having a first group of transmitter components including a pilot symbol insertion module, a channel estimation symbol insertion module and a unique word insertion module and a second group of transmitter components including at least a crest factor reduction module and a digital pre-distortion module. The modem can include a receiver having a first group of receiver components including a burst synchronization module and a carrier frequency offset estimation component and a second group of receiver components. The second group of components in the receiver can include a channel estimation module that processes one or more channel estimation symbols and a pilot symbol processing module. A waveform transmitted or received by the modem can be configurable for one or more parameters including: a bandwidth, a number of pilot symbols, a pilot band offset, a pilot averaging configuration, a resource block size, a user allocation in one or more bursts of a radio frame, a time-domain cyclic guard band configuration, a number of channel estimation symbols, a length of a cyclic prefix and postfix value, a characteristic of a DC null, a burst length, a modulation and coding scheme, an antenna delay adjustment and a carrier frequency.

The modem can be configured such that the modem can be operable in a UT, a SAT and a SAG such that a processor is configured on the modem to implement functions on the model specific to the UT, the SAT or the SAG that deploys the modem.

The modem can be configured to selectively adjust one or more parameters including: a subcarrier spacing, a partitioning of resource blocks, a subcarrier and resource block configuration, and a multiple-user data in a multi-user uplink mode. The bandwidth of the waveform can be adjusted by changing a sampling rate with a fast Fourier transform/inverse fast Fourier transform size fixed. The subcarrier spacing can be changed as the sampling rate changes. The modulation and coding scheme depends on one or more of signal-to-noise conditions and/or target error rates.

The modem can be configured to utilize a 62.5 MHz channel bandwidth for UT-SAT UL communications in a first mode, a 2×62.5 MHz channel bandwidth for UT-SAT UL communications in a second mode (duel channel mode), a 250 MHz channel bandwidth for UT-SAT DL communications, a 250 MHz channel bandwidth for SAT-SAG DL communications and a 500 MHz channel bandwidth for SAT-SAG UL communications.

The transmitter further is configurable to provide, in one or more of the first group of transmitter components or the second group of transmitter components: a modulation and coding scheme with bit scrambling prior to encoding, up to four concurrent users on a multi-user uplink mode when the modem is configured in a user terminal, a configuration pilot subcarrier insertion approach for separating user resource blocks, an insertion of pilot sub-band offsets at a band edge of a radio frame, a configurable number of channel estimation symbols, a pseudo-noise rotated subcarrier scrambling approach, a multi-point, oversampled inverse fast Fourier transform modulator and a configurable cyclic extension to provide a time domain guard band.

In one aspect, the unique word insertion module inserts a unique word configured to be unique and orthogonal for a specific user.

In another aspect of the first embodiment, a modem configured for use in any one of a SAT, a UT and a SAG. The modem can include a processor and a computer readable storage device storing instructions which, when executed by the processor, cause the processor to perform operations including configuring a radio frequency (RF) signal and transmitting the RF signal to a device, wherein the RF signal can include an orthogonal frequency division multiplexing (OFDM) signal having a radio frame including one or more bursts. A respective burst of the one or more bursts can include a first portion including burst detection data, a second portion including channel characteristic estimation data, a third portion including payload data, and fourth and fifth portions including pilot data. The first portion in a time domain can be included in the respective burst prior to the second, third, fourth, and fifth portions in the time domain. The first portion can include a pseudo-random noise sequence inserted in the time domain. The first portion can be included in a first OFDM symbol and the second portion can be included in a second OFDM symbol different from the first OFDM symbol.

The second portion can be disposed between the first and third portions in the time domain, the third, fourth, and fifth portions are concurrent with each other in the time domain, the fourth portion is disposed closer to a first band edge of the respective burst than to a center frequency of the respective burst, and the fifth portion can be disposed closer to a second band edge that is opposite to the first band edge in a frequency domain.

The second portion can be configurable to be one or more OFDM symbols. Each of the third, fourth, and fifth portions can include one or more subcarriers. A sub-band offset of the fourth portion from a first band edge of the respective burst is configurable from a plurality of pre-set sub-band offsets. A first sub-band offset of the fourth portion from a first band edge of the respective burst is equal to a second sub-band offset of the fifth portion from a second band edge of the respective burst that is opposite to the first band edge in a frequency domain.

In one aspect, the respective burst further can include a sixth portion including null data, the sixth portion including a subcarrier, and the sixth portion configurable to be disposed at or near a center frequency of the radio frame. The radio frame can include a plurality of bursts. A first burst of the plurality of bursts can include the first burst at a first time period associated with the radio frame and a second burst of the plurality of bursts is at a second time period associated with the radio frame after the first time period. A portion including burst detection data is optional in the second burst.

A last burst of the plurality of bursts can be at a last time period associated with the radio frame, and a portion including burst detection data can be included in the last burst.

In one aspect, the second, third, fourth, and fifth portions of the respective burst are associated with a first user. The respective burst further can include a sixth portion including channel characteristic estimation data associated with a second user, a seventh portion including payload data associated with the second user, and eighth and ninth portions including pilot data associated with the second user.

Each of the third and seventh portions can include one or more resource blocks, wherein the resource blocks associated with the first user can include contiguous subcarriers. Each of the third and seventh portions can include one or more resource blocks. The resource blocks associated with respective first and second users can occupy non-overlapping contiguous resource block allocations.

A plurality of users simultaneously can share a same channel of the respective burst. Each user channel of the channel can include a pair of pilot data sub-bands and channel characteristic estimation data associated with the respective user. In one aspect, up to four users simultaneously share a same channel of the respective burst, and each user channel of the channel includes a pair of pilot data sub-bands and channel characteristic estimation data associated with the respective user.

The respective burst further can include a sixth portion including a time-domain cyclic guard band. The first portion including burst detection data can be configured to include data for use in at least one of burst detection, OFDM symbol alignment, power estimation, or carrier frequency offset estimation. The second portion including channel characteristic estimation data can be generated using a Golay sequence. The channel characteristic estimation data can include reference information used for channel probing and calculation of frequency domain equalizer taps.

The OFDM signal is generated by a transmitter of the modem. The modem can include a system on chip (SoC) or an integrated circuit (IC) chip. The OFDM signal can be configurable for transmission and receipt between components of a non-geostationary orbit satellite (NGOS) system.

The second, third, fourth, and fifth portions of the OFDM signal can be generated in a frequency domain, and wherein the second, third, fourth, and fifth portions generated in the frequency domain can be converted into the time domain using inverse fast Fourier transform (IFFT). The first portion can be included in the OFDM signal after conversion of the second, third, fourth, and fifth portions into the time domain.

The OFDM signal can be communicated between any two of the SAT, the UT associated with a user, the SAG disposed at or near ground, and a repeater disposed between the ground and at an altitude less than the satellite. Data bits making up the OFDM signal are encoded by forward error correction (FEC) with variable-rate low-density parity check (LDPC) codes. Modulation and FEC coding rates are configurable in accordance with whether the modem is configured on the SAT, the UT or the SAG and/or based on wireless channel conditions. The payload data can include a header sequence at a beginning of the payload data, and the header sequence specifies subsequent modulation and coding parameters in the respective burst. In one aspect, the RF signal can include a signal that has been filtered by a transmission mask filter configured in accordance with applicable technical and regulatory emissions requirements.

The pseudo-random noise sequence of the first portion can include a linear feedback shift register (LFSR) sequence, and the LFSR sequence of the first portion can be generated by configurable polynomials having coefficients which vary among a plurality of simultaneous transmitting users, and the coefficients that vary yield different orthogonal sequences to distinguish bursts from the plurality of simultaneous transmitting users.

Symbol scrambling can be applied to one or more of the second, third, fourth, or fifth portions using a second pseudo-random noise sequence with initial varied state for each user associated with the respective burst.

The second embodiment relates to SAT-UT communication from the standpoint of the UT transmitting a signal or from the standpoint of the SAT receiving a signal on the uplink. A modem in this regard is configured to transmit a waveform from a UT to a SAT. A modem configured on the SAT is operational to receive the signal from the UT.

For the first case, when the modem is on the UT and is transmitting signals on the uplink to the SAT, the modem can include a transmitter configured to generate a transmission waveform directed to the SAT. The transmission waveform includes a unique word configured in a first time period of a burst in a radio frame, a channel estimation symbol configured in a second time period of the burst of the radio frame, the second time period adjacent to the first time period, the channel estimation symbol being associated with a channel and covering a channel estimation symbol set of frequency resources, a first pilot subcarrier at a first frequency in a third time period of the burst in the radio frame, a second pilot subcarrier at a second frequency in the third time period of the burst in the radio frame and a resource block including user data configured in the third time period and utilizing a set of frequency resources between the first pilot subcarrier and the second pilot subcarrier. The transmission waveform further includes a DC null configured in the third time period, a first pilot sub-band offset configured in the third time period and at a third frequency and a second pilot sub-band offset configured in the third time period and at a fourth frequency.

The transmission waveform further can include an orthogonal frequency division multiplexed (OFDM) symbol, wherein the OFDM symbol has the first pilot subcarrier, the second pilot subcarrier and the resource block.

Depending on the mode and whether one or two modulators are active, the transmission waveform is configured to have a sampling rate of approximately 62.5 MHz or 2×62.5 MHz. The modem further can perform pre-compensation on the transmission waveform, the pre-compensation related to one or more of CFO and SFO. The CFO is due to satellite movement and the SFO is due to local or remote reference crystal oscillator differences.

The modem further can include a crest factor reduction block that performs crest factor reduction on the transmission waveform. The modem further includes a digital pre-distortion block that adjusts one or more of a power amplifier linearity, efficiency or power consumption for a given signal quality.

The OFDM symbol further can include one or more of the channel estimation symbol, the first subcarrier and the second pilot subcarrier. The transmission waveform transmitted from the UT can be configured to be combined over an air interface with a second transmission waveform from a second UT. The burst in this regard can include the unique word, the channel estimation symbol covering the channel estimation symbol set of frequency resources that correspond do the resource block, the first pilot subcarrier, the second pilot subcarrier, the DC null, a second channel estimation symbol covering a second channel estimation symbol set of frequency resources that correspond to a second resource block having second user data from the second UT, a third pilot subcarrier associated with the second resource block and a fourth pilot subcarrier associated with the second resource block.

The radio frame can include a plurality of bursts, and wherein each burst of the plurality of bursts can include data from one to four different UTs. The waveform can be modulated using a modulation and coding scheme chosen based on data received from the SAT.

A first group of pilot subcarriers can be adjacent to the first pilot sub-band offset and a second group of pilot subcarriers adjacent to the second pilot sub-band offset are used to perform phase linear interpolation across a frequency band of the radio frame to correct for delay.

The third frequency of the first pilot sub-band offset can be at a high frequency edge of a frequency band of the radio frame and the fourth frequency of the second pilot sub-band offset can be at a low frequency edge of the frequency band of the radio frame.

When the SAT performs a phase linear interpolation across the frequency band of the radio frame based on the first group of pilot subcarriers and the second group of pilot subcarriers, the modem can assume a line-of-sight channel.

The first pilot sub-band offset can include a first group of pilot sub-band symbols and the second pilot sub-band offset can include a second group of pilot sub-band symbols.

The channel estimation symbol can be first used by the SAT to estimate the channel and a first group of pilot subcarriers adjacent to the first pilot sub-band offset and a second group of pilot subcarriers adjacent to the second pilot sub-band offset can be used to correct for any residual delays or offset in the channel.

The second embodiment can also include a method. A method in this regard can be performed by a UT for generating a transmission waveform for transmission to a SAT. The method can include inserting a unique word in a first time period of a burst in a radio frame, inserting a channel estimation symbol configured in a second time period of the burst of the radio frame, the second time period adjacent to the first time period, the channel estimation symbol being associated with a channel and covering a channel estimation symbol set of frequency resources, configuring a first pilot subcarrier at a first frequency in a third time period of the burst in the radio frame, configuring a second pilot subcarrier at a second frequency in the third time period of the burst in the radio frame, configuring a resource block including user data in the third time period within the burst of the radio frame, the resource block including a resource block set of frequency resources between the first pilot subcarrier and the second pilot subcarrier, the resource block being associated with the user data and configuring a DC null configured in the third time period. The burst can be configured such that data from one or more of a second UT, a third UT and a fourth UT can be configured within the burst of the radio frame or other bursts within the radio frame.

The method further can include inserting a first pilot sub-band offset configured in the third time period and at a third frequency and inserting a second pilot sub-band offset configured in the third time period and at a fourth frequency.

The method can include performing pre-compensation on the transmission waveform, the pre-compensation related to one or more of carrier frequency offset (CFO) and sampling frequency offset (SFO). The CFO is due to satellite and/or UT movement and SFO is due to local and remote reference oscillator differences. The method further can include performing crest factor reduction on the transmission waveform prior to transmission from the UT or performing digital pre-distortion on the transmission waveform that adjusts one or more of a power amplifier linearity, efficiency or power consumption for a given signal quality.

The transmission waveform can include an orthogonal frequency division multiplexed (OFDM) symbol including the first pilot subcarrier, the second pilot subcarrier and the resource block. The OFDM symbol further can include one or more of the channel estimation symbol, the first pilot subcarrier and the second pilot subcarrier. The transmission waveform transmitted from the UT can be configured to be combined over an air interface with a second transmission waveform from a second UT such that the burst includes the unique word, the channel estimation symbol covering the channel estimation symbol set of frequency resources that correspond do the resource block, the first pilot subcarrier, the second pilot subcarrier and the DC null. The burst can further include a second channel estimation symbol covering a second channel estimation symbol set of frequency resources that correspond to a second resource block having second user data from the second UT, a third pilot subcarrier associated with the second resource block and a fourth pilot subcarrier associated with the second resource block.

The radio frame can include a plurality of bursts, and each burst of the plurality of bursts can include data from one to four different UTs. The waveform can be modulated using a modulation and coding scheme chosen based on data received from the SAT.

In one aspect, a first group of pilot subcarriers adjacent to the first pilot sub-band offset and a second group of pilot subcarriers adjacent to the second pilot sub-band offset are used to perform phase linear interpolation across a frequency band of the radio frame to correct for delay.

The third frequency of the first pilot sub-band offset can be at a high frequency edge of a frequency band of the radio frame and the fourth frequency of the second pilot sub-band offset can be at a low frequency edge of the frequency band of the radio frame.

When the SAT performs a phase linear interpolation across a frequency band of the radio frame based on a first group of pilot subcarriers adjacent to the first pilot sub-band offset and a second group of pilot subcarriers adjacent to the second pilot sub-band offset, the SAT can assume a line-of-sight channel.

The first pilot sub-band offset can include a first group of pilot sub-band symbols and the second pilot sub-band offset including a second group of pilot sub-band symbols. The channel estimation symbol can be first used by the SAT to estimate the channel and the first pilot sub-band offset and the second pilot sub-band offset are used to correct for any residual delays or offset in the channel.

As noted above, a modem according to the second embodiment can also be configured on a SAT to receive a waveform transmitted to the SAT from a UT. This is also an uplink communication. The modem in this regard includes a receiver configured to receive the waveform from the UT. The waveform includes a unique word configured in a first time period of a burst in a radio frame, a channel estimation symbol configured in a second time period of the burst of the radio frame, the second time period adjacent to the first time period, the channel estimation symbol being associated with a channel and covering a channel estimation symbol set of frequency resources, a first pilot subcarrier at a first frequency in a third time period of the burst in the radio frame, a second pilot subcarrier at a second frequency in the third time period of the burst in the radio frame, a resource block including the user data configured in the third time period and utilizing a set of frequency resources between the first pilot subcarrier and the second pilot subcarrier, a DC null configured in the third time period, a first pilot sub-band offset configured in the third time period and at a third frequency and a second pilot sub-band offset configured in the third time period and at a fourth frequency.

The modem can further include a channel estimation component in the receiver that estimates the channel by extracting the channel estimation symbol and a pilot symbol processing component that performs phase linear interpolation across a frequency band of the radio frame using a first group of subcarriers adjacent to the first pilot sub-band offset and a second group of subcarriers adjacent to the second pilot sub-band offset and to correct for delay.

The receiver further corrects for a CFO and a SFO. The CFO can be due to satellite movement and the SFO can be due to local or remote reference crystal oscillator differences. The waveform can include an orthogonal frequency division multiplexed (OFDM) symbol. The OFDM symbol can include the first pilot subcarrier, the second pilot subcarrier and the resource block.

The waveform received from the UT can be configured to be combined over an air interface with a second transmission waveform from a second UT such that the burst includes the unique word, the channel estimation symbol covering the channel estimation symbol set of frequency resources that correspond do the resource block, the first pilot subcarrier, the second pilot subcarrier and the DC null. The burst can further include a second channel estimation symbol covering a second channel estimation symbol set of frequency resources that correspond to a second resource block having second user data from the second UT, a third pilot subcarrier associated with the second resource block and a fourth pilot subcarrier associated with the second resource block.

The radio frame can include a plurality of bursts, and wherein each burst of the plurality of bursts includes data from one to four different UTs. The third frequency of the first pilot sub-band offset can be at a high frequency edge of a frequency band of the radio frame and the fourth frequency of the second pilot sub-band offset can be at a low frequency edge of the frequency band of the radio frame.

The channel estimation symbol can be first used by the SAT to estimate the channel and the first group of subcarriers and the second group of subcarriers can be used to correct for any residual delays or offset in the channel.

The third embodiment relates to SAT-UT communications from the SAT to one or more UTs on the downlink. Some aspects of this embodiment relate to the modem operations from the standpoint of the SAT as a transmitter, and other aspects relate to the modem operations on the UT as a receiver that receives the signals on the downlink from the SAT. The first aspect is from the standpoint of the UT. A modem in this regard is configured to receive a transmitted waveform transmitted from a SAT to a UT. The modem includes a receiver, on the UT, configured to receive the transmitted waveform from the SAT. The transmitted waveform includes a unique word configured in a first time period of a burst in a radio frame, a first channel estimation symbol configured in a second time period of the burst of the radio frame, the second time period adjacent to the first time period, the channel estimation symbol being associated with first user data intended for the UT and covering a first channel estimation symbol set of frequency resources, a first pilot subcarrier at a first frequency in a third time period of the burst in the radio frame, and a second pilot subcarrier at a second frequency in the third time period of the burst in the radio frame.

The transmitted waveform further can include a first resource block including the first user data configured in the third time period and utilizing a first resource block set of frequency resources between the first pilot subcarrier and the second pilot subcarrier, a second channel estimation symbol configured in the second time period of the burst of the radio frame, the second channel estimation symbol being associated with second user data intended for a second UT and covering a second channel estimation symbol set of frequency resources, a third pilot subcarrier at a third frequency in the third time period of the burst in the radio frame, a fourth pilot subcarrier at a fourth frequency in the third time period of the burst in the radio frame and a second resource block including the second user data configured in the third time period and utilizing a second resource block set of frequency resources between the third pilot subcarrier and the fourth pilot subcarrier.

The modem can further include a delay component that causes the receiver to wait a delay time based on a distance of the UT from the SAT before extracting the first resource block from the burst in the radio frame.

The transmitted waveform further can include a cyclic prefix and postfix, a DC null configured in the third time period, a first pilot sub-band offset configured in the third time period and at a third frequency and a second pilot sub-band offset configured in the third time period and at a fourth frequency.

The transmitted waveform can be transmitted from the SAT at a 270 MHz sampling rate or a 250 MHz sampling rate. The 270 MHz sampling rate represents a 9/8 oversampled signal, achieved by taking a 1152 point inverse fast Fourier transfer on a 1024 point signal at 240 MHz. The transmitted waveform can be configured to contain user data for up to four UTs. The transmitted waveform can be configured in one of a synchronous mode or a semi-synchronous mode and can be coded and modulated using a modulating and coding scheme value.

In another aspect, the second UT can be further way from the SAT relative to the UT, the radio frame can include the first resource block in the radio frame intended for the UT and the radio frame can include the second resource block in the radio frame intended for the second UT. The delay time can include at least a minimal delay time related to a delay between when the radio frame was received by a second UT relative to when the radio frame was received by the UT to allow for the UT to extract the first resource block from the radio frame and the second UT to extract the second resource block from the radio frame.

The modem further can correct the transmitted waveform for one or more of a SFO and a CFO. The modem can further include a burst detection component that utilizes pseudo-noise sequences with repetitions to estimate a frequency offset. The burst detection component can detect an individual frequency offset associated with the UT and not the second UT.

Another aspect of the third embodiment can include a method of receiving a signal transmitted on the downlink from the SAT. A method in this regards includes receiving, at a receiver on a UT a transmitted waveform transmitted from a SAT. The transmitted waveform can include a unique word configured in a first time period of a burst in a radio frame, a first channel estimation symbol configured in a second time period of the burst of the radio frame, the second time period adjacent to the first time period, the channel estimation symbol being associated with first user data intended for the UT and covering a first channel estimation symbol set of frequency resources, a first pilot subcarrier at a first frequency in a third time period of the burst in the radio frame, and a second pilot subcarrier at a second frequency in the third time period of the burst in the radio frame.

The transmitted waveform can further include a first resource block including the first user data configured in the third time period and utilizing a first resource block set of frequency resources between the first pilot subcarrier and the second pilot subcarrier, a second channel estimation symbol configured in the second time period of the burst of the radio frame, the second channel estimation symbol being associated with second user data intended for a second UT and covering a second channel estimation symbol set of frequency resources, a third pilot subcarrier at a third frequency in the third time period of the burst in the radio frame, a fourth pilot subcarrier at a fourth frequency in the third time period of the burst in the radio frame and a second resource block including the second user data configured in the third time period and utilizing a second resource block set of frequency resources between the third pilot subcarrier and the fourth pilot subcarrier.

The method can further include implementing a delay that causes the receiver to wait a delay time based on a distance of the UT from the SAT before extracting the first resource block from the burst in the radio frame.

The transmitted waveform further can include a cyclic prefix and postfix, a DC null configured in the third time period, a first pilot sub-band offset configured in the third time period and at a third frequency and a second pilot sub-band offset configured in the third time period and at a fourth frequency. The transmitted waveform can have the same sampling rate and characteristics as described above.

The method can be practiced in a context where the second UT is further way from the SAT relative to the UT, the radio frame includes the first resource block in the radio frame intended for the UT and the radio frame includes the second resource block in the radio frame intended for the second UT and the delay time includes at least a minimal delay time related to a delay between when the radio frame was received by a second UT relative to when the radio frame was received by the UT to allow for the UT to extract the first resource block from the radio frame and the second UT to extract the second resource block from the radio frame.

In another aspect of the third embodiment, a modem can be configured to receive a transmitted waveform transmitted from a SAT to a UT. The modem can include a receiver, on the UT, configured to receive the transmitted waveform from the SAT, the transmitted waveform including first resource blocks intended for the UT and second resource blocks intended for a second UT, a first set of components configured with the receiver on the UT to process the transmitted waveform with the first resource blocks and the second resource blocks, a multi-user demapper configured with the receiver to extract the first resource blocks from the transmitted waveform to yield a per-user signal and a second set of components configured within the receiver to demodulate and decode the first resource blocks in the per-user signal.

The first set of components can include a first shifter component that compensates for sampling frequency offset (SFO) in the transmitted waveform and a second shifter component that compensates for one or more a carrier frequency offset (CFO), a Doppler scaling, and/or a residual symbol alignment error. The first set of components can further include one or more of a burst detection component that uses a pseudo-noise sequence to estimate a frequency offset to correct for a Doppler effect between the UT and the SAT, a channel estimation (CE) block that generates a channel estimate based on a CE symbol contained in the transmitted waveform and a frequency equalization (FEQ) block that flattens a channel response such that constellations on all active subcarriers in the transmitted waveform are properly rotated and scaled. The FEQ block further uses subcarrier PN (pseudo noise) de-rotation to unwind a transmit side subcarrier scrambling. The channel estimate can include an estimate of an amplitude and a phase of a channel at each subcarrier frequency associated with the transmitted waveform.

Another aspect of the third embodiment relates to the transmitter (modem) being on the SAT and transmitting signals on the downlink. A modem in this regard can be configured to transmit a waveform from a SAT to one or more UTs, the modem can include a transmitter configured to generate and transmit the waveform from the SAT. The waveform can include a unique word configured in a first time period of a burst in a radio frame, a first channel estimation symbol configured in a second time period of the burst of the radio frame, the second time period adjacent to the first time period, the channel estimation symbol being associated with first user data intended for a first UT and covering a first channel estimation symbol set of frequency resources, a first pilot subcarrier at a first frequency in a third time period of the burst in the radio frame and a second pilot subcarrier at a second frequency in the third time period of the burst in the radio frame.

The waveform can further include a first resource block having the first user data configured in the third time period and utilizing a first resource block set of frequency resources between the first pilot subcarrier and the second pilot subcarrier, a second channel estimation symbol configured in the second time period of the burst of the radio frame, the second channel estimation symbol being associated with second user data intended for a second UT and covering a second channel estimation symbol set of frequency resources, a third pilot subcarrier at a third frequency in the third time period of the burst in the radio frame, a fourth pilot subcarrier at a fourth frequency in the third time period of the burst in the radio frame and a second resource block including the second user data configured in the third time period and utilizing a second resource block set of frequency resources between the third pilot subcarrier and the fourth pilot subcarrier. The waveform further can further include a cyclic prefix and postfix, a DC null configured in the third time period, a first pilot sub-band offset configured in the third time period and at a third frequency and a second pilot sub-band offset configured in the third time period and at a fourth frequency. The UT can utilize the first channel estimation symbol and the second channel estimation symbol to estimate a channel and the UT can utilize the first pilot sub-band offset and the second pilot sub-band offset to correct for delay variation due to SAT movement.

The unique word can include a series of repeated pseudo-noise symbols that are tracked in phase over time by the first UT and the second UT to estimate a frequency offset. The frequency offset can include at least one of a sampling frequency offset and a carrier frequency offset. In another aspect, the waveform further can include a cyclic prefix and postfix, a DC null configured in the third time period, a first pilot sub-band offset configured in the third time period and at a third frequency, a first group of subcarriers adjacent to the first pilot sub-band offset, a second pilot sub-band offset configured in the third time period and at a fourth frequency and a second group of subcarriers adjacent to the second pilot sub-band offset. The UT can utilize at least one of the unique word, first channel estimation symbol, the second channel estimation symbol, the first group of subcarriers and the second group of subcarriers to correct for one or more of Doppler effects, local oscillator effects, delay due to SAT movement, timing errors or frequency errors.

Another aspect of the third embodiment relates to a method associated with operations of the modem on a SAT. A method in this regard includes inserting, via a modem configured on a satellite, a unique word in a first time period of a burst in a radio frame, inserting a channel estimation symbol configured in a second time period of the burst of the radio frame, the second time period adjacent to the first time period, the channel estimation symbol being associated with a channel and covering a channel estimation symbol set of frequency resources, configuring a first pilot subcarrier at a first frequency in a third time period of the burst in the radio frame, configuring a second pilot subcarrier at a second frequency in the third time period of the burst in the radio frame and transmitting the radio frame to a UT.

The method can further include configuring one or more resource blocks including user data for one or more users in the third time period within the burst of the radio frame, the one or more resource blocks including a resource block set of frequency resources between the first pilot subcarrier and the second pilot subcarrier and configuring a DC null configured in the third time period. The burst can be configured such that data intended for one or more of the UT, a second UT, a third UT and a fourth UT can be configured within the burst of the radio frame or other bursts within the radio frame.

The method can further include inserting a first pilot sub-band offset configured in the third time period and at a third frequency and inserting a second pilot sub-band offset configured in the third time period and at a fourth frequency. The third frequency can be configured at a first edge of the radio frame and the fourth frequency is at a second edge of the radio frame. In another aspect, the method can further include performing pre-compensation on the transmission waveform, the pre-compensation related to one or more of CFO and SFO, performing crest factor reduction on the transmission waveform prior to transmission from the UT and performing digital pre-distortion on the transmission waveform that adjusts one or more of a power amplifier linearity, efficiency or power consumption for a given signal quality.

The first pilot subcarrier can be adjacent to the first pilot sub-band offset and the second pilot subcarrier can be adjacent to the second pilot sub-band offset.

The method can further include applying a linear interpolation across a bandwidth of the radio frame using the first pilot subcarrier and the second pilot subcarrier. The linear interpolation can be used to correct for one or more of Doppler effects, local oscillator effects, delay due to SAT movement, timing errors or frequency errors.

The fourth embodiment relates to the modem operations on the SAT-SAG UL and DL. The waveforms in both these communication paths is similar and thus they are described in terms of being the fourth embodiment. There are different bandwidths used depending on whether the communication is on the UL or DL. A modem in this regard can be configurable for use on a SAT or a SAG. The modem includes a transmitter configurable to transmit a first waveform from the SAT to the SAG at a first bandwidth and configurable to transmit a second waveform from the SAG to the SAT at a second bandwidth. The first waveform and the second waveform can each include a unique word configured in a first time period of a burst in a radio frame, a channel estimation symbol configured in a second time period of the burst of the radio frame, the second time period adjacent to the first time period, the channel estimation symbol being associated with user data and covering a set of frequency resources, a first pilot subcarrier at a first frequency in a third time period of the burst in the radio frame, a second pilot subcarrier at a second frequency in the third time period of the burst in the radio frame and one or more resource blocks configured in the third time period of the burst in the radio frame and configured to use the set of frequency resources between the first pilot subcarrier and the second pilot subcarrier. The modem can include a receiver configured to receive the first waveform or the second waveform.

The SAT can transmit the first waveform to the SAG in a point-to-point configuration. The modem, when deployed on a SAT, can be configured to transmit the first waveform on a DL at a bandwidth of approximately 250 MHz and the modem, when deployed on a SAG, can be configured to transmit the second waveform on an UL at a bandwidth of approximately 500 MHz.

The first waveform and the second waveform each further can include a cyclic prefix and postfix symbol, a DC null configured in the third time period, a first pilot sub-band offset configured in the third time period and at a third frequency and a second pilot sub-band offset configured in the third time period and at a fourth frequency. The first waveform or the second waveform can be configured with respect to one or more of: a DC null, the first pilot subcarrier and the second pilot subcarrier, a value associated with a pilot sub-band offset, a value associated with the channel estimation symbol and a value associated with a cyclic prefix and postfix symbol. The first waveform or the second waveform can further be configured in one of an asynchronous mode or a semi-synchronous mode. The first waveform or the second waveform is coded and modulated using a modulating and coding scheme value.

In one aspect, the transmitter further can include a pre-compensation module that pre-compensates frequency error and sampling clock error associated with the first waveform or the second waveform. When the modem is configured within the SAT to receive the second waveform from the SAG, the receiver can parse a PHY packet data unit (PDU) header in the second waveform to obtain a modulation and coding scheme value and symbol data that contains a code word and also can perform compensation for one or more of a sampling frequency offset, a carrier frequency offset and a Doppler effect due to movement of the SAT.

When the modem is configured within the SAG to receive the first waveform from the SAT, the receiver can parse a PHY PDU header in the first waveform to obtain a modulation and coding scheme value and symbol data that contains a code word.

In one aspect, the first waveform and the second waveform are both orthogonal frequency division multiplex waveforms. The first waveform and the second waveform each further can include a first pilot sub-band offset configured in the third time period and at a third frequency and a second pilot sub-band offset configured in the third time period and at a fourth frequency.

When the modem receives the first waveform or the second waveform, the modem can utilize the channel estimation symbol to estimate a channel and then apply a linear phase interpolation across a frequency spectrum of the radio frame using a first group of subcarriers adjacent to the first pilot sub-band offset and a second group of subcarriers adjacent to the second pilot sub-band offset to correct for residual delay or error.

The unique word can include a set of repeated pseudo-noise sequences that are used to track a phase change over time to estimate a frequency offset for correction. The receiver can include one or more components that correct the first waveform or the second waveform for one or more of a CFO, a SFO, and a Doppler effect due to SAT movement. The modem can further include a gain control component for correction of one of weather impacts on the first waveform and the second waveform and a phase array loss as a function of a steering angle.

In another aspect of the fourth embodiment, a modem can be configurable for use on a SAT or a SAG. The modem can include a transmitter and receiver configurable to modify, depending on whether the modem is configured on the SAT or the SAG, one or more of a value associated with a DC null in a radio frame of a waveform, a value associated with pilot subcarriers in the radio frame, a value associated with a pilot sub-band offset in the radio frame, a value associated with a channel estimation symbol in the radio frame and a value of a cyclic prefix and postfix symbol in the radio frame. When the modem is configured in the SAT, the transmitter transmits the waveform to the SAG using a 250 MHz channel bandwidth, and when the modem is configured in the SAT, the transmitter transmits a second waveform to the SAT using a 500 MHz channel bandwidth.

The modem can include parameters that are configurable depending on whether the modem is deployed in the SAT or the SAG. The parameters include one or more of: a time-domain cyclic guard band, a resource block size, a user allocation, a radio frame size, a value associated with pilot averaging, and a modulation and coding scheme. The radio frame can be configured as an orthogonal frequency division multiplex waveform.

The modem can include a receiver configured to receive a second waveform. The second waveform can have a structure including a unique word configured in a first time period of a burst in a second radio frame of the second waveform, a second channel estimation symbol configured in a second time period of the burst of the second radio frame, the second time period adjacent to the first time period, the second channel estimation symbol being associated with a channel and covering a set of frequency resources, a first pilot subcarrier at a first frequency in a third time period of the burst in the second radio frame, a second pilot subcarrier at a second frequency in the third time period of the burst in the second radio frame and one or more resource blocks configured in the third time period of the burst in the second radio frame and configured to use the set of frequency resources between the first pilot subcarrier and the second pilot subcarrier.

The second waveform further can include at least one pilot sub-band offset from at least one band edge of the radio frame.

In yet another aspect of the fourth embodiment, a modem configurable for use on a SAT or a SAG. The modem can include a processor and a computer-readable medium storing instructions which, when executed by the processor, cause the processor to perform operations including one or more of modifying, depending on whether the modem is configured on the SAT or the SAG, one or more of: a bandwidth for transmitting a waveform, a DC null in a radio frame of the waveform, pilot subcarriers in the radio frame, a first pilot sub-band offset in the radio frame, a second pilot sub-band offset in the radio frame, a channel estimation symbol in the radio frame and a cyclic prefix and postfix symbol in the radio frame and, when the modem receives the waveform, performing error correction for one or more of: a carrier frequency offset, a sampling frequency offset, a Doppler effect on the waveform, a weather impact on the waveform, a delay in a signal, and a phase-array loss impact on the waveform.

The computer-readable medium stores additional instructions which, when executed by the processor, cause the processor to perform operations including, when the modem is configured in the SAT, transmitting the waveform to the SAG using a 250 MHz channel bandwidth, and when the modem is configured in the SAT, the transmitter transmits a second waveform to the SAT using a 500 MHz channel bandwidth.

The modem can include parameters that are configurable depending on whether the modem is deployed in the SAT or the SAG. The parameters can include one or more of: a time-domain cyclic guard band, a resource block size, a user allocation, a radio frame size, a value associated with pilot averaging, and a modulation and coding scheme.

In another aspect, the computer-readable medium stores additional instructions which, when executed by the processor, cause the processor to perform operations further including performing error correction by first estimating a channel for the waveform via the channel estimation symbol, followed by applying a linear phase interpolation across a set of frequencies associated with the radio frame and using a first group of subcarriers adjacent to the first pilot sub-band offset and a second group of subcarriers adjacent to the second pilot sub-band offset to correct for residual errors.

A method aspect of the fourth embodiment includes a method performed by a modem configurable to be implemented in a SAT or a SAG. The method can include transmitting a first waveform for use in a channel between the SAT and the SAG and on either an UL or a DL. The first waveform can include a unique word configured in a first time period of a burst in a radio frame, a channel estimation symbol configured in a second time period of the burst of the radio frame, the second time period adjacent to the first time period, the channel estimation symbol being associated with a channel and covering a set of frequency resources, a first pilot subcarrier at a first frequency in a third time period of the burst in the radio frame, a second pilot subcarrier at a second frequency in the third time period of the burst in the radio frame and one or more resource blocks configured in the third time period of the burst in the radio frame and configured to use the set of frequency resources between the first pilot subcarrier and the second pilot subcarrier. The method can further include receiving a second waveform via the UL or the DL.

When the channel is the UL between the SAG and the SAT, the first waveform has a bandwidth of 500 MHz and when the channel is the DL between the SAT and the SAG, the first waveform has a bandwidth of 250 MHz.

The method further can include, prior to transmitting the first waveform, configuring by the modem one or more parameters associated with the first waveform, the one or more parameters including one or more of: a subcarrier spacing, a bandwidth, a time-domain cyclic guard band, a resource block size, a user allocation, a radio frame size, a channel estimation symbol, a first pilot sub-band offset, a second pilot sub-band offset, a pilot averaging approach, a DC guard band, and a modulation and coding scheme. The bandwidth can be set by selecting a sampling rate with a fast Fourier transform/inverse fast Fourier transform size fixed to provide a number of subcarriers for the first waveform. In one aspect, the subcarrier spacing for the first waveform changes as the sampling rate changes.

Receiving the second waveform further can include performing error correction on the second waveform to correct for one or more of a sampling frequency offset (SFO), a carrier frequency offset (CFO), a delay, an impact of weather on the second waveform, a phase array loss in the second waveform, a delay variation, and a Doppler effect due to movement of the SAT.

The fourth embodiment can include another method embodiment. A method in this regard can be performed by a modem configurable to be implemented in a SAT or a SAG. The method includes configuring, whether the modem is deployed on the SAT or the SAG, the modem to transmit or receive a waveform having a configuration including a unique word configured in a first time period of a burst in a radio frame, a channel estimation symbol configured in a second time period of the burst of the radio frame, the second time period adjacent to the first time period, the channel estimation symbol being associated with a channel and covering a set of frequency resources, a first pilot subcarrier at a first frequency in a third time period of the burst in the radio frame, a second pilot subcarrier at a second frequency in the third time period of the burst in the radio frame, a first pilot sub-band offset configured in the radio frame, a second pilot sub-band offset configured in the radio frame and one or more resource blocks configured in the third time period of the burst in the radio frame and configured to use the set of frequency resources between the first pilot subcarrier and the second pilot subcarrier. The method can then include transmitting the waveform in a transmit mode and receiving the waveform in a receive mode.

The method further can include, prior to transmitting the waveform when in the transmit mode, configuring by the modem one or more parameters associated with the waveform, the one or more parameters including one or more of: a subcarrier spacing, a bandwidth, a time-domain cyclic guard band, a resource block size, a user allocation, a radio frame size, a channel estimation symbol, a pilot averaging approach, a DC guard band, and a modulation and coding scheme.

Receiving the waveform when in the receive mode further can include performing error correction on the waveform to correct for one or more of a SFO, a CFO, a delay, an impact of weather on the second waveform, a phase array loss in the second waveform, a delay variation, and a Doppler effect due to movement of the SAT. Performing error correction can include performing a linear phase interpolation across the set of frequency resources using a first group of subcarriers adjacent to the first pilot sub-band offset and a second group of subcarriers adjacent to the second pilot sub-band offset. Receiving the waveform when in the receive mode further can include applying gain control to correct for one or more of weather impacts on the waveform and a phase array loss in the waveform. Performing error correction further can include evaluating a repetition of the unique word to track a phase change to estimate a frequency offset.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Figure 14A:
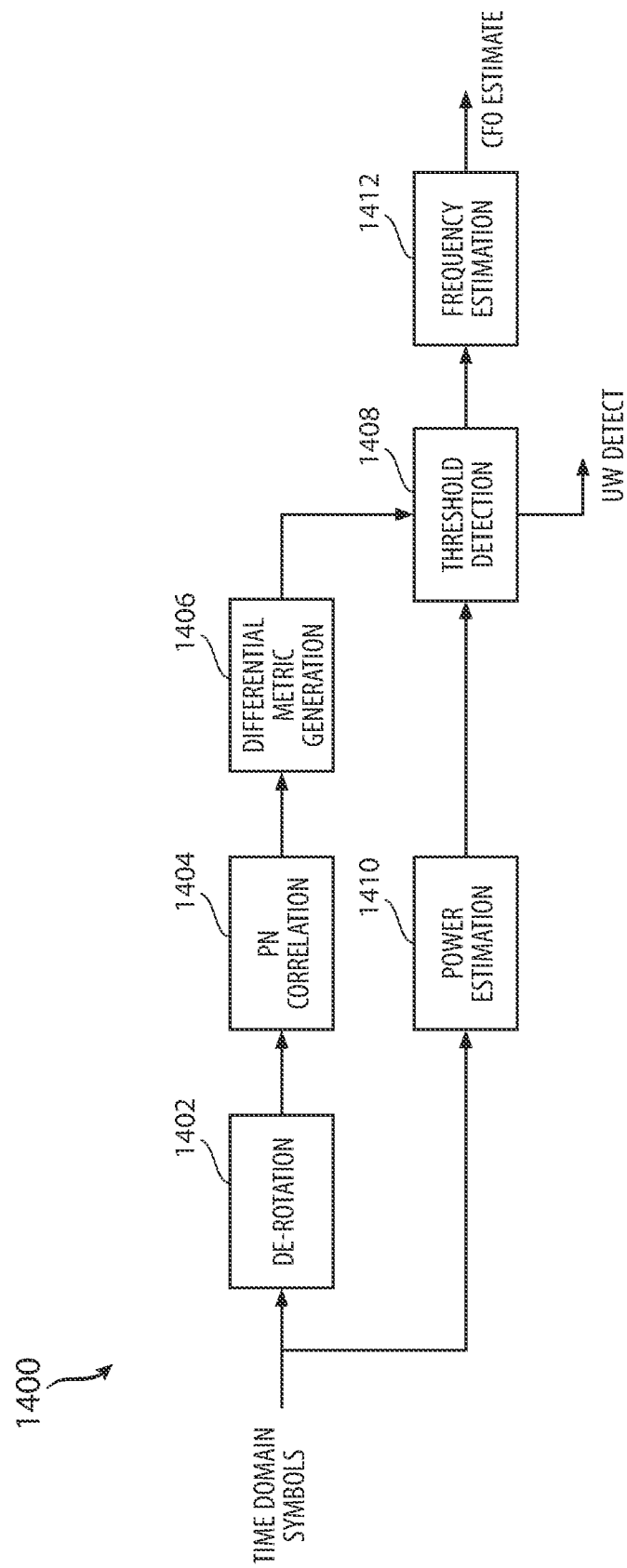
Figure 14B:
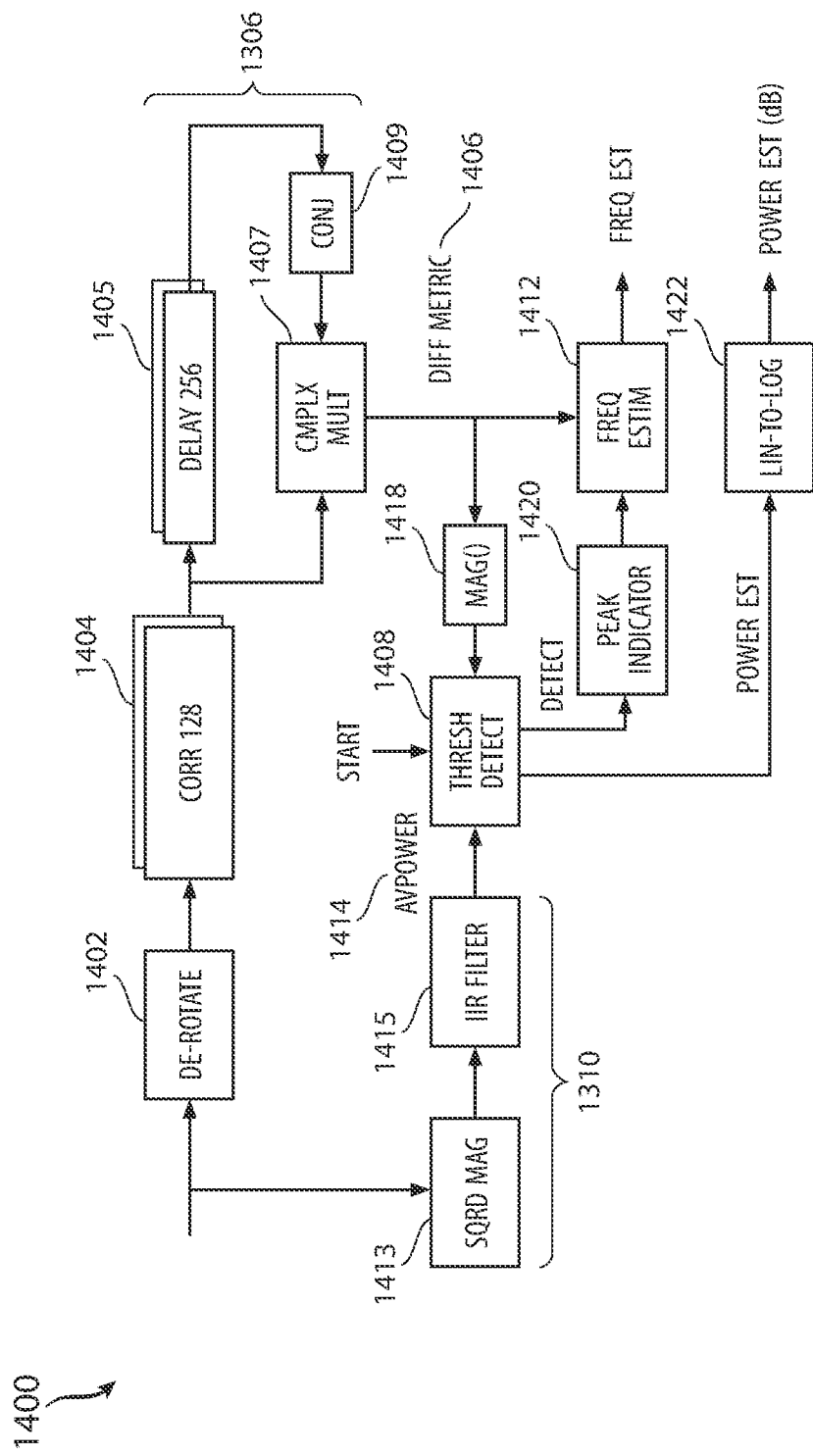
Figure 14C:
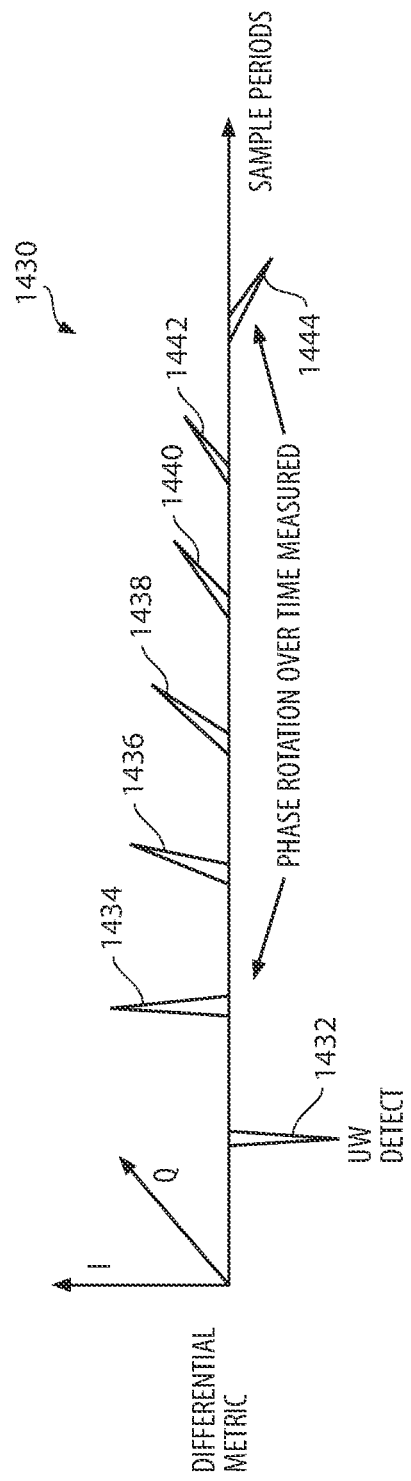
Figure 15:
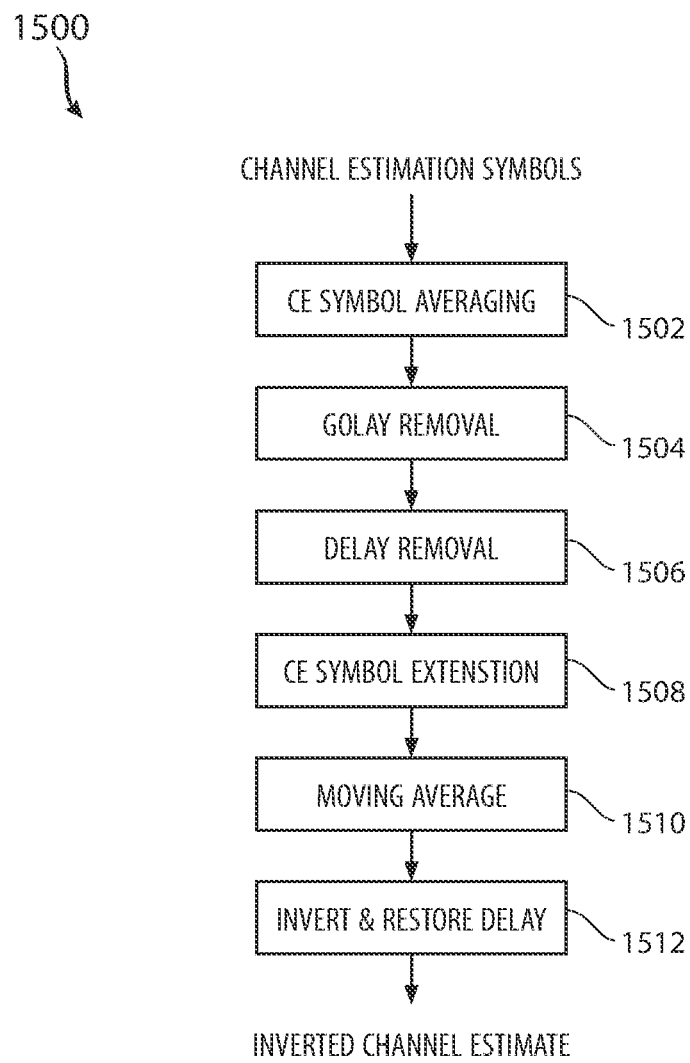
Figure 16A:
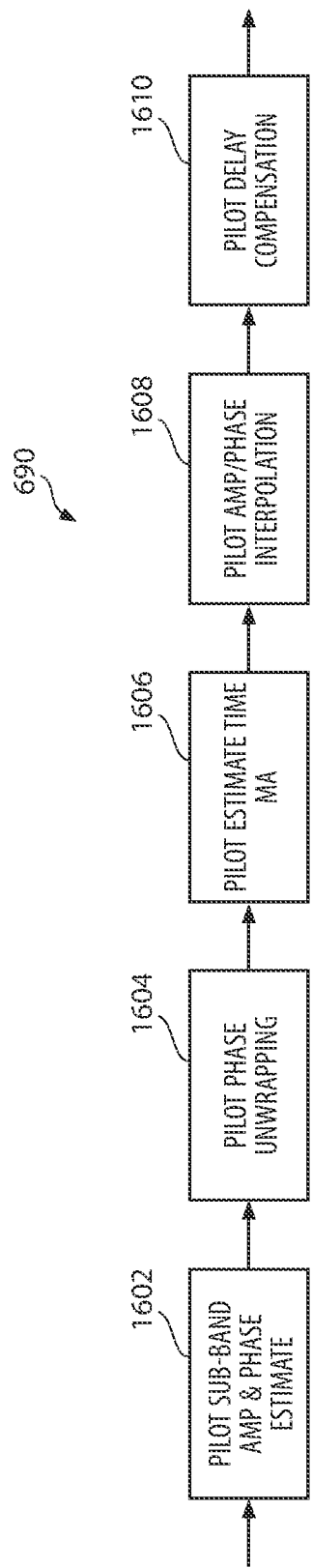
Figure 16B:
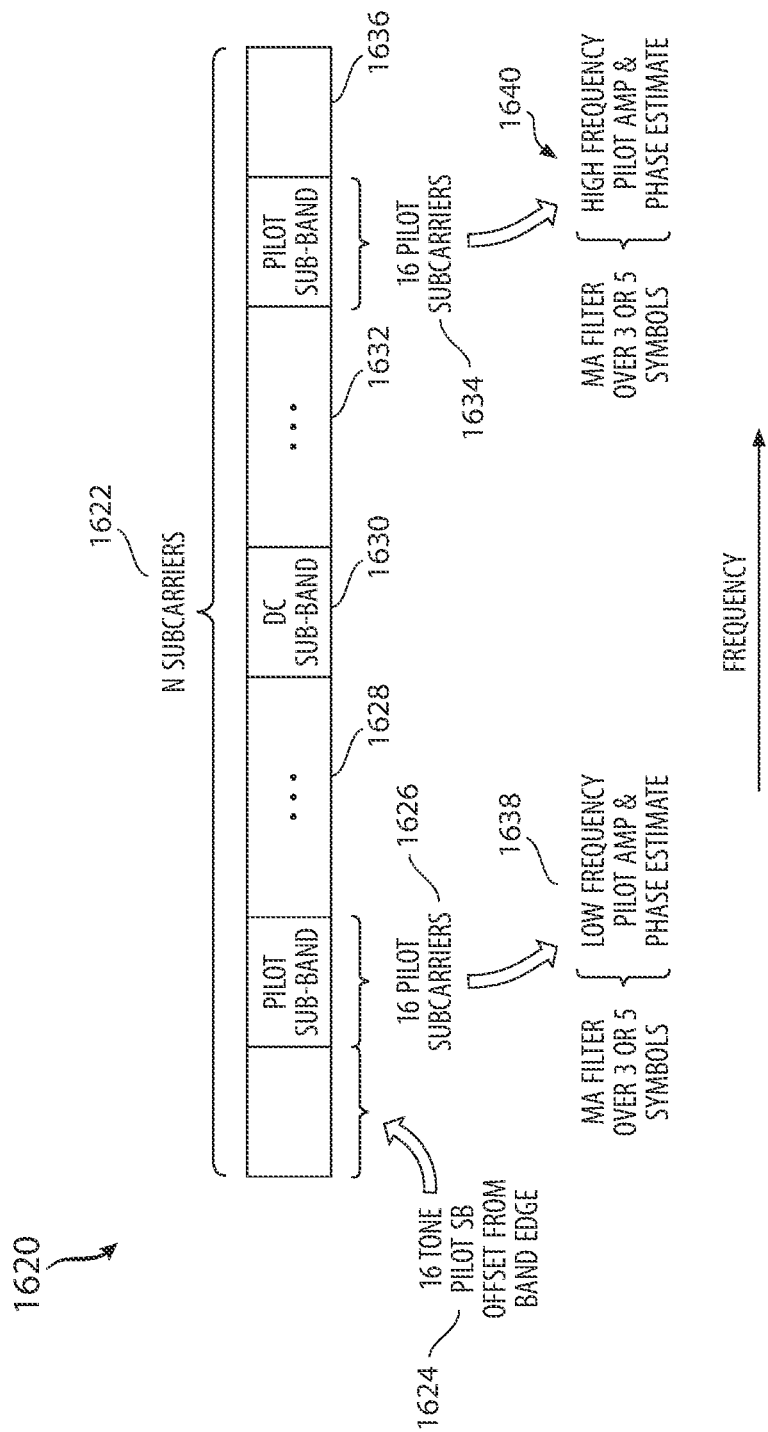
Figure 17:
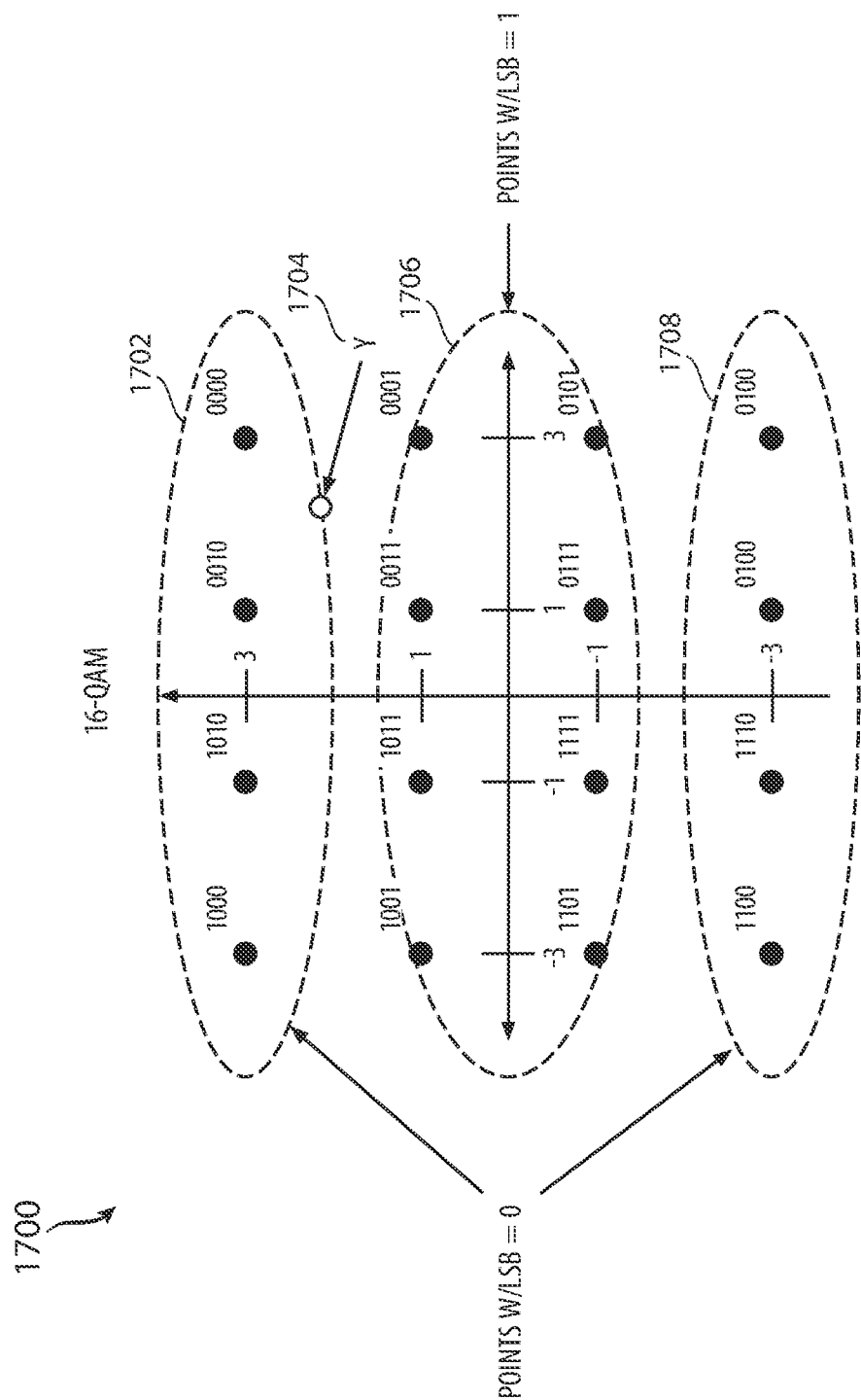
Figure 18:
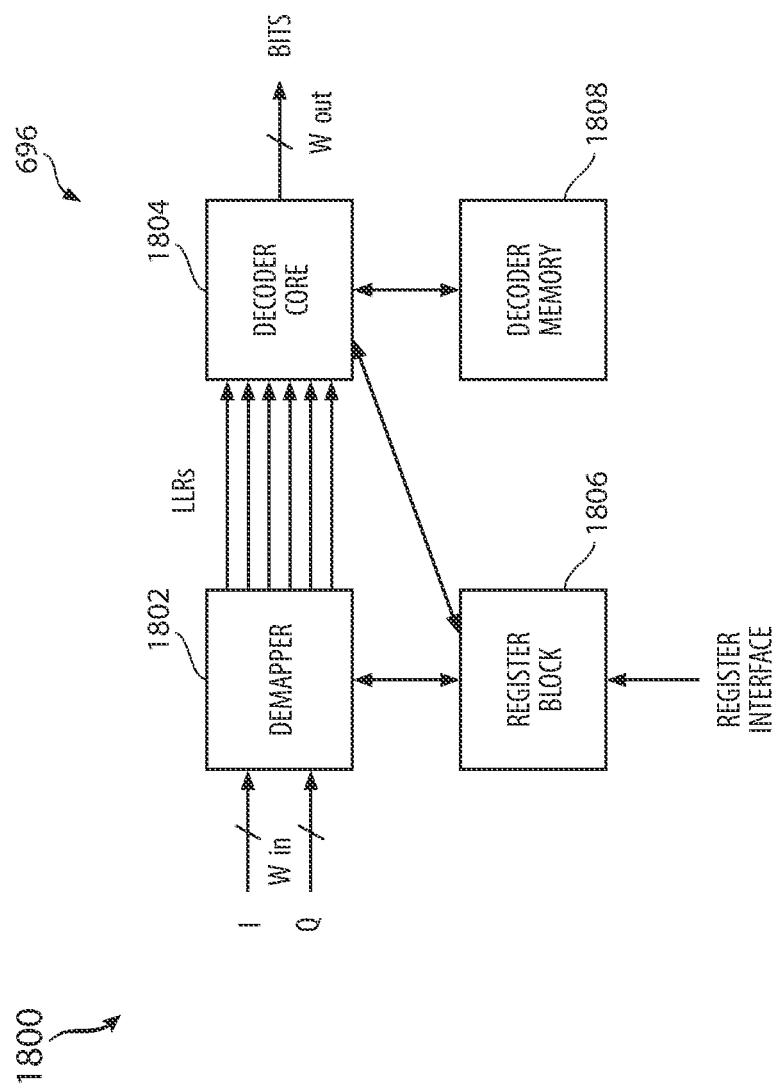
Figure 19:
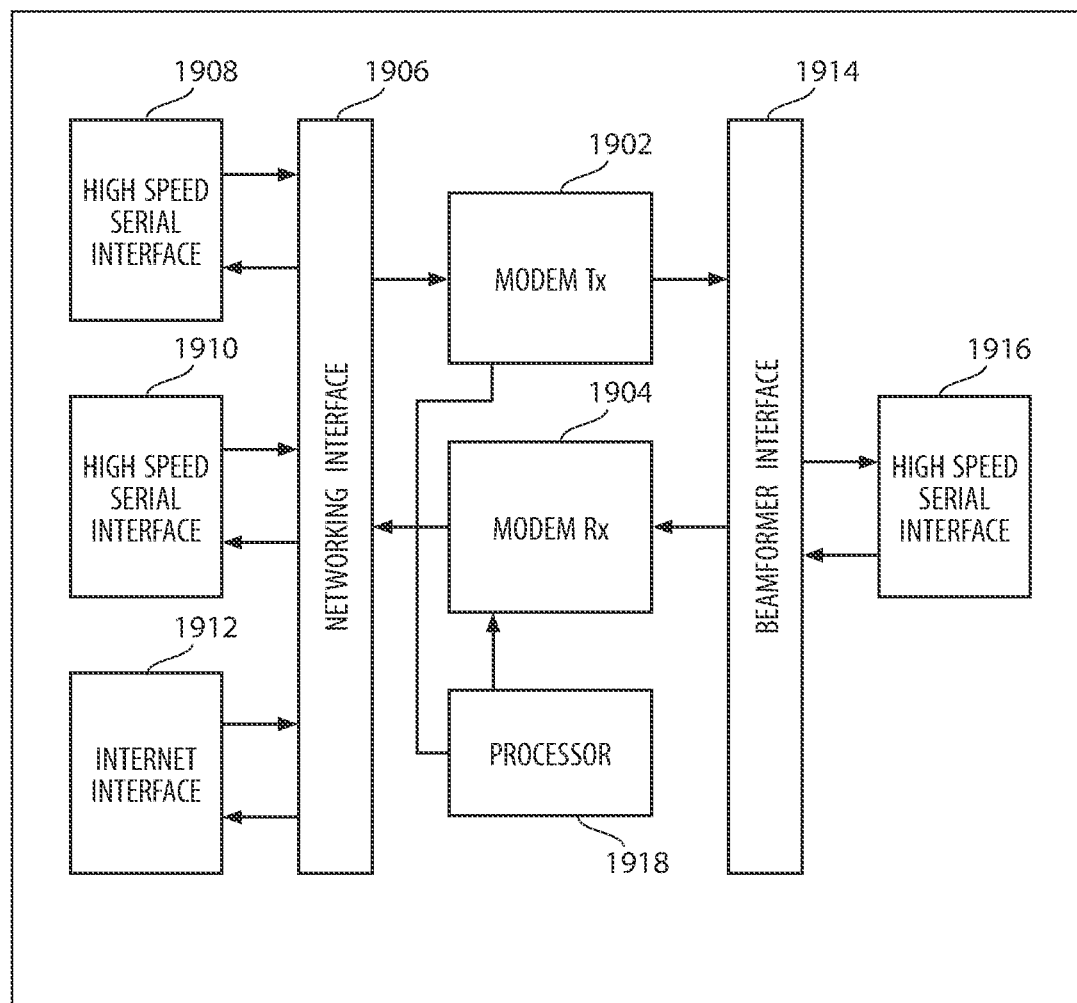
Figure 20:
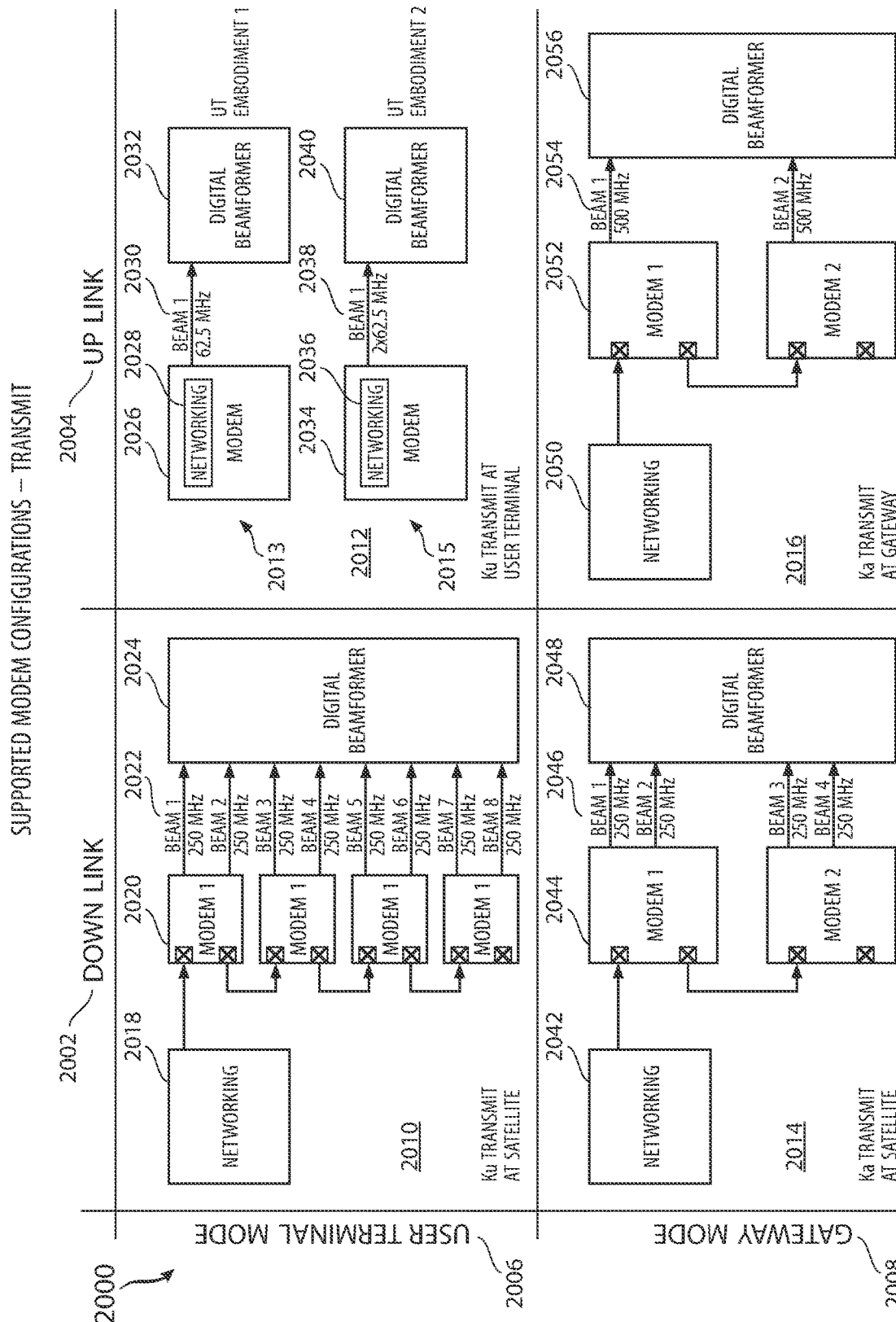
Figure 21:
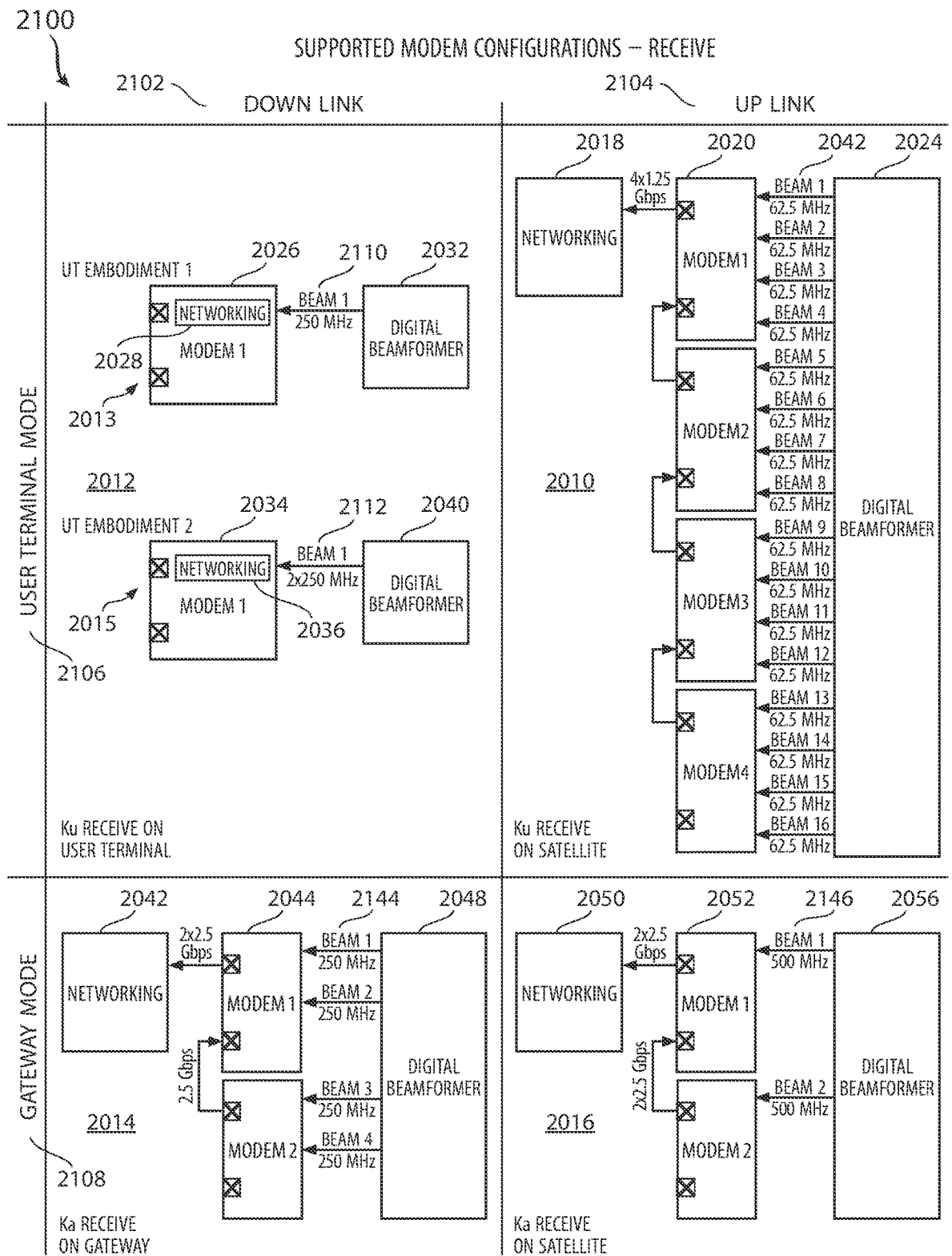
Figure 23A:
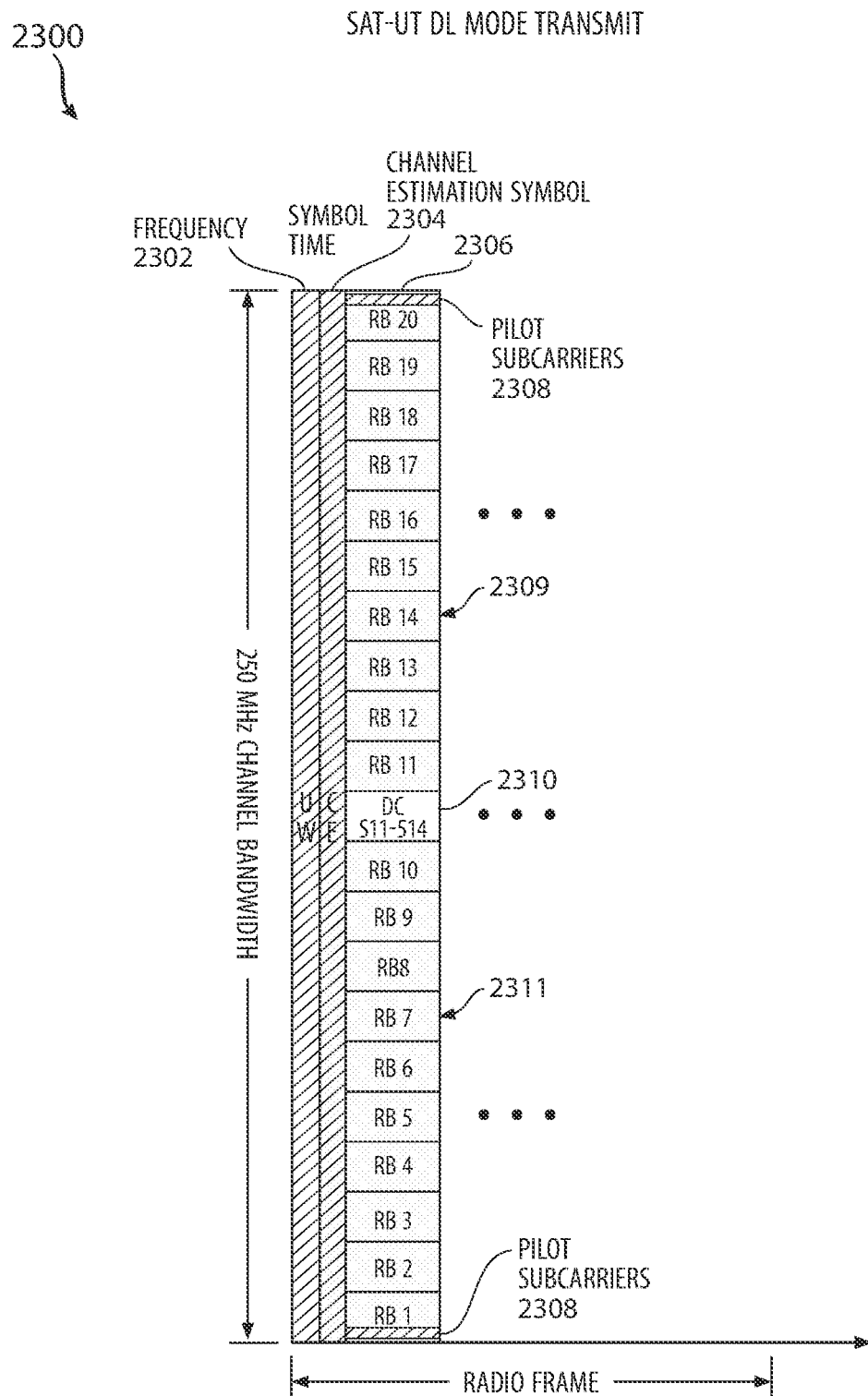
Figure 23B:
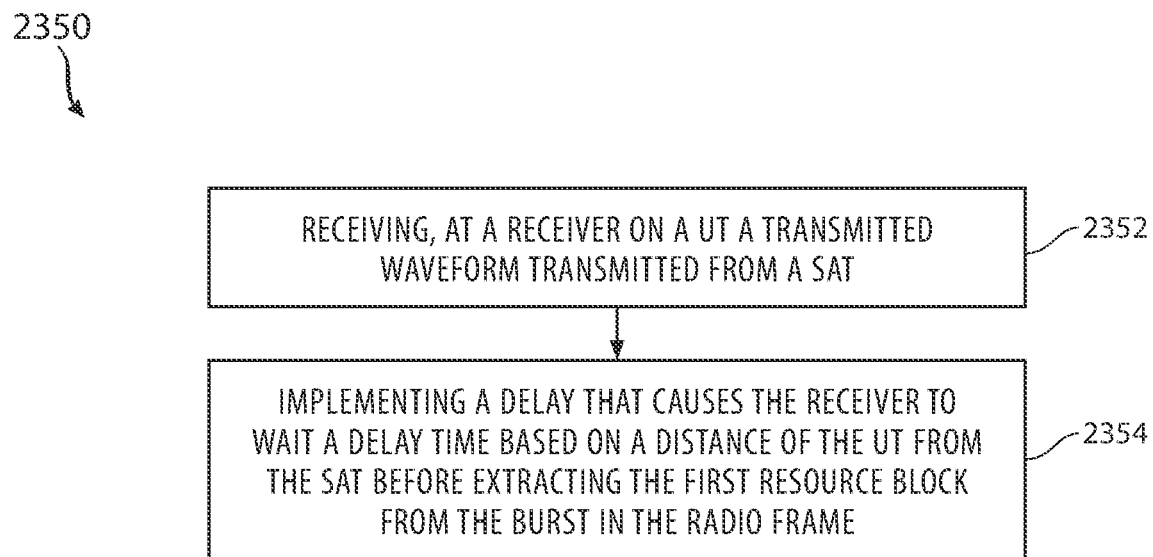
Figure 23C:
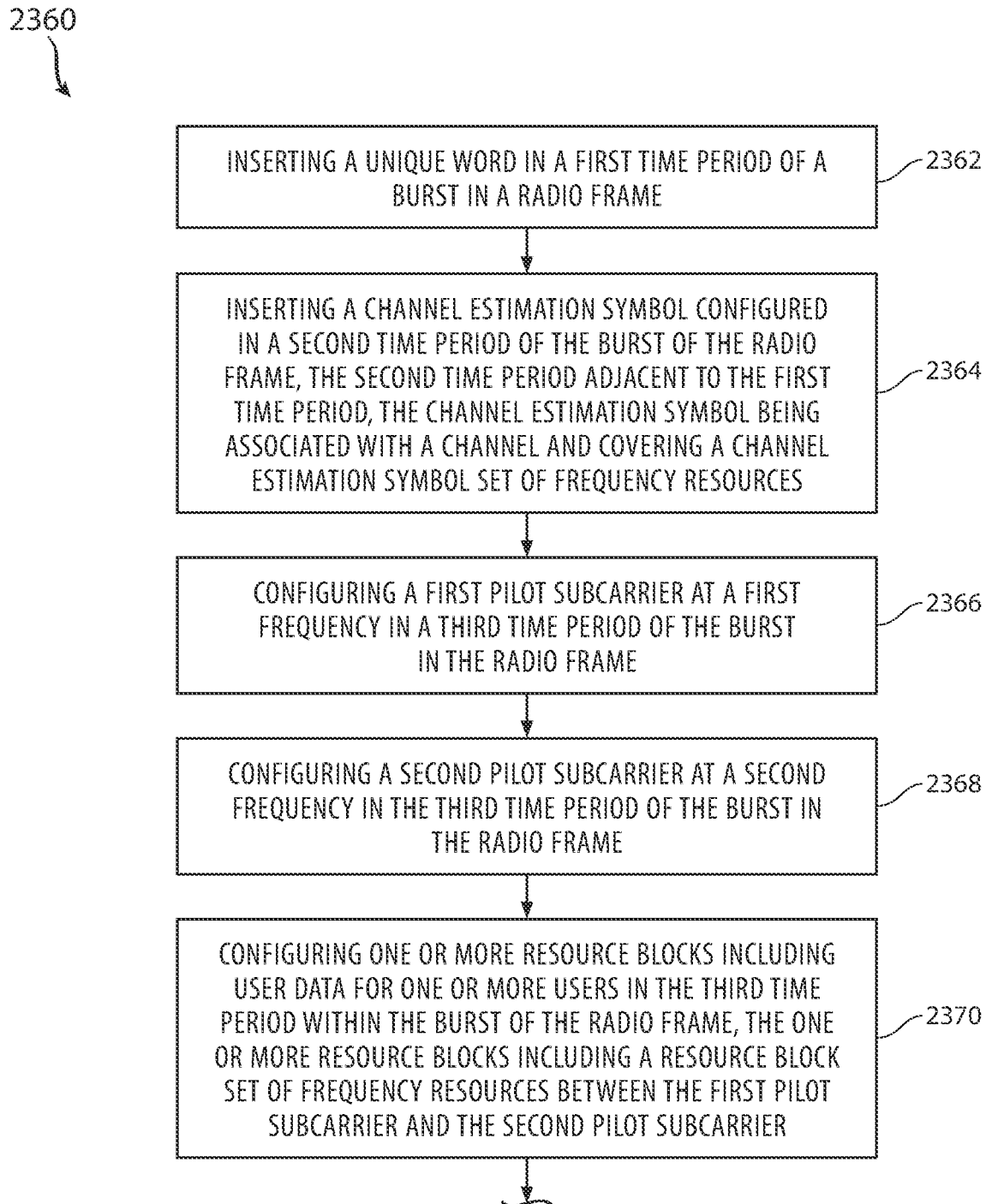
Figure 23C:
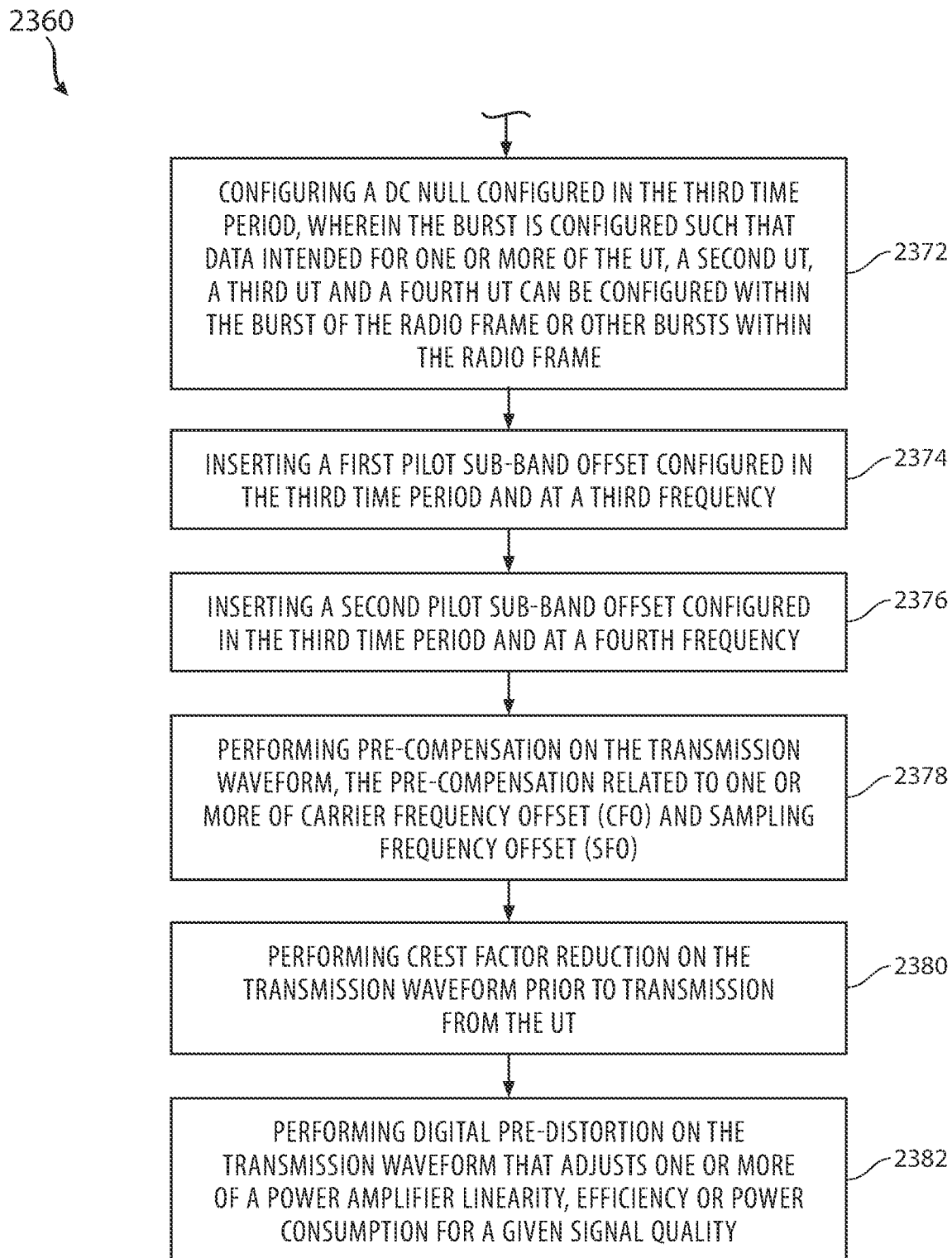
Figure 24A:
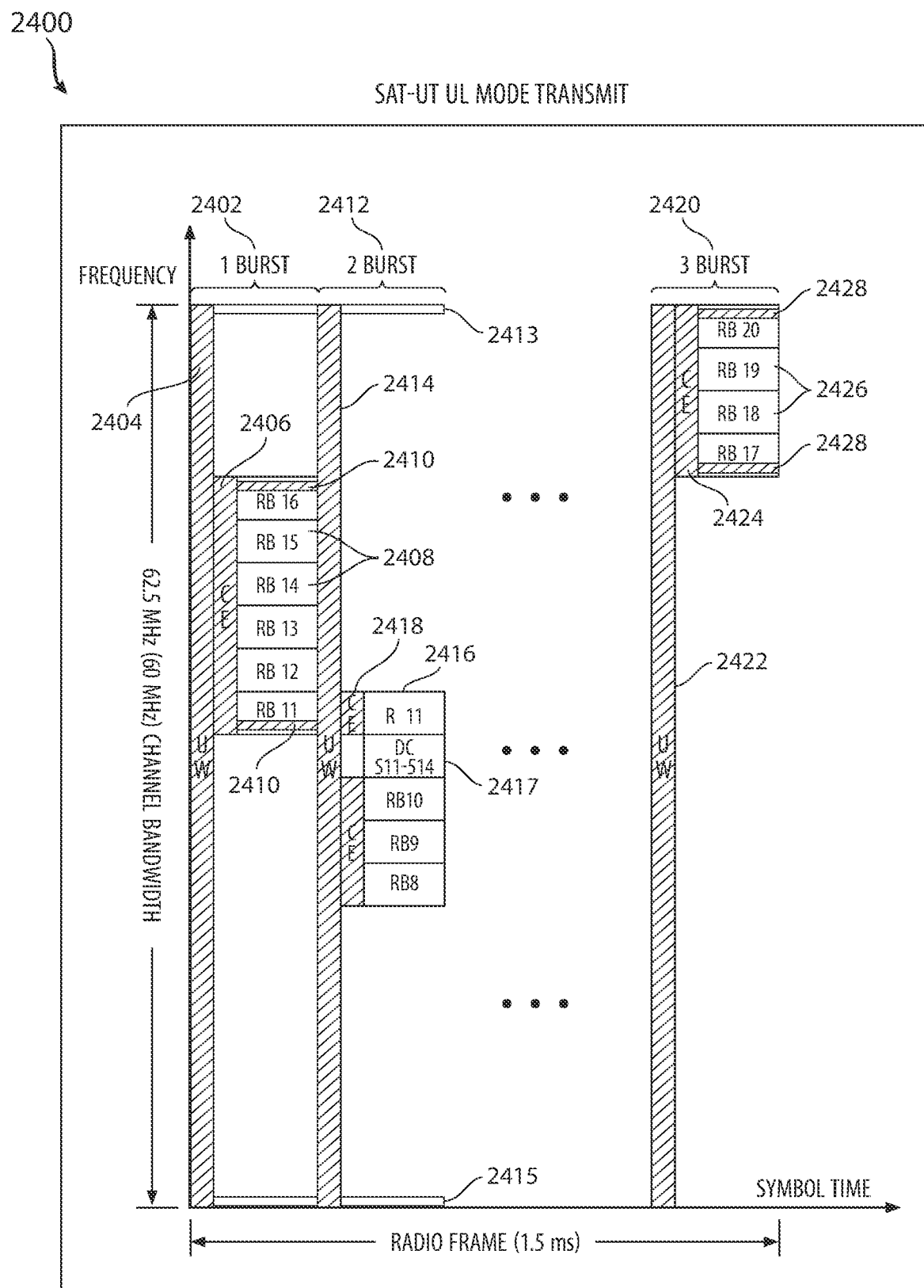
Figure 24B:
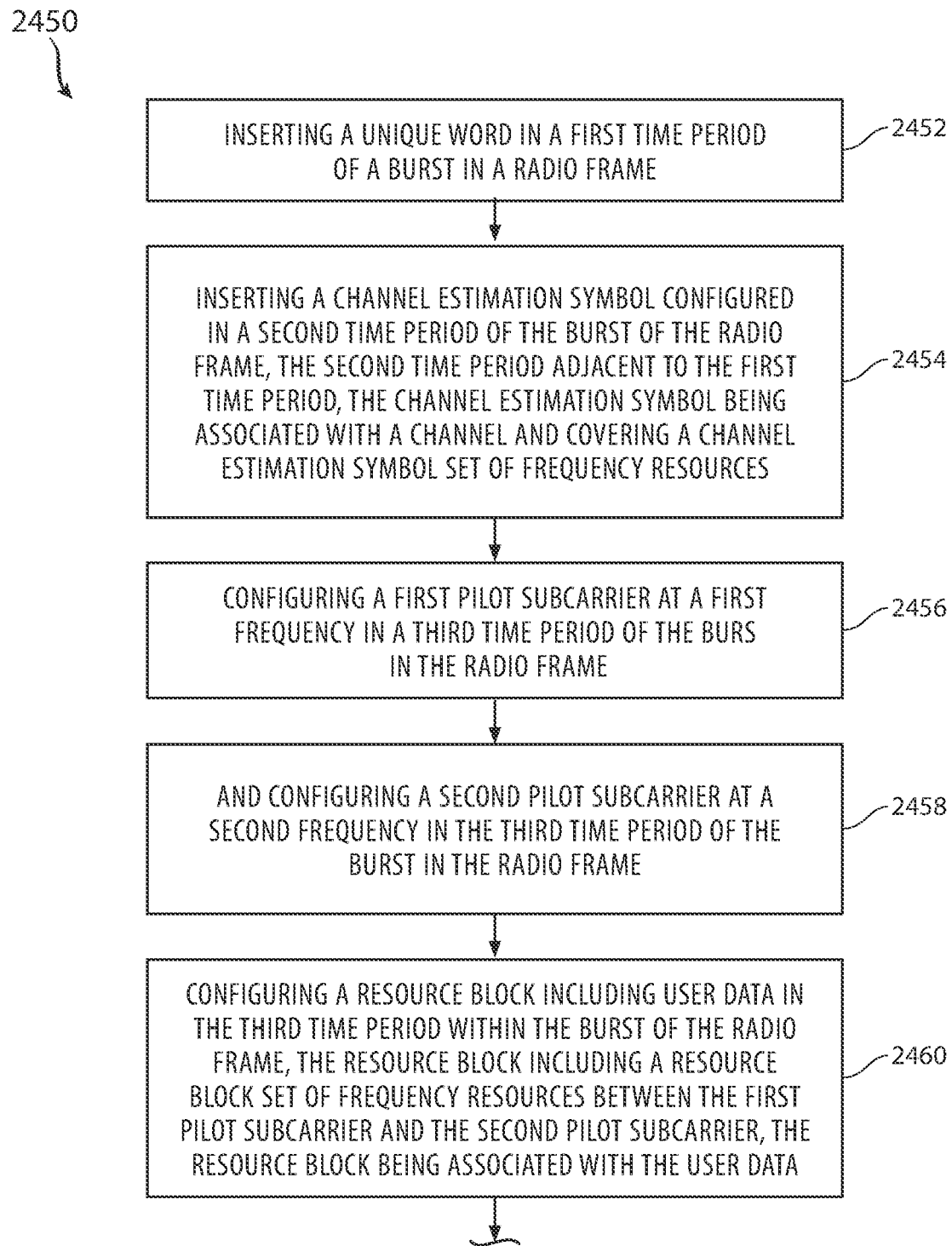
Figure 24B:
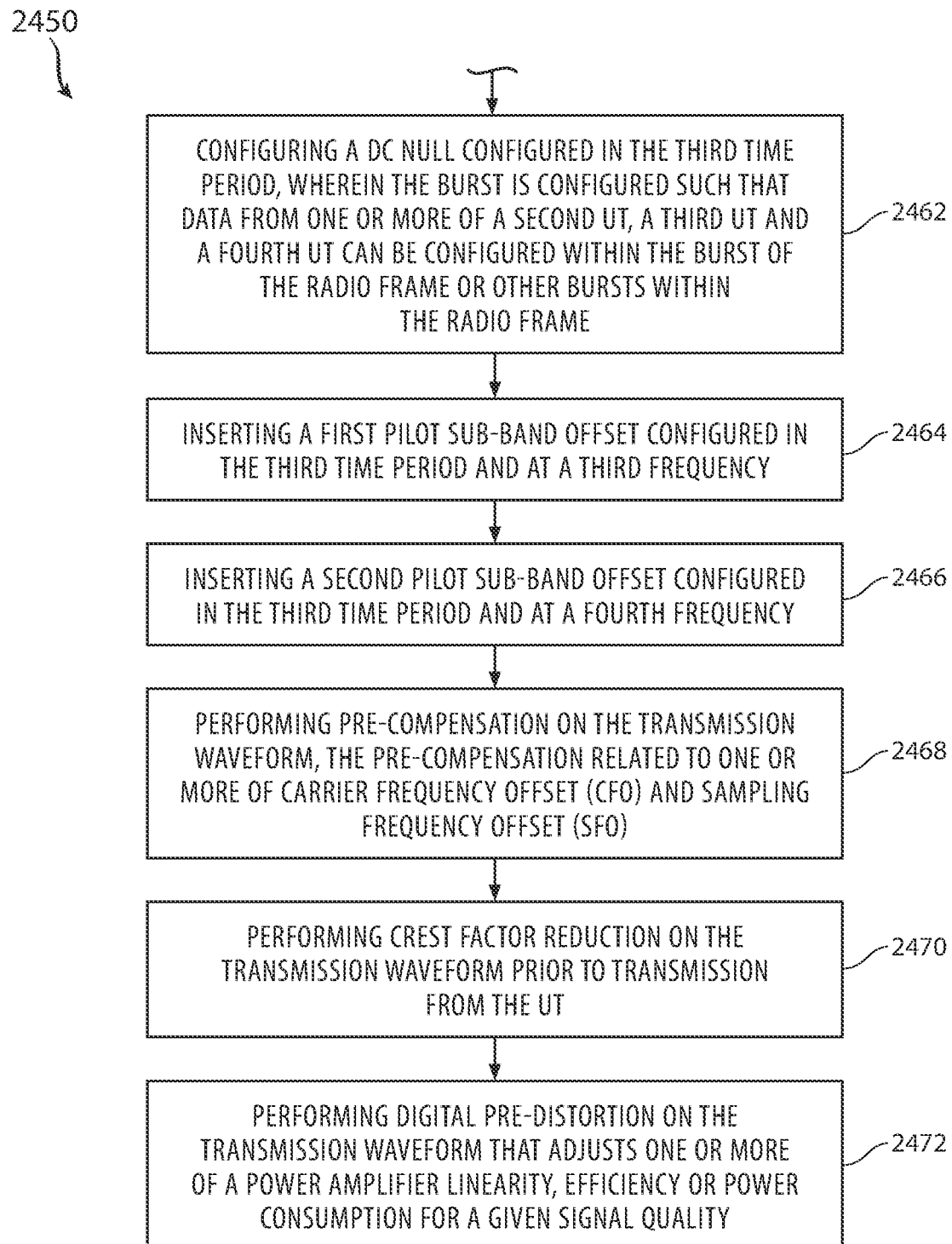
Figure 25:
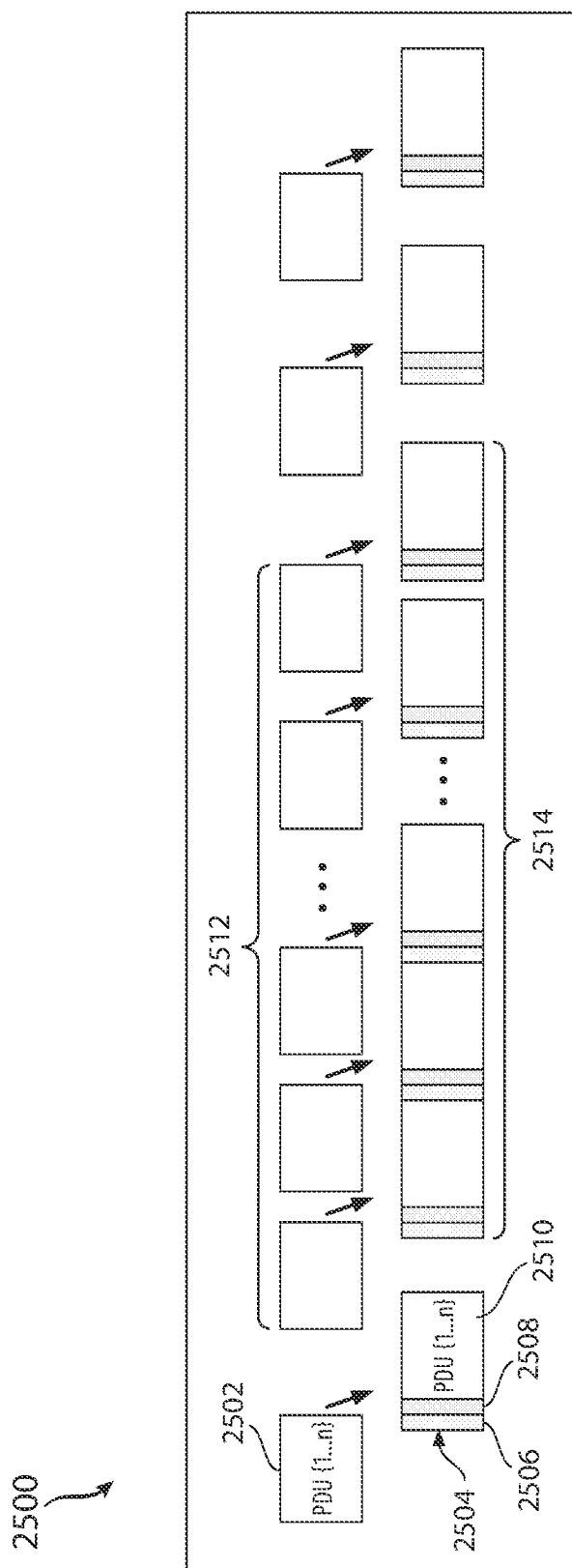
Figure 26A:
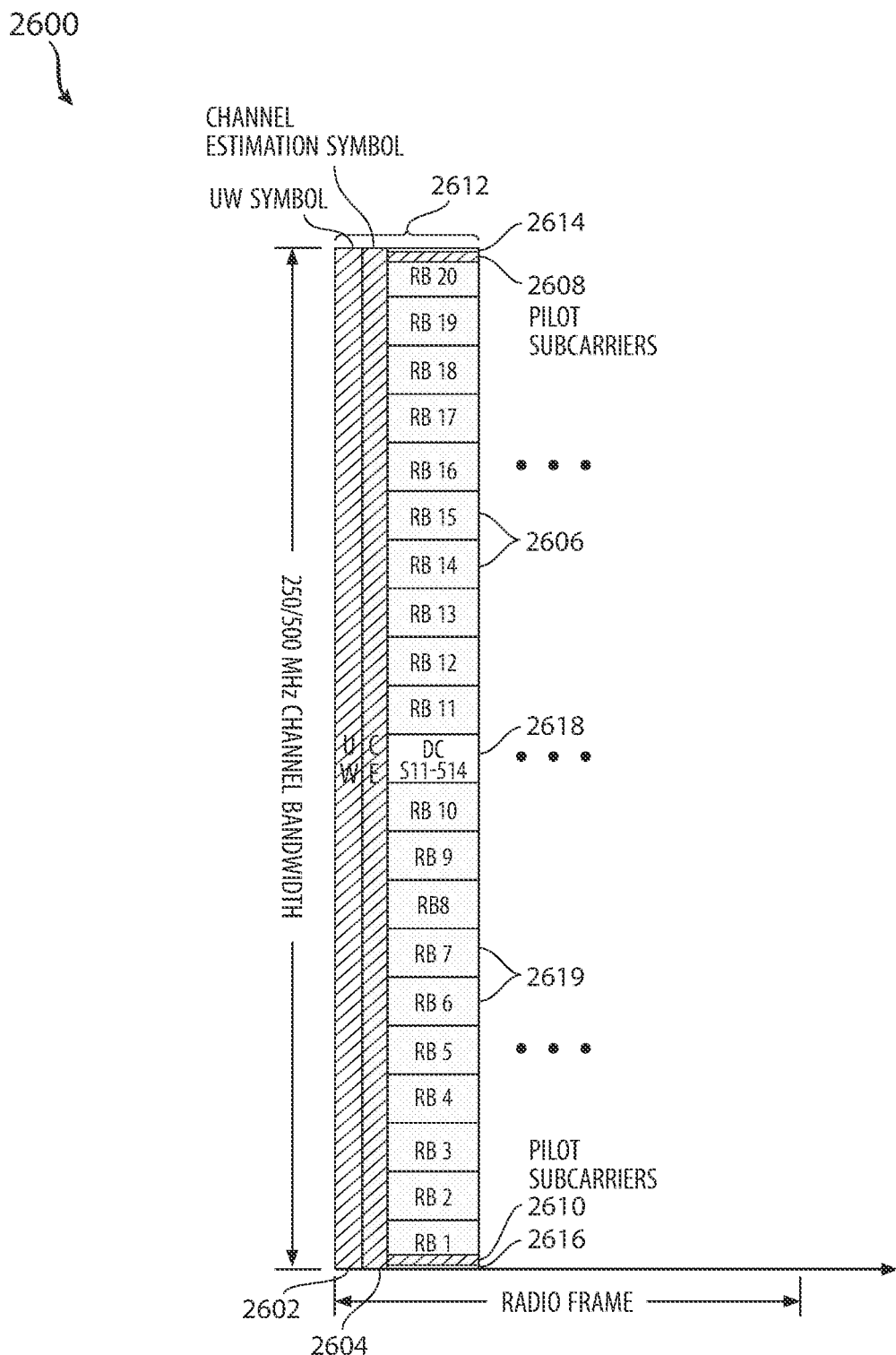
Figure 26B:
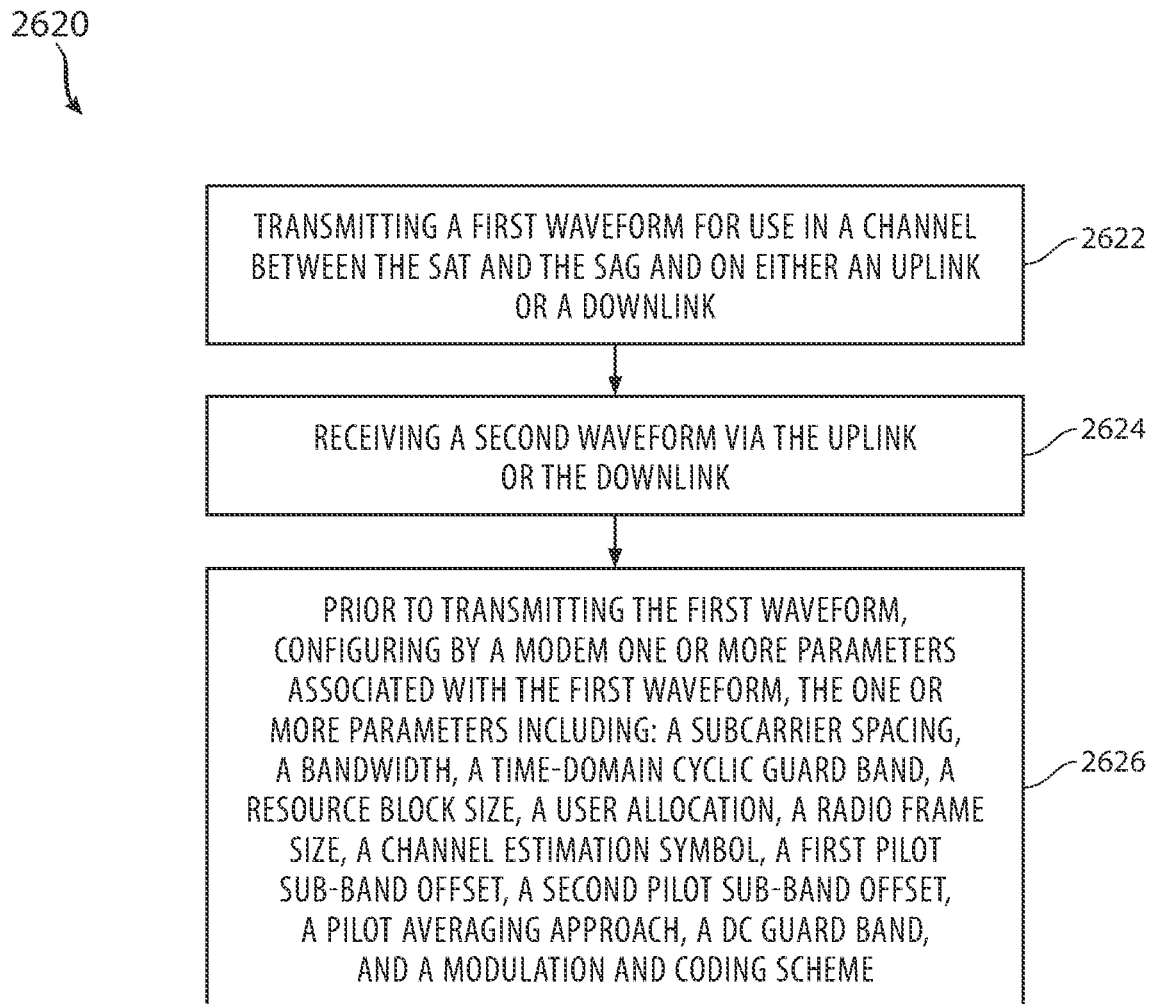
Figure 26C:
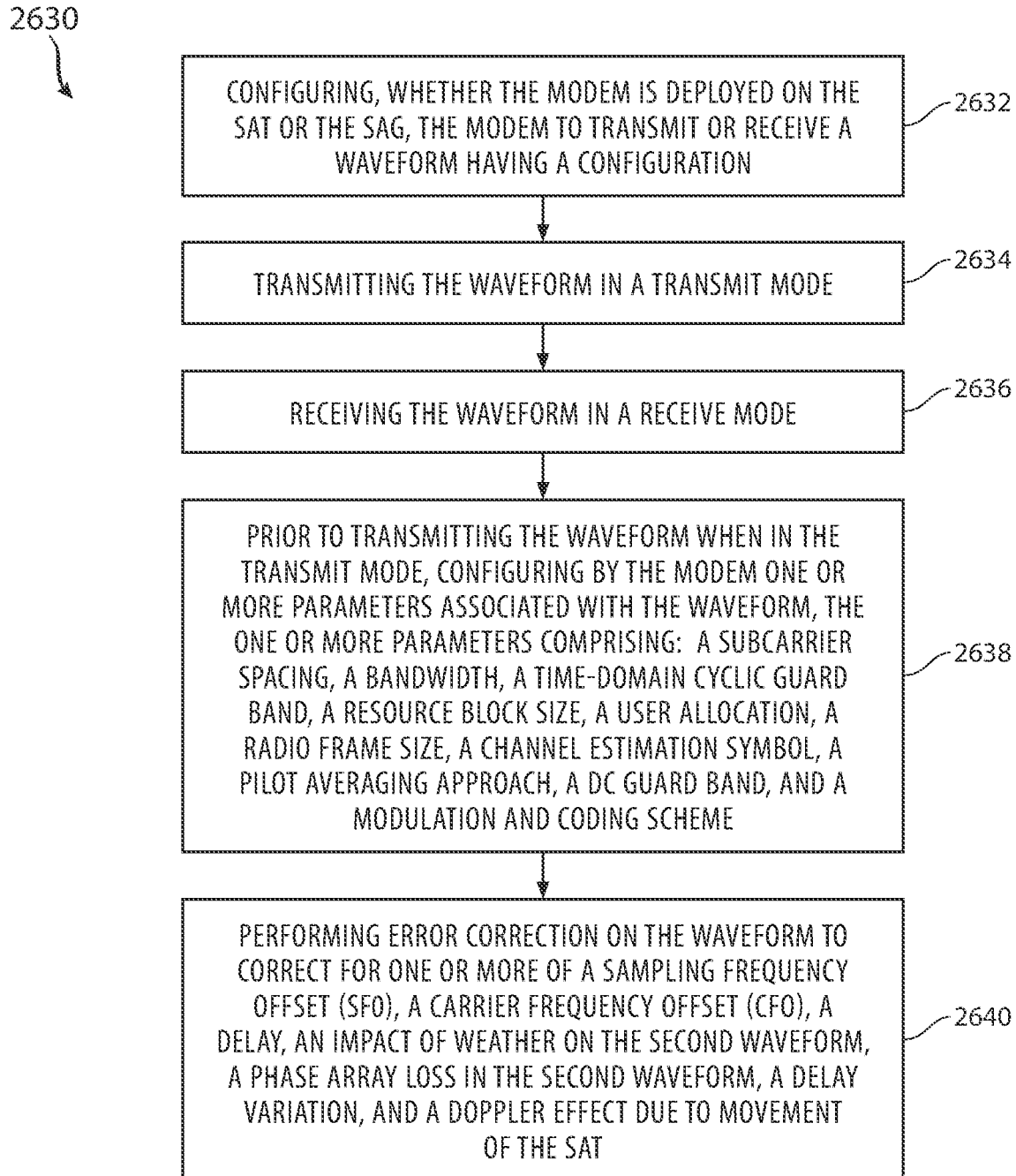
Figure 27:
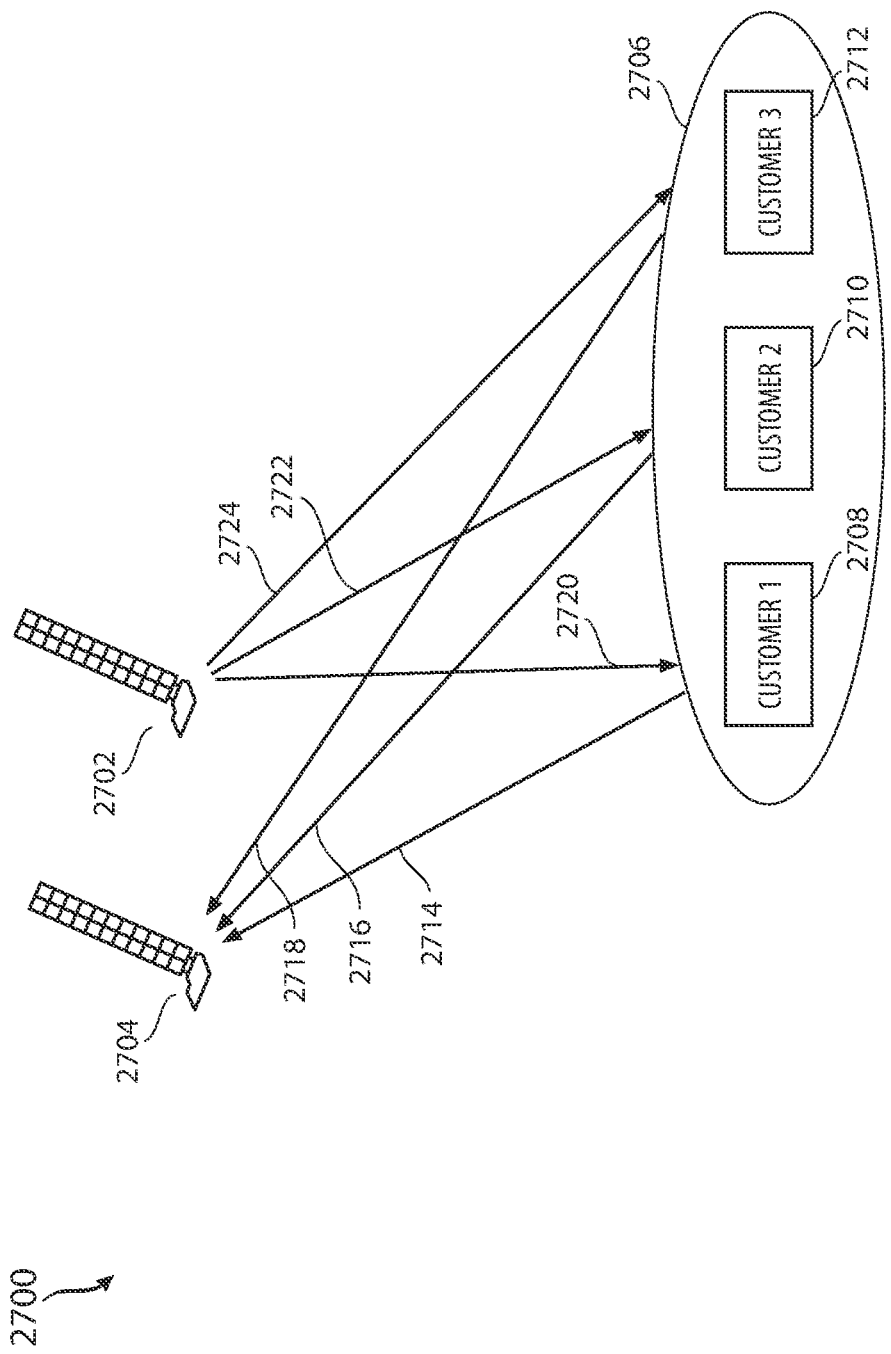
Figure 28:
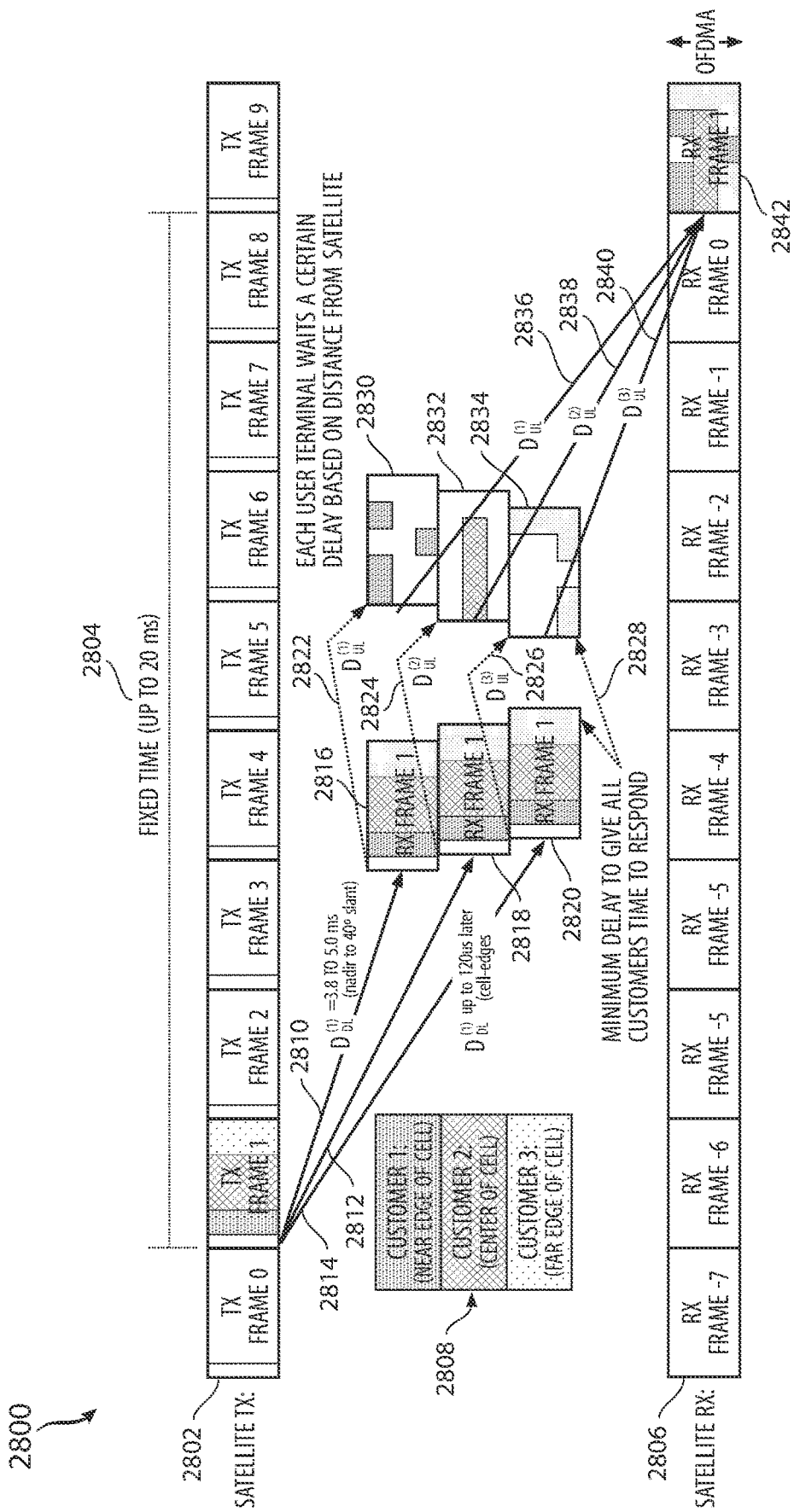
Figure 29:
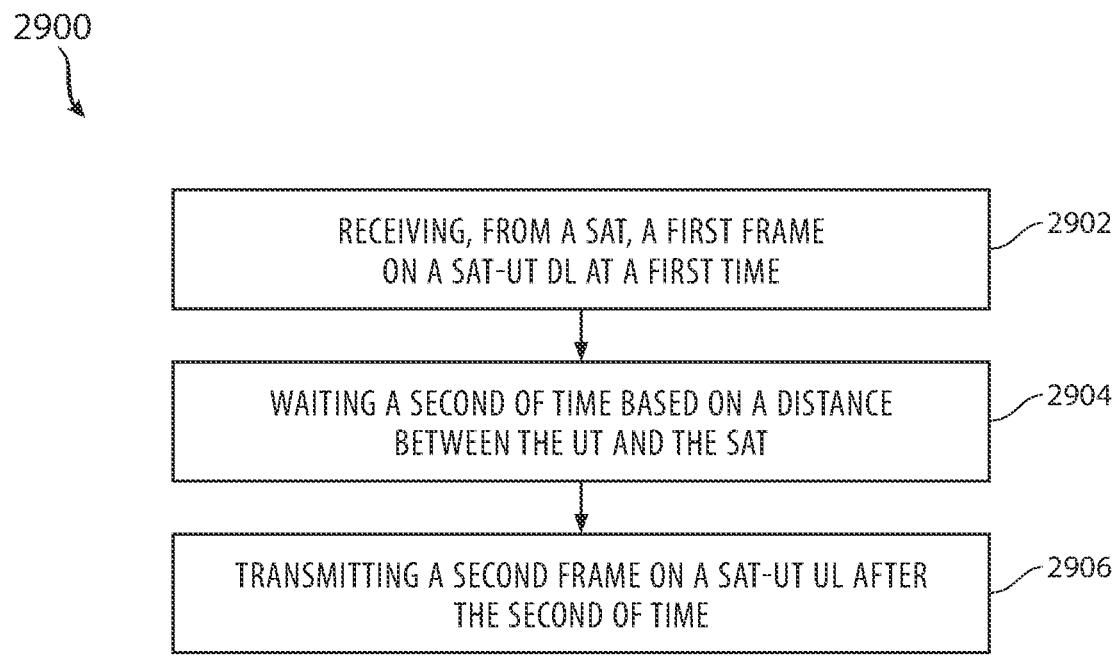
Figure 30:
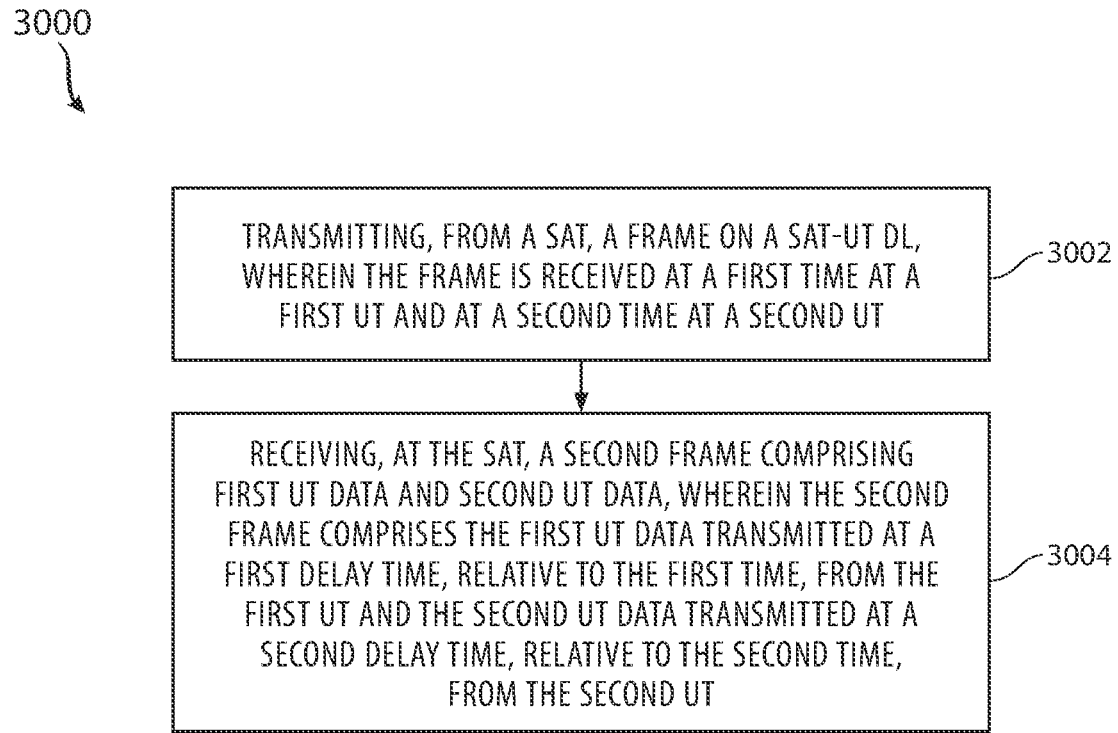
Figure 31:
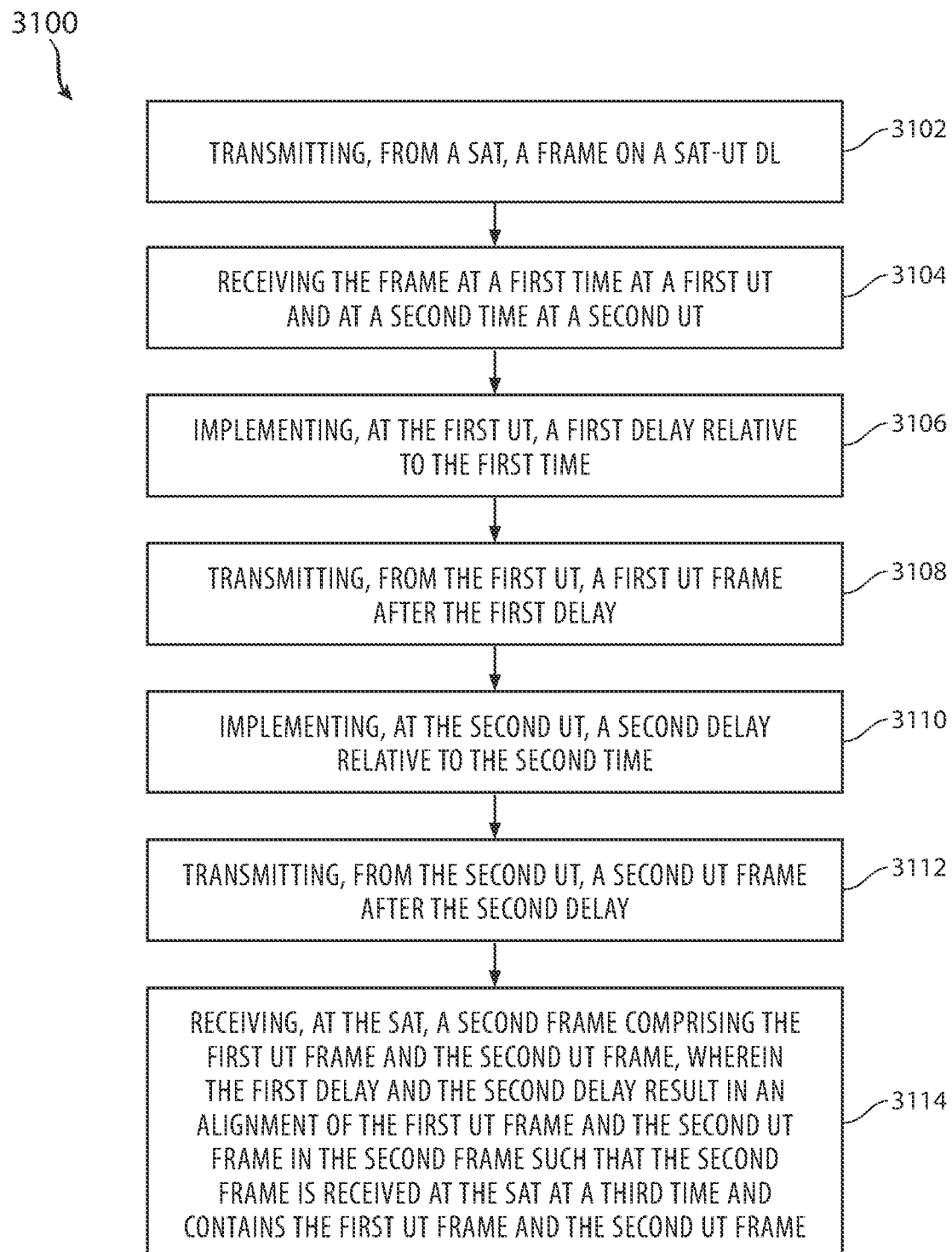
Figure 32:
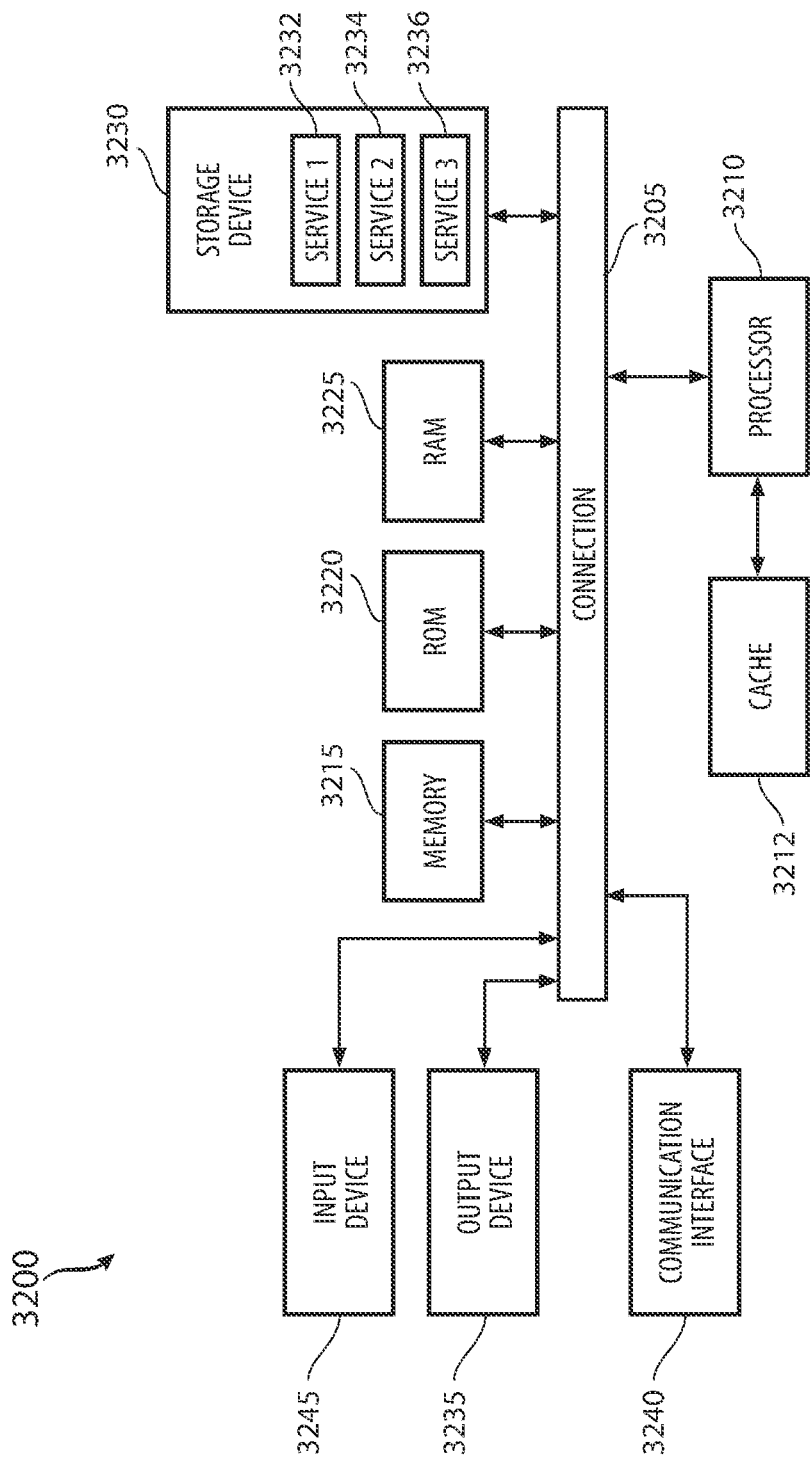

The FIG. 13 series of FIGS. 13A-13F illustrates various block diagrams and schematics describing burst detection and synchronization processes;

The FIG. 14 series of FIGS. 14A-14C illustrates a burst detection process in further detail;

FIG. 15 illustrates a block diagram of processing channel estimation symbols;

FIG. 16A illustrates a pilot subcarrier processing block diagram;

FIG. 16B illustrates further the pilot subcarrier processing;

FIG. 17 illustrates an example calculation for a log-likelihood ratio calculation for 16 QAM bit 0000;

FIG. 18 illustrates a LDPC (low-density parity-check) decoder structure;

FIG. 19 illustrates a block diagram overview of a modem implemented as a system on a chip;

FIG. 20 illustrates supported modem configurations in a transmit mode;

FIG. 21 illustrates supported modem configurations in a receive mode;

FIG. 22 illustrates supported frequency bands in the various modes;

FIG. 23A illustrates a SAT-UT DL mode transmit radio frame;

FIG. 23B illustrates an example method embodiment for the SAT-UT DL;

FIG. 23C illustrates another method embodiment related to the SAT-UT downlink;

FIG. 24A illustrates a SAT-UT UL mode transmit radio frame;

FIG. 24B illustrates a method embodiment related to the SAT-UT UL;

FIG. 25 illustrates a gateway mode transmit process;

FIG. 26A illustrates gateway mode transmit radio frame;

FIG. 26B illustrates a method embodiment related to the SAT-SAG communication link for both UL and DL;

FIG. 26C illustrates a method embodiment related to the SAT-SAG communication link for both UL and DL;

FIG. 27 illustrates a time synchronization issue with satellite to user terminal communications;

FIG. 28 illustrates the timing adjustments made for satellite to user terminal communications;

FIG. 29 illustrates an example method of transmitting data on a UT-SAT UL channel;

FIG. 30 illustrates an example method of transmitting data on a SAT-UT DL channel;

FIG. 31 illustrates an example method of transmitting data with steps performed by both a SAT and one or more UTs; and FIG. 32 illustrates a computer system that can be implemented with other aspects of the present disclosure.

DESCRIPTION OF EXAMPLE EMBODIMENTS

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

As noted above, the signal characteristics for uplink (UL) or downlink (DL) signal transmission between a satellite (SAT) and a user terminal (UT) and/or a satellite access gateway (SAG) can differ. Each node in the network must generate signals for transmission and receive signals for processing and for further transmission. In one aspect, there are multiple separated UTs in a region on Earth that desire to communicate data to a SAT, and there are Doppler effects as the distance for the signals to travel is large (often over 500 km) and the SAT is moving at high speeds such as 7.8 km/sec. Furthermore, each UT in a region will be a different distance from the SAT, which can cause a DL radio frame from the SAT having data for multiple UTs to physically arrive at the respective UTs at different times. Thus, there is a delay issue that arises in this context that is greater than a typical cellular communication on Earth because the distances are much larger than normal cellular communications. Other errors arise in communications between a UT, SAT and SAG such as various types of offsets, delays, timing issues, and so forth that if not remedied, can preclude clean and efficient communication between various nodes in satellite wireless communication systems.

It would be advantageous to implement a wireless communication system using the same signal or waveform format which is configurable or flexible for use by the various nodes of the system (e.g., SAT, UT, SAG), for UL and DL communications. The waveform should be configurable for a variety of bandwidths, correction for errors in communication, and be adaptable for different UL and DL requirements. The new configurable waveform can be implemented via a new modem which can be configured for flexibility and to enable the selection of different modes which can generate or process the respective necessary waveform depending on its application or mode.

The new modem can provide good spectral efficiency over a wide range of signal-to-noise ratios (SNRs), and/or can handle single and multiple user data. Furthermore, the modem can also provide for error correction for a number of issues that are particular to communication in the satellite communication system. As shall be explained herein, the disclosed modem can also compensate for issues such as sampling frequency offset (SFO), carrier frequency offset (CFO), delay or error due to weather conditions or loss due to characteristics of a phase array, and so forth. The SFO is caused by a mismatch in sampling frequencies which could be caused by differences between a local reference oscillator on a transmitter and a local reference oscillator on a receiver and/or mismatch caused by Doppler. The CFO occurs when the carrier frequency from the transmitter does not match the carrier frequency at the receiver, which could also be caused by differences between a local reference oscillator on a transmitter and a local reference oscillator on a receiver and/or mismatch caused by Doppler. The compensation for these and other errors can occur digitally in part by a transmitter of the modem prior to signal transmission and in some cases in part by a receiver of the modem that receives a signal.

The various embodiments disclosed herein will include a first embodiment for a general modem 500 that is configurable and used in each node of the satellite communication system 100, a second embodiment for the UT-SAT UL channel and its characteristics and a third embodiment covering the SAT-UT DL channel and its characteristics. A fourth embodiment focuses on the SAT—SAG UL and DL channels and the characteristics of these two channels. Other embodiments can be applicable as well within the scope of this disclosure.

The modem disclosed herein provides for the ability to configure a waveform with respect to one or more of a bandwidth, a number of pilots subcarriers, a number of channel estimation symbols, a cyclic prefix and postfix value, a unique word choice, a DC null, a burst length, an antenna delay adjustment, a carrier frequency, one or more pilot sub-band offset tones, a characteristic of a radio frame, and so forth. These various values and configurable parameters will be described more fully herein. Generally, this disclosure will introduce a number of different embodiments related to how to configure a radio frame, how to compensate for different types of error, what bandwidth to use, and other configurable parameters.

Figure 1:
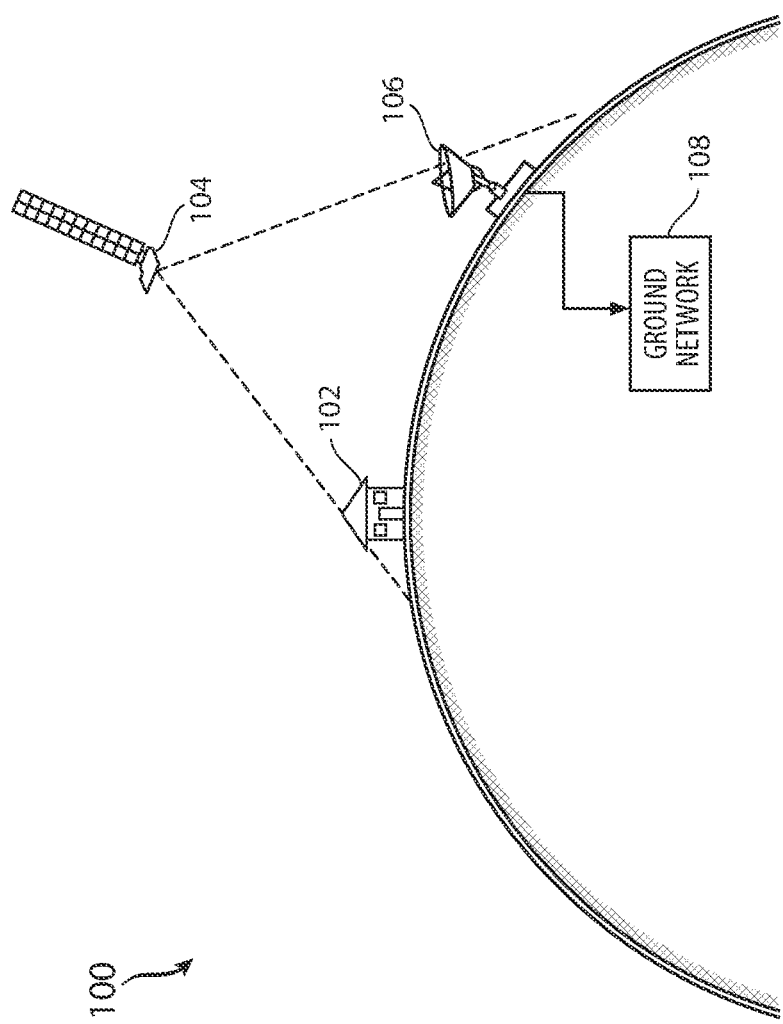
FIG. 1 illustrates a not-to-scale schematic view of an example of a satellite communication system.
Figure 5:
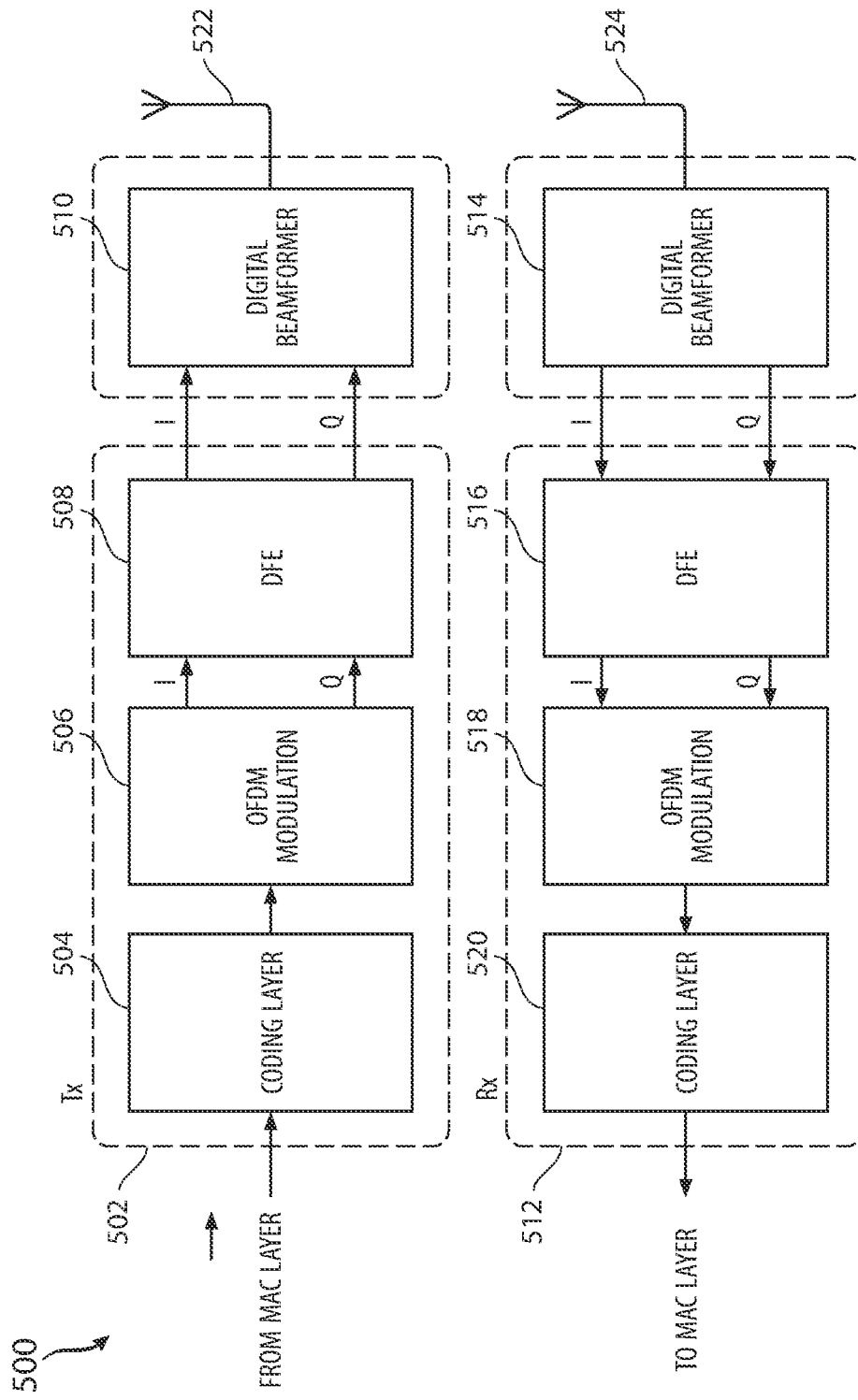
FIG. 5 illustrates a block diagram of OFDM communication to and from the MAC layer of the Open Systems Interconnection Model.
Figure 6A:
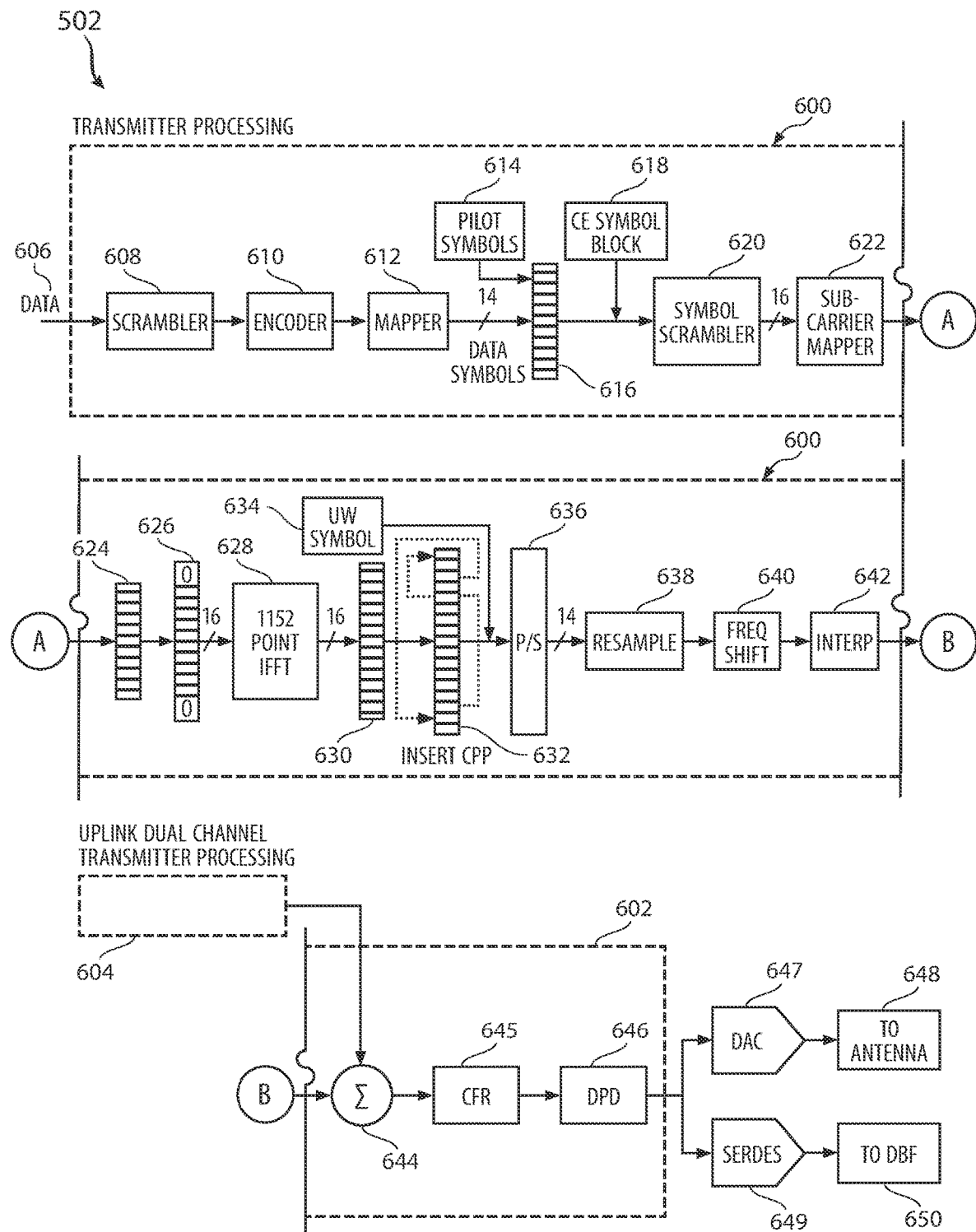
FIG. 6A illustrates example transmitter processing and components for a transmitter.
Figure 6B:
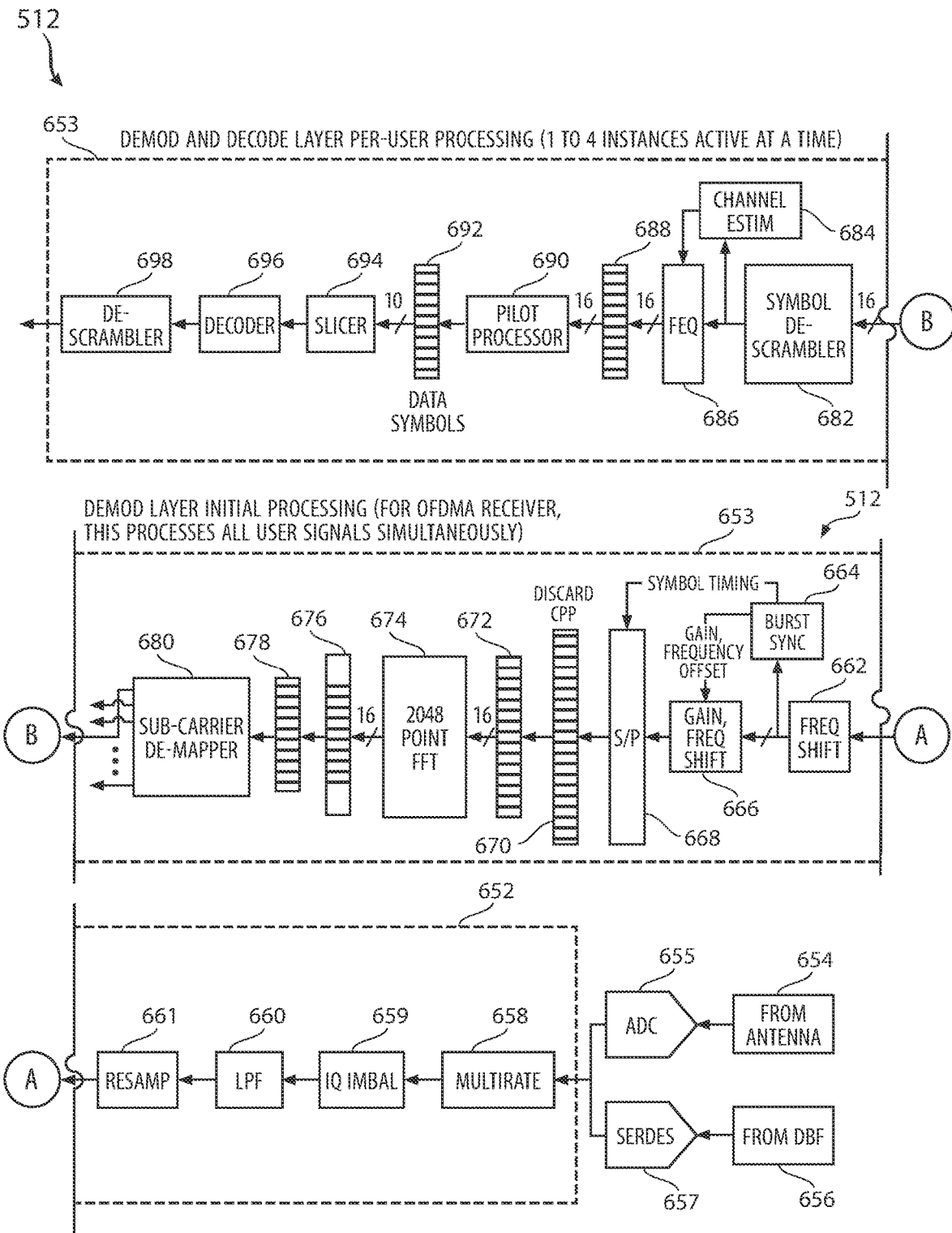
FIG. 6B illustrates example receiver processing and components for a receiver.

FIG. 1 illustrates a general satellite communication system 100 with the basic nodes including a user terminal (UT) 102, a satellite (SAT) 104 and a satellite access gateway (SAG) 106. A first embodiment covers a general modem that can be configurable in any of the UT 102, the SAT 104, or the SAG 106 and enable the transmission and reception of waveforms as needed for the respective application and furthermore to perform pre-transmission or post-reception waveform compensation for error correction of various types. FIG. 5 illustrates a modem 500 having a transmitter 502 and a receiver 512. FIGS. 6A and 6B illustrates in more detail the transmitter 502 and the receiver 512 and the various components used for signal processing in each case.

Another embodiment will cover the modem 500 and methods of providing communication between a UT 102 and a SAT 104 on the uplink (UL). The UL involves communications from the UT 102 (or multiple UTs) to the SAT 104. Multiple UTs 102 that simultaneously communicate with the SAT 104 will combine their respective user data into a single radio frame over the air interface which is then received by the SAT 104. The UT-SAT UL has some specific characteristics that differ from communication between a SAT 104 and a SAG 106, discussed below.

Figure 10:
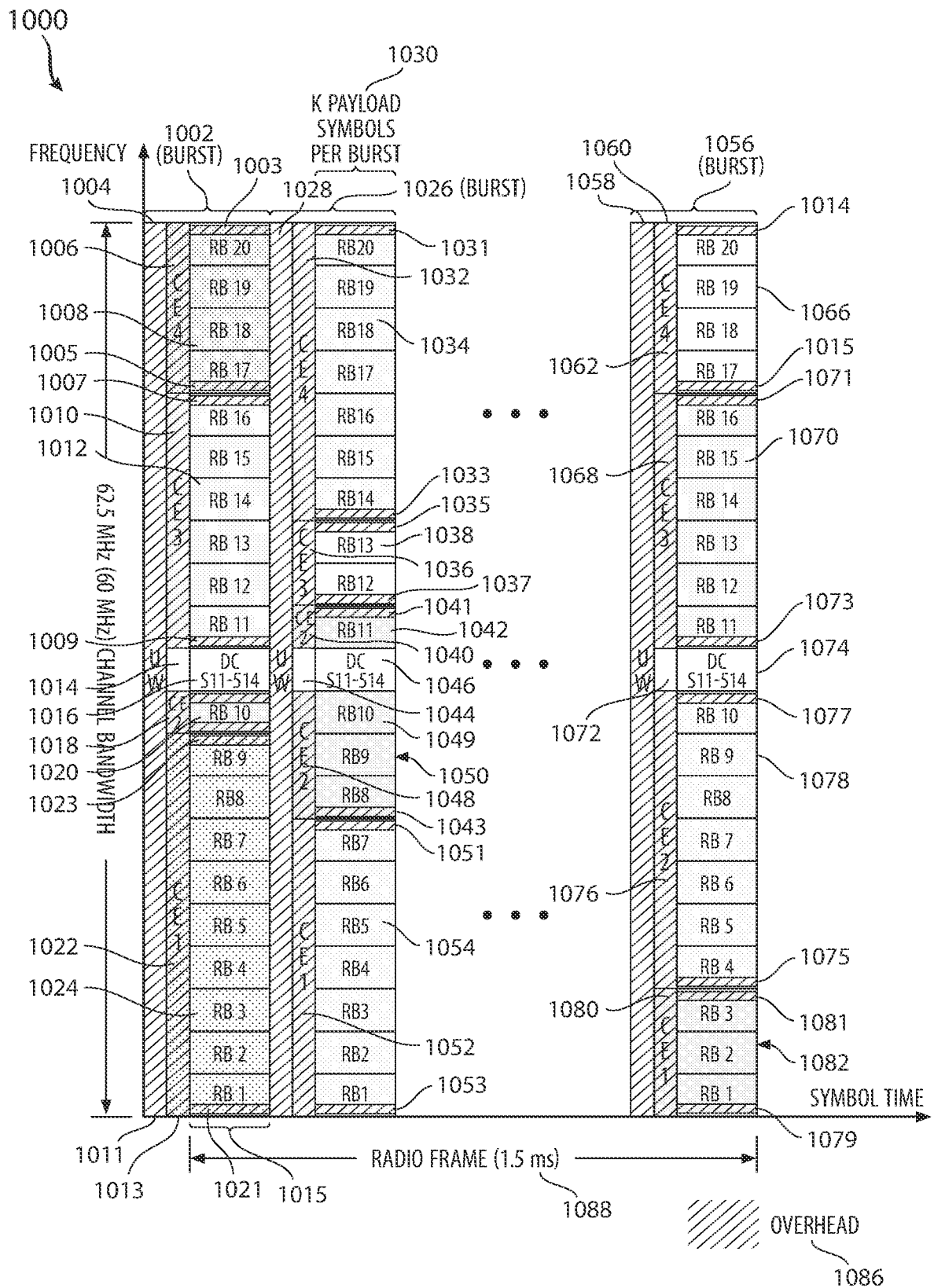
FIG. 10 a radio frame structure.

Another embodiment focuses on the SAT-UT downlink (DL) in which data is transmitted from the SAT 104 down to one or more UTs and the characteristics and configurable parameters for that communication channel. FIG. 10 illustrates a radio frame structure 1000 for the UT-SAT UL channel. FIG. 23A illustrates the SAT-UT DL channel radio frame structure 2300.

Another embodiment will focus on both the UL and the DL for the communication channel between the SAT and the SAG. The radio frame structure of this communication channel is generally similar on the UL and the DL as seen in FIG. 10, although different bandwidths are used. FIG. 26A illustrates the radio frame structure 2600 for the UL and DL on the SAT-SAG channel. The SAT-SAG channel is a point-to-point channel and thus there is no issue with multiple SAG 106 nodes simultaneously communicating with the SAT 104.

This disclosure also includes details regarding specific components in the modem 500. Embodiments of the present disclosure can be further defined by any aspect of this disclosure and all the components are provided generally by way of example and can be used together or integrated into a single system on a chip or processor board.

Embodiments of the present disclosure are directed to a modem physical structure and programming that enables the same modem to be deployed in any node of the satellite communication system or network 100 shown in FIG. 1. Systems are currently being deployed to provide communication via constellations of satellites. FIG. 1 is a not-to-scale schematic diagram that illustrates an example of communication in such a satellite communication system 100. The UT 102 is installed at a house, a business, a vehicle, or another location where it is desired to obtain communication access via a network of satellites. A communication path is established between the UT 102 and the SAT 104. The SAT 104, in turn, establishes a communication path with the SAG 106.

Each node in the satellite communication system 100 can include a copy or duplicate modem which is possible because of the integration in the modem of various components that previously were separately produced. This disclosure will introduce various components and concepts for apparatuses and methods that relate to waveforms and components to generate, transmit, receive, and process such signals or waveforms. These and other aspects of the present disclosure will be more fully described below.

The solution disclosed herein provides an improvement to the traditional approach of deploying modems 500 on individual nodes of the satellite communication system or network 100 to handle the characteristics of the specific communication channels between nodes and furthermore to provide compensation for various type of errors which can inhibit or degrade the signal quality.

The signal characteristics for UT 102 or SAG 106 to SAT 102 UL communications or SAT 104 to UT 102 or SAG 106 DL communications can differ. Each node in the network must generate signals for transmission and receive signals for processing and for further transmission. The UT-SAT UL for example is unique. For efficiency, the signals (data) from multiple separated UTs 102 in a region on Earth that desire to transmit data to the SAT 104 is combined into a single radio frame over the air interface that will be described herein in more detail. See, for example, FIG. 10 for a radio frame structure having date from multiple UTs 102. There are Doppler effects as the distance for the signals to travel is large (often over 500 km) and the SAT 104 is moving with a relative ground velocity of 7.8 km/sec. Frequency errors and timing errors arise in communications between the UT 102, the SAT 104 and the SAG 106. Such errors can include offsets, delays, timing issues, and so forth that if not remedied, can preclude clean and efficient communication between various nodes in the satellite wireless communication system 100.

It would be advantageous to implement a wireless communication system using a modem which enables the programming of a configurable signal or waveform format for generation and use by the various nodes of the system (e.g., SAT 104, UT 102, SAG 106) and for both the DL and UL communication channel. The different waveforms can also be configurable for a particular bandwidth in any mode. The configurable waveform can be implemented via the modem 500 which can be configured for flexibility and to enable the selection of different modes which can generate or process the respective necessary waveform depending on its application or mode. The modem 500 can provide good spectral efficiency over a wide range of signal-to-noise ratios (SNRs), and/or can handle single and multiple user data. Furthermore, the modem 500 can also provide for error correction for a number of issues that are particular to communication in the satellite communication system, including frequency-related errors, timing errors and Doppler effects on the signals.

This disclosure also includes details regarding specific components in the modem 500. In addition to the four primary embodiments introduced above, other embodiments of the present disclosure can be further defined by any aspect of this disclosure and all the components are provided generally by way of example and can be used together or integrated into a single system on a chip or processor board.

Returning to FIG. 1, each SAT 104 can have a number of different structures for communication. For example, each SAT 104 can have multiple phased array panels (not shown). A phase array panel is an electronically scanned array of antennas that create a beam of radio waves that can be electronically steered (not physically steered) to point in different directions. Each phase array panel can have one or more (16 in one example) modems 500 or chips for managing the transmission/reception of radio waves to and from other nodes. See exemplary modem chip in FIG. 5. Some modems 500 may be dedicated for transmission and other modems 500 may be dedicated to processing received signals. The antennas referenced herein can include parabolic antennas, phase array antennas, or other antenna configurations and the embodiments do not rely on any particular antenna structure. Any antenna structure can be used to transmit or receive signals on any of the bands described herein. For example, the SAT 104 can include one or more parabolic antennas (not shown) or phase array antennas for use in the Ka band (between 26.5 GHz and 40 GHz) for communication with the SAG 106. A modem board can have a number of modems 500 or chips to managing the communication of signals between the SAT 104 and the SAG 106.

Another antenna which can be a parabolic antenna, phase array antenna or other configuration can be used on the SAT 104 for communications in the Ku band (between 12 GHz and 18 GHz). One or more modems 500 can be associated with the Ku band antenna.

Firmware programmed into a computer processor (such as processor 1918 shown in FIG. 19) can be programmed to configure the modem 500 for each mode or application. For example, the firmware or computer program operating on a processor 1918 can be used to configure a modem or modems 500 on the SAT 104 to transmit the properly formatted waveform to the UT 102 or the SAG 106 on the DL. The firmware or computer program operating on the processor 1918 can be used to configure a modem or modems on the UT 102 or on the SAG 104 to transmit the properly formatted waveform to the SAT 104 on the UL. The SAG 106 also has at least one antenna, and a modem board configured with one or more modems 500 with firmware that configures the modems 500 with the proper frequencies and capabilities to communicate with the satellite. The modems 500 are all identical in each node and the firmware programmed into the processor is used to properly configure each modem 500.

In one example, a digital interface is provided in the modem 500 for passing information via high-speed SERDES (a serializer/deserializer) (shown in FIG. 6A as component 649) to digital phased arrays or hybrid digital-analog phased arrays. The SERDES 649 is a pair of functional blocks that compensate for limited input/output. The antennas 522, 524 generally represent any type of antenna, such as a parabolic antenna used on a SAG 106, or a phased array of antennas on a UT 102 or a SAT 104, or other types of antennas. When digital processing is used, a digital beam forming (DBF) phased array has a digital receiver/exciter at each element in the array. (See component 649, 650 in FIG. 6A). The UT 102, the SAT 104 and/or the SAG 106 can include an antenna array 522/524. The signal at each element of the array is digitized by individual ADCs, phase shifted, scaled and delayed, and summed digitally over a SERDES mesh component 649. This approach allows for multiple simultaneous co-frequency antenna beams to be formed and steered in different spatial directions depending on the choice of phases/delays.

Each UT 102 has at least one modem 500 that is configured for the UT 102. The modem 500 with the UT 102 will be configured to either transmit or receive in time. In one aspect, the transmission of signals and the reception of signals on the UT 102 is not performed simultaneously. In another aspect, the UT 102 can both transmit and receive simultaneously. Typically the communication between the SAT 104 and the SAG 106 can be configured for simultaneous transmission and reception.

The SAT 104 may establish a communication path with another satellite (not shown) prior to communication with the SAG 106. The SAG 106 is physically connected via fiber optic, Ethernet, or another physical or wireless connection to a ground network 108. The ground network 108 may be any type of network, including the Internet.

Figure 7:
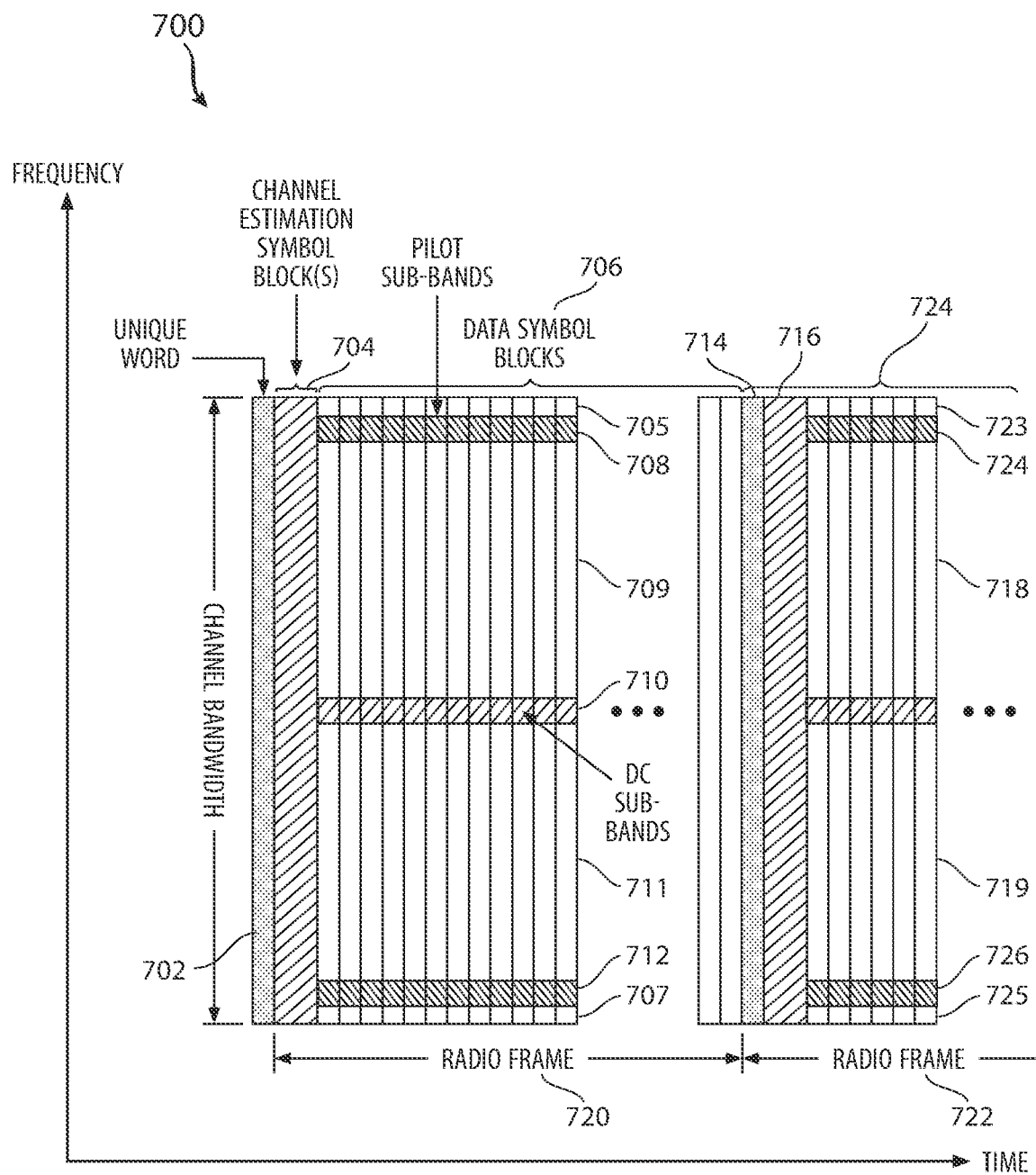
FIG. 7 illustrates an example radio frame structure.

Each of the SAT-UT DL channel and the UT-SAT UL channel can have particular characteristics with respect to a bandwidth used and a structure of radio frames used to carry user data on the respective channel. A radio frame is a set of frequencies across a period of time in which various data symbols are used to manage the identification of user data within the radio frame. FIG. 7 provides an introduction to the general radio frame structure that will be developed herein for the UL and DL channels between the different nodes in the satellite system 100.

In one example, the radio frames are structured using an orthogonal frequency-division multiplexing (OFDM) protocol in which digital data is encoded on multiple carrier frequencies. OFDM is a form of a frequency-division multiplexing (FDM) in which signals or channels are divided by frequency. In OFDM, multiple closely-spaced orthogonal subcarrier signals with overlapping spectra are transmitted to carry data in parallel. As noted above, FIG. 7 provides an introduction of an OFDM radio frame structure 700 with a time axis and a frequency axis. As will be disclosed herein, the modems 500 that are adaptable on each node (SAT 104, UT 102, SAG 106) can configure an OFDM waveform with such parameters as mentioned above. Other parameters are configurable as well such as the use of a pilot sub-band offset at the band edges. The purpose and use of these various parameters will be introduced throughout this disclosure. The modem 500 can also include built-in correction for Doppler sampling frequency offset (SFO), carrier frequency offset (CFO) or other timing error corrections that occur in the different communication channels of the satellite system 100. The details of these offsets and error correction will be developed more fully herein as well.

Each modem 500 can include a transmitter 502 and a receiver 512. The parameters described above and other parameters are configurable on one or both of the transmitter and the receiver of a respective modem 500 and enable the different types of channels to be implemented using the same chip on each node. Demodulation of received waveforms is based on fast Fourier transform (FFT) algorithms. FFT algorithms are understood by one of skill in the art to convert a signal from an original domain such as a time or space domain into a representation in a frequency domain. An inverse FFT performed the opposite conversion from the frequency domain to a time or space domain.

General Introduction of Different Embodiments

This disclosure covers different aspects of a new configurable modem 500 and the various waveform characteristics depending on the operational mode of the modem 500. As briefly introduced above, the first embodiment of this disclosure will focus on the modem 500 and the characteristics of the transmitter and the receiver that render the modem configurable for each node in the satellite system 100. FIGS. 5, 6A and 6B illustrate the modem 500, transmitter 502 and receiver 512 in the modem. This is the main embodiment that covers the hardware features of the modem 500.

The second embodiment will cover the modem 500 and configured waveforms for an UL communication from the UT 102 to the SAT 104 supporting the combination of up to four UTs 102 into a single radio frame over the air on the UL. The multi-user UL (MU-UL) channel has characteristics not at play in the SAT-SAG point-to-point channel. Thus, the differences in communication between the SAT 104, the UT 102 and the SAG 106 have certain characteristics and needs. The modem 500 discussed herein is configurable such that the same physical chip can be deployed at each of the UT 102, the SAT 104 and the SAG 106 and be able to both transmit and receive the properly configured waveform depending on whether the communication is on the UL, the DL or between any two particular nodes.

FIG. 10 illustrates the radio frame structure for the UT 102 to SAT 104 UL channel. Since the satellite is moving at a relative ground velocity of approximately 7.8 km/sec, Doppler issues arise in each communication channel that need to be addressed in ways that are not necessary in terrestrial cellular communication, where at most, a vehicle travels at typically no more than 70 or 80 miles per hour (0.036 km/sec) and a cell tower is at a fixed location. Furthermore, the carrier frequencies at Ku and Ka band are many times higher than most terrestrial systems, such that any Doppler produces a larger absolute carrier frequency offset. Furthermore, the distances between a respective UT 102 and a SAT 104 are much greater than in cellular communication. Different UTs 102 communicating with a SAT 104 can also have significant differences in the distance to the SAT 104, and thus delays need to be introduced in the communication channel to coordinate the UL and the DL for multiple UTs 102. FIGS. 27-28 discuss the delay introduced in signal processing to accommodate the variation in distance from respective UTs 102 to the SAT 104. The issues that therefore arise can include the delay just mentioned plus offsets in sampling frequency or carrier frequency, or other errors due to local oscillator error. These errors will be discussed in more detail as well as the components in the modem that are introduced to correct for such errors. FIGS. 24A-24B focus on the radio frame structure 2400 and a method of configuring the radio frame for a SAT-UT DL channel communication.

The third embodiment will cover the modem 500 and configured waveforms for the DL communication from the SAT 104 to the UT 102 taking into account the fact that the radio frame as generated by the SAT 104 for transmission will include respective groups of radio frames for each UT 102 in a group of UTs associated with the transmission. Each UT 102 receives the radio frame having some data for that UT 102 and other data intended for other UTs. The respective UT 102 extracts its data for processing. FIG. 23A illustrates the DL radio frame for the SAT-UT channel. FIGS. 23B-23C illustrate various methods associated with the DL features of the second embodiment.

The fourth embodiment will cover the modem 500 and radio frame structure for the SAT-SAG UL and DL channels. The radio frame structure for both the UL and the DL on the SAT 104 to SAG 106 channel is similar and therefore is covered together.

The SAT-SAG communication channel, whether UL or DL, also has particular characteristics and Doppler effects that need to be taken into account. The SAT-SAG channel typically is a point-to-point communication between the two nodes. The radio frame structure for both the UL and the DL in the SAT-SAG channel is similar and is shown in FIG. 26A. In contrast, the SAT-UT UL combines over the air interface data (or resource blocks) from 1 to 4 UTs 102 into the same radio frame that is then received at the SAT 104. The radio frame of the SAT-UT DL also contains data (upon transmission) for 1 to 4 UTs and each UT 102 has to be able to receive and process the radio frame and extract the resource blocks that are meant for the respective UT.

At the end of this disclosure and after FIG. 31, there is a discussion of further details related to how protocol data units (PDUs) and radio frames are configured for each of the second-fourth embodiments.

While the disclosure general focuses on these four embodiments, it is noted that there are many other embodiments which could be claimed. For example, any set of one or more of the components in FIG. 6A or 6B, or any other figure, could be combined in a modem, transmitter and/or receiver and defined as an embodiment or example system or method. All the individual concepts are described as example features of the modem 500 and could be combined to arrive at a claimed system or method. As noted above, one concept is that the modem 500 is configurable and so the disclosure provides many examples of features or functionality that could be configured by the processor and operable on any node of the satellite communication system 100.

Figure 2:
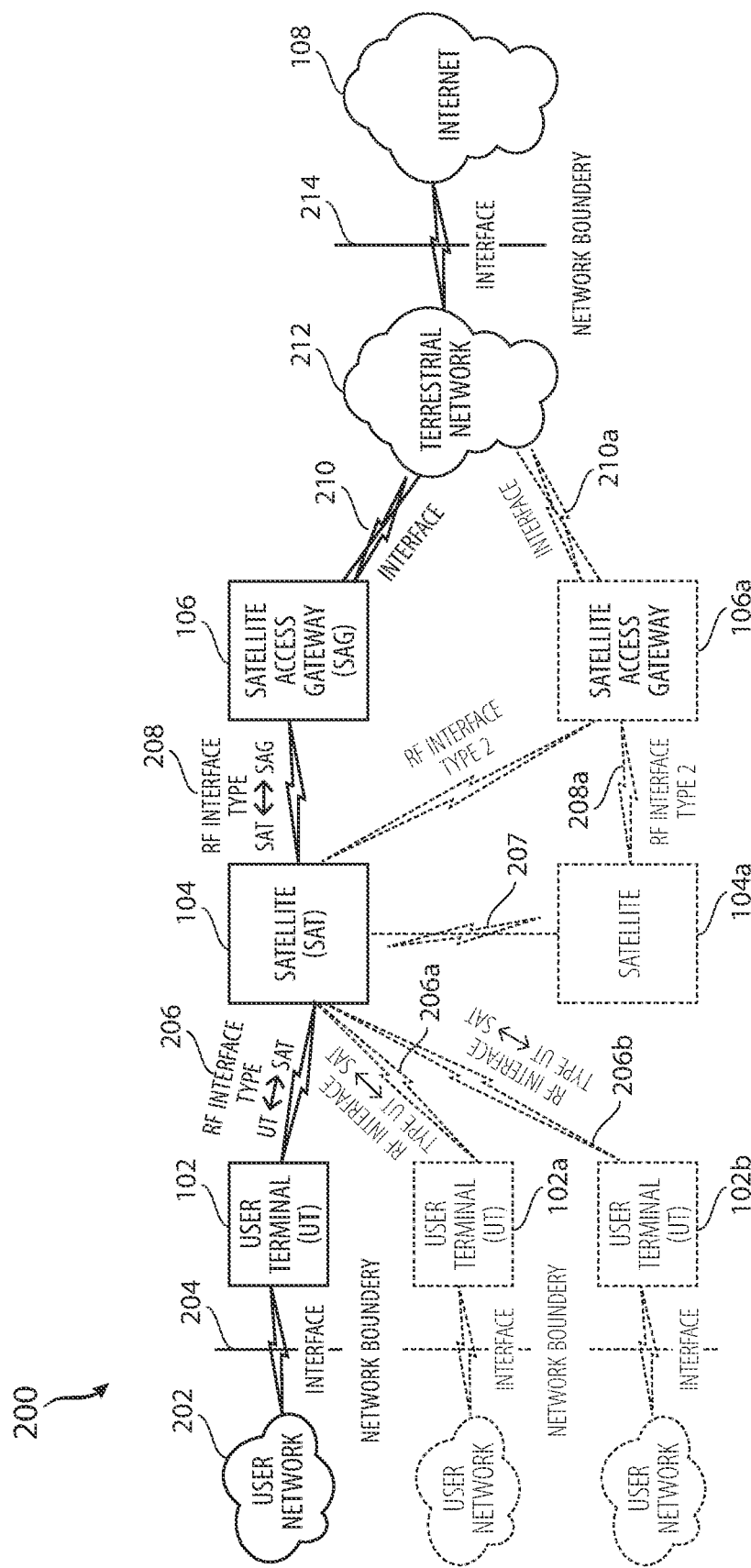
FIG. 2 illustrates a block diagram of a system including user terminals, satellites, gateways and a network.

Having introduced the four primary embodiments of this disclosure, a more detailed presentation of the overall network of nodes is provided next. FIG. 2 illustrates the various nodes and communication channels in more detail than FIG. 1 and provides the basic understanding of the UL channels and DL channels between the various nodes in a wireless communication system 200. The wireless communication system 200 includes more nodes and interfaces but can correspond generally to the satellite communication system 100 of FIG. 1. The wireless communication system 200 includes a collection of three physical/logical elements, UTs 102, 102a, 102b, SATs 104, 104a, and SAGs 106,106a. A terrestrial network 212 is in communication via a network interface 214 with the Internet 108.

The UT 102 can include one or more terrestrial/ground, physical equipment that connects via a user network interface 204 to a user network 202. The user network 202 can include a user's home computing device such as laptop computer, desktop computer, mobile device and so forth. The UT 102 in composite provides a radio frequency (RF) link communications channel or RF UT-SAT interface 206 to connect the user network 202 to the SAT 104. A second interface 206a enables communication with a second UT 102a and a third interface 206b is used for a third UT 102b. As noted above, the communication from the UT 102 to the SAT 104 is an UL communication.

In one example, the user network 202 might include a user seeking to access a particular website. A user may interface with one or more devices (e.g., computer, smart phone, tablet, laptop, Internet of Things (IoT) devices, wearable devices, etc.) as part of the user network 202, 202a, 202b and request access to the particular website by typing in the URL. The request for the URL is transmitted from the UT 102 to the SAT 104 on the UL. The communication then occurs from the SAT 104 via an RF SAG-SAT interface 210 on the DL to the SAG 106. The SAG 106 communicates via a SAG-TN (terrestrial network) network interface 210 with a terrestrial network 212 and via a network interface 214 to the Internet 108. When a second SAG 106a is used in communication with SAT 104 or SAT 104a, a second interface 210a can be used to communicate with the terrestrial network 212. A server associated with the website can then respond with website data transmitted in the reverse direction back through the SAG 106, the SAT 104, to the UT 102 and the user network 202 can present the website to the user. The relationship between the UTs 102 and SAT 104 is many-to-one and the relationship between the SAT 102 and the SAG 106 is point-to-point or one-to-one.

The particular SAT 104 and SAG 106 can be selected based on signal strength, line of sight, interference restrictions, site reliability, or other factors. If a SAG 106 is not immediately available to receive communications 208 from the particular SAT 104, the particular SAT 104 may be configured to communicate with another SAT 104a via an inter-satellite link 207 and this second SAT 104a may continue the communication pathway 208a to a particular SAG 106a.

The respective SAT 104, 104a each is a single physical piece of equipment that provides multiple RF links, each RF link including an RF link communications DL channel to connect respective user network(s) 202, 202a, 202b via one or more UTs 102, 102a, 102b. The SATs 104, 104a also connect to the SAGs 106, 106a and through the terrestrial network 212, ultimately to the Internet 108. While a plurality of satellites are in operation simultaneously at any point in time (also referred to as a satellite constellation), the relationship between a SAT 104 and UT 102 is one-to-many.

The SAG 106 includes one or more terrestrial, physical pieces of equipment that in composite provide multiple RF links 208, 208a. Each RF link includes an RF Link communications channel on the UL to connect the SAG 106, 106a to one or more SATs 104, 104a a well as to the terrestrial network 212, and ultimately, the Internet 108. A plurality of SAGs 106, 106a may be distributed terrestrially. The SAG 106, 106a may also be referred to as a gateway or GW.

The terrestrial network 212 can be characterized as a "cloud," which is a collection of multiple collocated and/or distributed terrestrial physical equipment that in composite provides a communication routing fabric to transit communications traffic between SAG(s) 106, 106a and the Internet 108.

Figure 3:
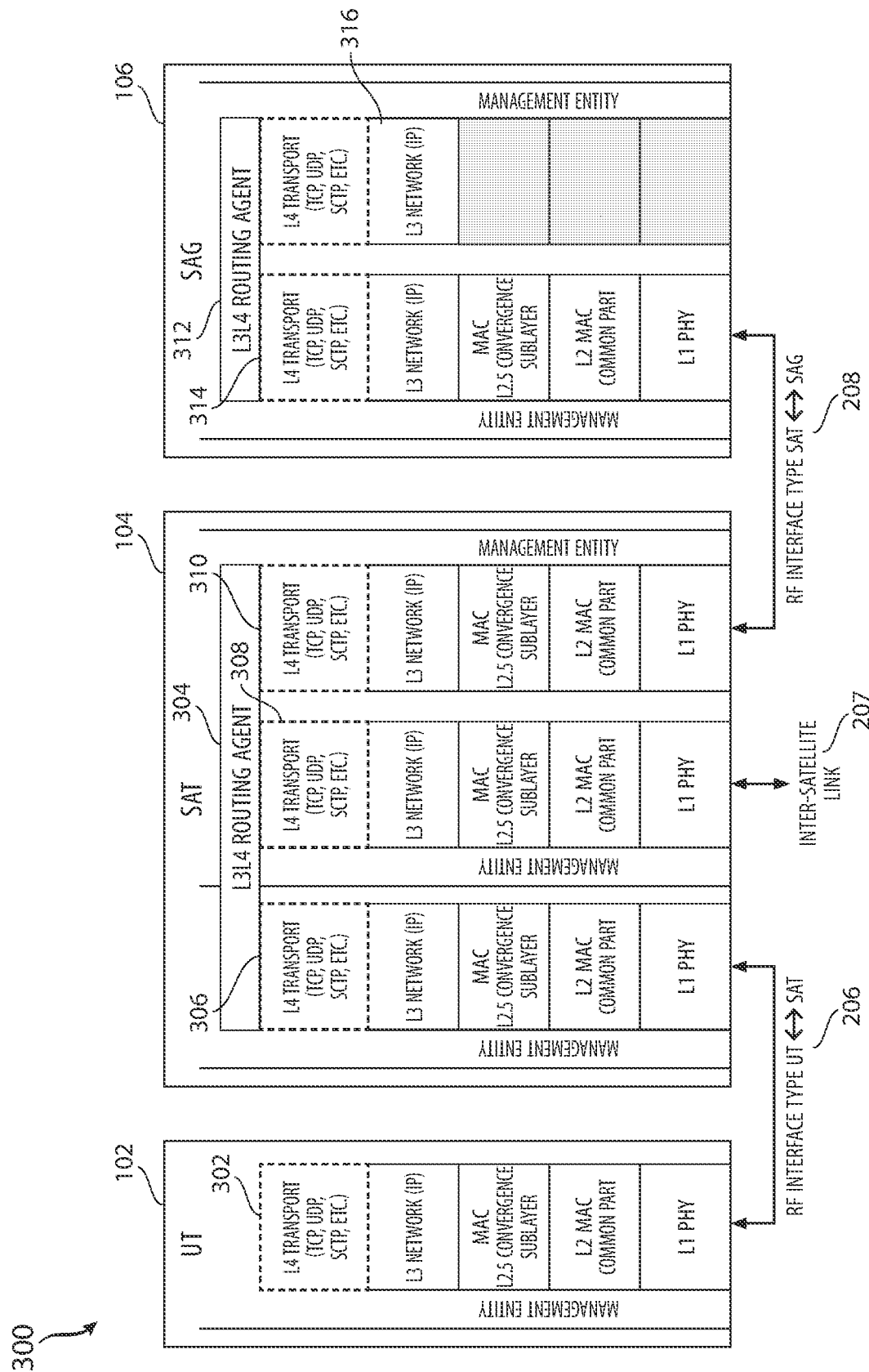
FIG. 3 illustrates the various layers in the Open Systems Interconnection Model for communications between user terminals, satellites and gateways.
Figure 4:
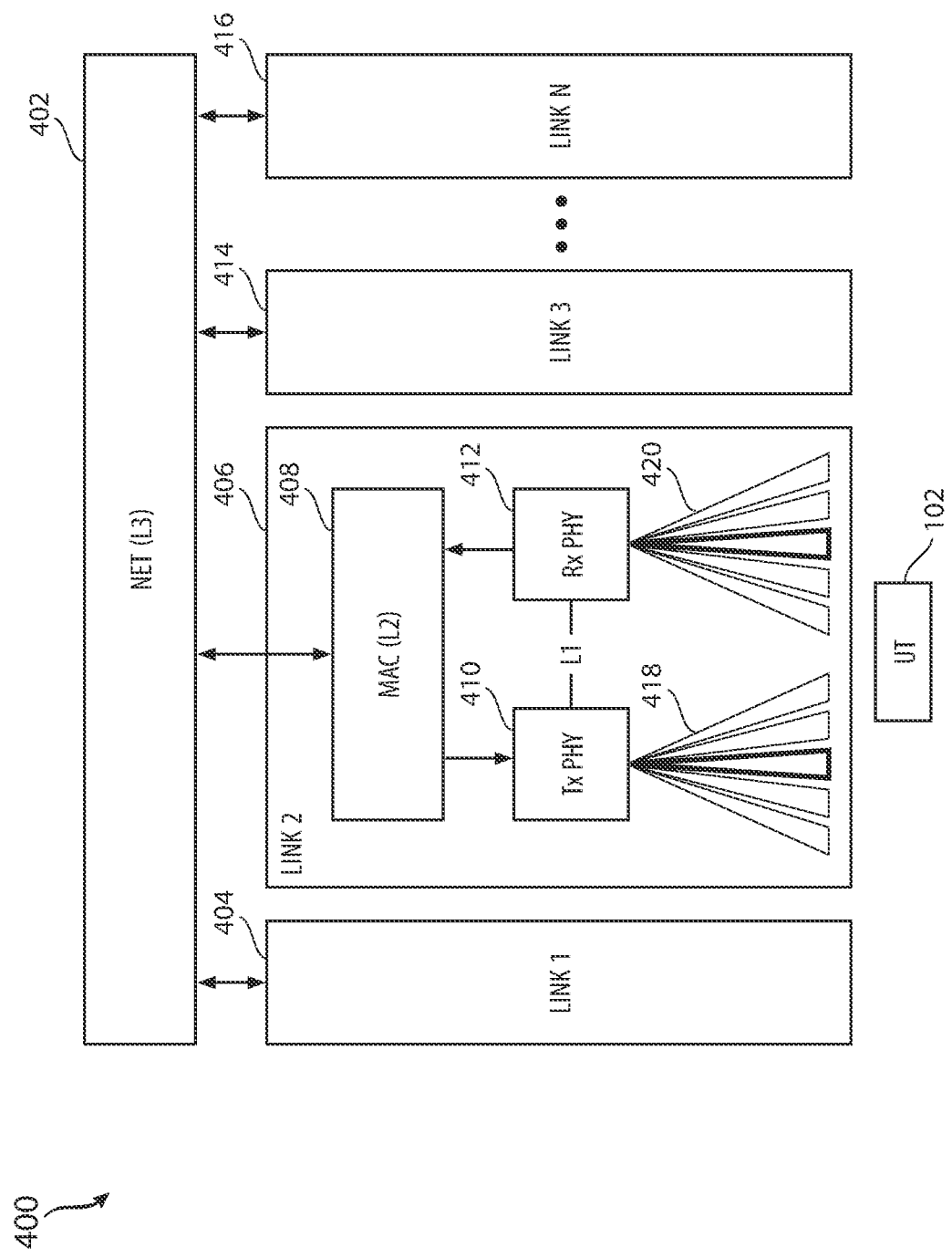
FIG. 4 illustrates the various layers in the Open Systems Interconnection Model.

As noted above, this disclosure focuses on the various configurable parameters for waveforms depending on whether a modem 500 is configured in a UT 102, SAT 104 or SAG 106. Some additional introductory figures are provided next with respect to the Institute of Electrical and Electronics Engineers (IEEE) Open Systems Interconnection (OSI) protocol stack and other underlying technologies for understanding this disclosure. FIG. 3 shows a block diagram of the IEEE OSI protocol stack, and FIG. 4 illustrates in more detail the UT to SAT air interface. Communication to and from the MAC Layer of the OSI protocol stack is shown in more detail in FIG. 5. FIG. 6A then introduces the various components of the transmitter 502 of the modem 500 and FIG. 6B introduces the various components of the receiver 512 of the modem 500. Later figures and associated discussion will provide greater detail for individual components, the specific radio frame structures for the UL and DL between respective nodes and additional details regarding the configurable parameters that enable the same physical modem to be deployed in the UT 102, the SAT 104 and the SAG 106. Other innovative functions will be introduced as well such as the ability of the modem to compensate for what is called sampling frequency offset (SFO) and carrier frequency offset (CFO) in the UL and DL channel communications.

The basic structure for enabling wireless communication between these nodes is founded on what is called the Institute of Electrical and Electronics Engineers (IEEE) Open Systems Interconnection (OSI) protocol stack. This OSI protocol stack is known to those of skill in the art and the various layers of this stack are referenced in this application. FIG. 3 provides an overview of the IEEE OSI protocol stack 300 on system elements relevant to the scope of the MAC (medium access control) air interface specification disclosed herein. The protocol stack 300 for the UT 102, the SAT 104 and the SAG 106 are shown. The RF UT-SAT interface 206, and inter-satellite link 207 and the RF SAG-SAT interface 208 are shown as well.

The protocol stack 300 shown in FIG. 3 defines Service Access Points (SAPs)—or points of inter-protocol communications exchanges whose behavior and content are discussed in detail below. A SAP is an identifying label for network endpoints in the OSI stack and can include a conceptual location in which one OSI layer and request the services of another OSI layer. The structure and composition of the protocol stack is common to both the UT 102 and the SAT 104, though the specific content and behavior passing through the inter-protocol SAPs may differ between the two nodes.

The UT protocol stack 302 includes the physical layer L1, the MAC layer L2, the network internet protocol (IP) layer L3 and the transport layer L4. The MAC layer L2 shows a common part portion and a convergence sublayer as well. This structure is generally the same for the first SAT protocol stack 306 that is used for communication between the SAT 104 and the UT 102. The SAT 104 also includes an L3/L4 routing agent 304 that includes a second SAT protocol stack 308 for inter-satellite links 207 for communication with other satellites and a third SAT protocol stack 310 for communication with the SAG 106. The SAG 106 includes a L3/L4 routing agent 312 that includes a first SAG protocol stack 314 that is used to communicate via the RF SAG-SAT interface 208 with the SAT 104. A second SAG protocol stack 316 is used to communicate with the terrestrial network 212 via the interface 210 shown in FIG. 2. FIG. 3 can be reviewed when various references to one or more of the OSI protocol stack 300 layers L1, L2, L3, L4 are mentioned herein.

FIG. 4 illustrates a block diagram of the UT-SAT air interface link 400 used for satellite communications as disclosed herein. The network layer L3 402 on the SAT 104 is illustrated with a first link 404 to a UT (not shown), a second link 406 shown in communication with the UT 102, a third link 414 to a UT (not shown) and up an nth link 416 to an nth UT (not shown). Each of these links represents a communication channel between the SAT 104 and a respective UT 102 on a DL channel. In an embodiment, the UT-SAT UL frequency band(s) may be different from the SAT-UT DL frequency band(s). In one example, the UL channel may have a bandwidth of 62.5 MHz or 2×62.5 MHz, and the DL channel can have a bandwidth of 250 MHz. In another embodiment, the UL and DL frequency bands may be in the gigahertz (GHz) range. In another embodiment, UL and/or DL communication may occur in the Ku (12 to 18 GHZ) and Ka (26-40 GHz) frequency bands. In one aspect, the Ku DL may include 8 channels, and the Ku UL may include 8 channels. Each of the Ku DL channel bandwidth may be larger than each of the Ku UL channel bandwidth. In the Ka band, the Ka DL may include 8 channels, and the Ka UL may include 4 channels, and each of the Ka DL channel bandwidth may be smaller than each of the Ka UL channel bandwidth.

Each respective link 404, 406, 414, 416 of the SAT 104 has a plurality of RF link pairs (each pair including a DL 410, with its transmitted signal 408 and an UL 412 with its received signal 420), also referred to as MAC links associated with the MAC L2 408 or just links, which can be deployed to serve the UT-SAT air interface link 206. An RF link is a logical designation identifying a MAC and transmit/receive (TX/RX) physical (PHY) pair 410, 412 instances, distinguished from an antenna beam in that the RF link may be constituted by more than one antenna beam. FIG. 4 is an illustration of the UT-SAT air interface link 400 in accordance with some embodiments of the present disclosure. Each link is illuminated by one or more pairs of beams (UL beam 420 and DL beam 418) that serve a 2° area (or other percentage) on the surface of the earth. Through the use of a constellation of SATs 104, more surface area of the earth can be covered.

In an embodiment, the SAT 104 can include 32 RF link pairs (e.g., 32 UL RF links and 32 DL RF links), and each of the DL and UL links can include a plurality of frequency bands (e.g., a DL can have 8 frequency bands, a UL can have 8 frequency bands). The SAT 104 can serve up to roughly 200 UTs 102 on a given RF link, which brings the total number of UTs served by a SAT to roughly 6400. A number of modems 500 are deployed on the SAT 104 to handle the respective communication channel for each UT 102.

On the UT 102, the UT-SAT air interface link 206 is served by a single bidirectional RF (or MAC) link. Each link may be mapped to one or more UL and DL beam pairs. In an embodiment, the single DL link may include 8 frequency bands and the single UL link may include 8 frequency bands.

General Configurable Modem Structure

FIG. 5 illustrates a general introduction of a modem 500 and the satellite modem architecture, design and block diagram structure. In an embodiment, the modem 500 can include a transmitter 502 that includes a transmit coding layer 504 that receives data from a MAC layer (not shown, but see FIG. 3), an OFDM modulation layer 506, and a transmit digital front-end 508. The signals produced by the digital front-end 508 can be transmitted to a transmit digital beamformer 510 and transmitted via a transmit antenna 522. The antenna 522 can be a phased array antenna or might be a parabolic antenna, depending on the node deploying the modem 500 in the satellite communication system 200.

A receiver 512 on the modem 500 can include a receive antenna 524 which is connected to a receive digital beamformer 514 and a receive digital front-end 516. The signals are provided to an OFDM demodulation component 518 and a receive coding layer 520 for communication to the MAC layer (not shown). This general introduction of the transmitter 502 and the receiver 512 will be further detailed in the following figures and discussion. The various signal processing concepts disclosed herein, and the various configurable parameters and error correction for such features as Doppler effects, sampling frequency offset (SFO), carrier frequency offset (CFO) and so forth can be achieved through one or more of the various components disclosed in FIG. 5 and next introduced in more detail.

In the following discussion, FIG. 6A introduces more details about the transmitter 502 of the modem 500 and FIG. 6B introduces more details about the receiver 512 of the modem 500. The discussion will periodically jump to another figure to provided further details about one or a group of components shown in FIG. 6A or 6B and then return back respectively to FIG. 6A or FIG. 6B. The transmitter 502 processes and generates OFDM symbols for transmission from one node to another node, and the receiver 512 details the components that process received OFDM symbols.

FIG. 6A illustrates in more detail the transmission processing utilizing a first transmitter 502 having a first set of components 600 and a second set of components 602. A digital front-end can be part of the second set of components 602 and can perform digital signal processing of the waveform. FIG. 6A illustrates a block diagram showing at least a portion of the transmitter 502 configured to generate the OFDM signal or waveform in accordance with some embodiments of the present disclosure. The transmitter 500 (or a portion of the transmitter) shown in FIG. 6A may be included in a modem 500, a modem chip, an integrated circuit (IC) chip or a system on chip (SoC) and can be deployed on the UT 102, the SAT 104, the SAG 106 or other a component of the wireless communication system 200.

The bandwidth used for the transmitter 502 UL to the SAT 104 can be either 62.5 MHz or 2×62.5 MHz, or other bandwidths as well. As shall be explained, output from an UL dual channel transmitter processor 604 will be combined with payload data bits 606 (as processed by the first set of components 600) to produce a signal of 1 to 4 different user signals combined over the air interface. In one aspect, a dual or second transmitter can be a second instance of the modulator included in the modem 500. Two modulators can be in every modem chip 500. Software can enable the dual channels (2×62.5) if the phased array or antenna supports it. For example, the UT 102, SAT 104 and/or SAG 106 may have a phased array or antenna that either supports the use of two modulators or not. If not, the second modulator can be disabled. In one example, both modulators per modem chip 500 on the SAT 104 are active.

The payload data bits 606 (user data from a particular UT 102) are initially received. A transmit bit scrambler 608 scrambles the payload data bits 606 via a linear feedback shift register (LFSR) configured as an additive scrambler. In an embodiment, the transmit bit scrambler 608 can include a 15 bit LFSR additive scrambler which is initialized with a fixed seed at the start of each payload code word. The initialization process associated with the scrambler 608 ensures synchronization with the descrambler 698 at the far end receiver 512 shown in FIG. 6B. The additive scrambler configuration does not multiply bit errors.

The scrambled data can be encoded by a transmit encoder 610. The transmit encoder 610 can be, for example, a low-density parity-check (LDPC) encoder. A LDPC code is a linear error correcting code and such codes are used for transmitting data over a noisy transmission channel. In one aspect, a configurable modulation and coding scheme can be implemented via the encoder 610. The transmitter 502 can receive data regarding the SNR of the channel or other data from the SAT 104 and determine an appropriate modulation and coding scheme for the encoder 610 to use for encoding the signal into codewords. The encoded data is communicated to a transmit mapper 612 that parses the code words and maps them to valid constellation points to produce data symbols as specified by the modulation and coding scheme. One of skill in the art will understand this mapping process. After LDPC encoding 610 is performed, the bit stream is parsed according to the configured modulation level. The LDPC code design can specify the code block length in a frame length field. This code block length can refer to a length in time or in frequency of a radio frame as shown in FIG. 7 and can represent one of the configurable features of the modem 500 disclosed herein.

In one aspect, a physical layer or medium (also referred to as Phy or PHY) protocol data unit (PDU) header can be encoded 610 separately from the payload. A protocol data unit (PDU) is an OSI term that refers to a group of information added or removed by a layer of the OSI model. Each layer in the model uses the PDU to communicate and exchange information, which can only be read by the peer layer on the receiver 512 and is then handed over to next upper layer after stripping. The PDU header can contain information required by the modem 500 to encode, modulate, and transmit the signal. It is subsequently used by the receiver 512 (shown in FIG. 6B) at the far end of the link to demodulate and decode the OFDM signal. The Phy PDU header in one example is encoded and modulated using a convolutional code and simple binary phase-shift keying (BPSK) modulation in order to ensure robust delivery. Those of skill in the art will understand BPSK modulation. For the first PDU, the header fields include a sequence number field, a partial field, a modulation and coding scheme (MCS) length field, and a MCS field.

In one aspect, the PHY layer can provide a number of different supported services for data bearing and other services to higher layers of the OSI model. For example, for multi-user capabilities, the PHY layer can provide, in a SAT-SAG DL mode and a SAT-SAG UL mode, and a point-to-point service. For a SAT-UT DL mode, the PHY layer can provide a broadcast PHY, or a point-to-multipoint service. In a SAT-UL mode, the PHY layer can provide up to 4 simultaneous users or beams in combination using OFDMA (orthogonal frequency division multiple access) and as many as MAC requires using combinations of TDMA (Time division multiple access) and OFDMA. One of skill in the art will understand the details of OFDMA and TDMA. OFDMA is a multi-user version of OFDM enabling concurrent access point communication (on the UL and/or the DL) with multiple UTs 102 by assigning subsets of subcarriers to individual UTs 102 as shall be disclosed in more detail below.

Other PHY services can include the physical layer configured to provide data bearing (in the form of MAC PDU transport) services in all mode to MAC and higher layers of the OSI model. The services can include the physical layer being configured to provide measurements in support of adaptive modulation and coding (AMC) in all modes. The consumer of such modes might be a peer PHY layer or a MAC layer entity. The physical layer can be configured to provide TX and RX capabilities in support of random access to the system. Random access can be beneficial for initial network entry and bandwidth requests which are MAC peer-to-peer services.

The MAC packet payload consists of a block of OFDM (orthogonal frequency division multiplexing) subcarriers loaded with constellation symbols corresponding to one LDPC code word. The size of the payload is specified in the MCS length field of the MAC header, and the encoding and modulation are specified in the MCS field. If the length of the LDPC code word is insufficient to fully load the specified number of OFDM subcarrier, then pseudo random padding bits are appended to the LDPC output bit sequence. In one aspect, OFDM signal parameters can be calculated based on sampling rate, bandwidth and modem configuration. The above processing can be characterized as a coding layer of the modem 500 and part of the transmitter 502.

The mapped data symbols output from the mapper 612 are combined with pilot subcarriers 614 in which the pilot subcarrier 614 are inserted into the frequency domain signal at a modulation layer block. A single OFDM symbol contains a number of subcarriers. Some are data subcarriers others are pilot subcarriers or pilot sub-band offset subcarriers within the structure disclosed herein. The center, "DC" or "Null", zero subcarrier is typically not used. The possible data subcarrier modulation formats are BPSK, QPSK, 8QAM, 16QAM, 32QAM and 64QAM and higher-order modulations. These different formats are understood by those of skill in the art. Pilot subcarriers are typically modulated using BPSK and a known magnitude and phase. Each OFDM subcarrier carries a single modulated data symbol, or "constellation point", along with its magnitude and phase information. This means that the magnitude and phase can vary for each subcarrier and OFDM symbol in the transmitted burst.

The combination of the data symbols and the pilot symbols forms a vector 616 of 1024 subcarriers per OFDM symbol. The pilot subcarrier insertion 614 can be configurable by the modem 500 and can be particular to a channel between any two nodes in the satellite communication system 200.

Typically, the transmitter 502 will insert two pilot subbands or pilot subcarriers per user with an offset (one or more pilot sub-band offsets as shown in FIG. 16B) from the band edges to provide a better tracking capability. A frequency domain channel estimation (CE) symbol 618 is prepended or combined with the data prior to processing by a pseudo random rotational scrambler 620, which rotates all the CE symbols, payload data and pilot subcarriers. For example, the rotational scrambler 620 can use pseudo-noise (PN) for rotation and thus scrambling the data.

Figure 9:
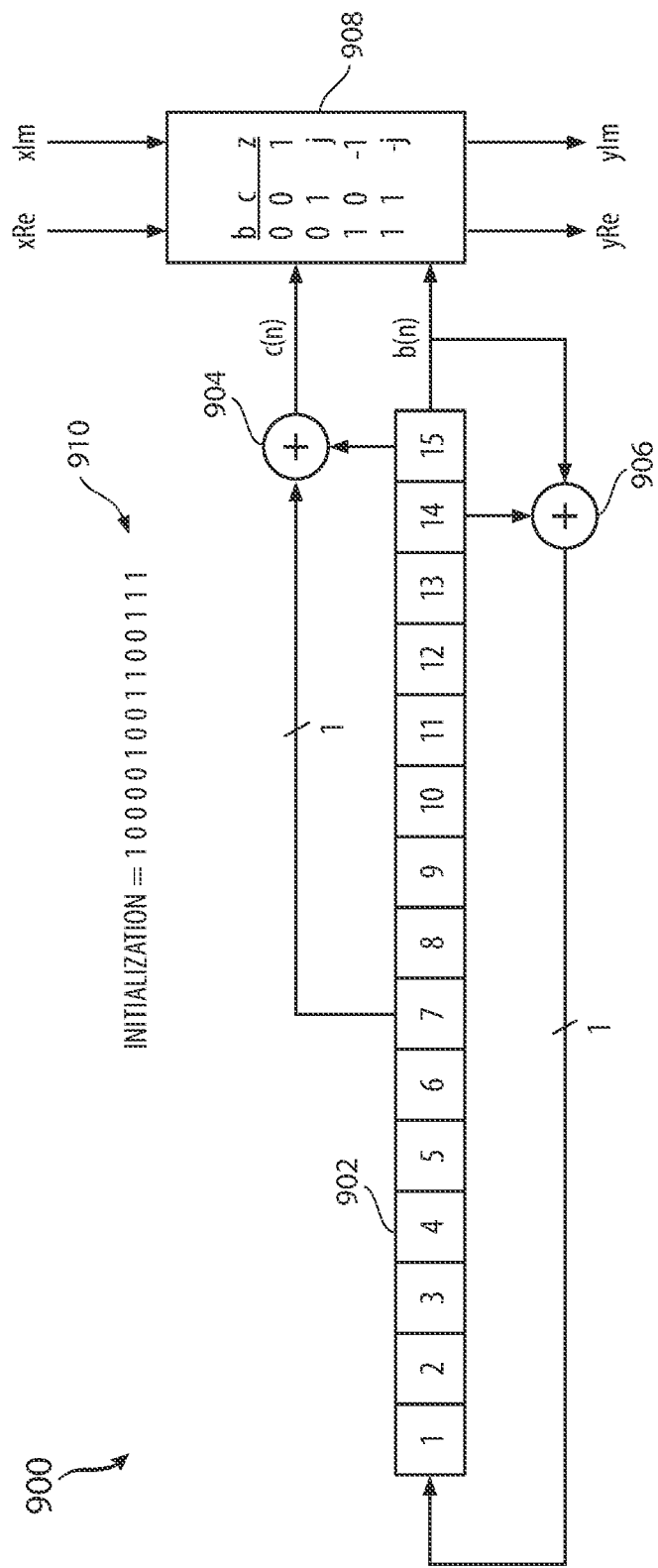
FIG. 9 illustrates a block diagram of a pseudo number rotation scheme.

A block diagram 900 of an example rotational scrambler 620 shown in FIG. 6A is illustrated in more detail in FIG. 9. The rotational scrambler 620 rotates the incoming modulated symbol sequence 616 (data) by $\{0, \text{li}, \text{it}/2, -\text{rc}/2\}$ according to a linear feedback shift register (LFSR) 902, 904, 906 with a characteristic polynomial $1+D^{14}+D^{15}$. The LFSR 902, 904, 906 generates two output bits in order to select the pseudo-noise (PN) rotation. FIG. 9 illustrates a block diagram 900 showing the LFSR PN rotation scheme in accordance with some embodiments of the present disclosure. The initialization seed 910 is reset at the beginning of each burst.

A PN binary sequence can be generated via a 16-bit linear feedback shift register 902. The feedback is configured to generate a maximum length m-sequence by feeding back the modulo-2 sum of specific shift register taps as shown in component 906. The state of the shift register is used to generate a second output bit via a separate modulo-2 sum 904. The two output bits b(n) and c(n) are used to indicate a rotation of 0, −90, −180 or −270 degrees 908 which is applied to the input symbols xRe, xIm, to form output (scramble/rotated) symbols yRe, yIm. The scrambling operation generates the output $yRe+jyIm=z_n(xRe+jx1m)$.

There are a configurable number of CE symbols that can be used for channel probing purposes. The configuration of the number of CE symbols represents one of the innovations disclosed herein which can be configured depending on the node and whether the channel is a UL or a DL channel and depending on whether the communication is UT-SAT or SAT-SAG.

A transmit subcarrier mapper 622 maps the data to generate a second data structure 624. The output of the subcarrier mapper 622 constitutes a set of 1024 subcarriers per OFDM symbol 624. An additional 64 zero-value subcarriers are added to either end (as pilot sub-band offsets) to act as a guard for adjacent-channels, in total forming a set of 1152 subcarriers 626 which are passed to the Inverse Fast-Fourier Transform (IFFT) 628. The zero-value subcarriers can be characterized as offsets that are shown in FIG. 7 as features 705, 707 and are also shown in FIG. 16B as features 1624, 1636, inserted at the edges of the channel. For example, the offset can be a 16 tone (another name for subcarrier) pilot sub-band offset from the band edge.

For a multi-user UL transmitter, the transmit subcarrier mapper 622 translates a block of user-specific subcarriers into a proper spectral allocation 624. The proper spectral allocation 624 can be padded with zero loaded subcarriers 626 as noted above to satisfy the total number of bins in the frequency domain signal. The signal is processed by a multi-point (e.g., 1152-point) FFT/IFFT (Fast Fourier Transform/Inverse Fast Fourier Transform) modulator 628 to generate a complex oversampled time domain OFDM signal 630.

The frequency domain signal at the IFFT input can span 1024 subcarriers and can be extended with zero-padded to 1152 subcarriers as shown in the transition from block 624 to block 626. OFDM baseband signal generation can be implemented using the IFFT modulator 628. As an example, without limitation, the IFFT modulator 628 can use a multi-point, mixed-radix, multi-stage IFFT transformer.

In an embodiment, the IFFT modulator 628 operates in accordance with the following equation:

$$x(n) = \frac{1}{N}\sum_{k=0}^{N-1} X(k) \cdot e^{j2\pi nk/N}$$

The complex oversampled time domain OFDM signal 630 has a cyclic prefix and postfix (CPP) time-domain cyclic guard band inserted therein to generate a data structure 632. The CPP of a programmable number of samples (nominally 18+18) are pre-and-post appended to the time-domain symbol as shown in the data structure 632. In one example, the CPP can be configured at the beginning and end of each vertical rectangle 1386, 1390 shown in FIG. 13F. The CPP samples are a circular extension of the time domain samples which allow proper FFT demodulation (see FFT demodulator 674 in FIG. 6B) in the presence of potential timing offset error in the demodulation and/or channel memory effects that would otherwise cause inter-symbol interference (ISI). Compensation techniques for ISI are discussed more fully below.

Figure 12:
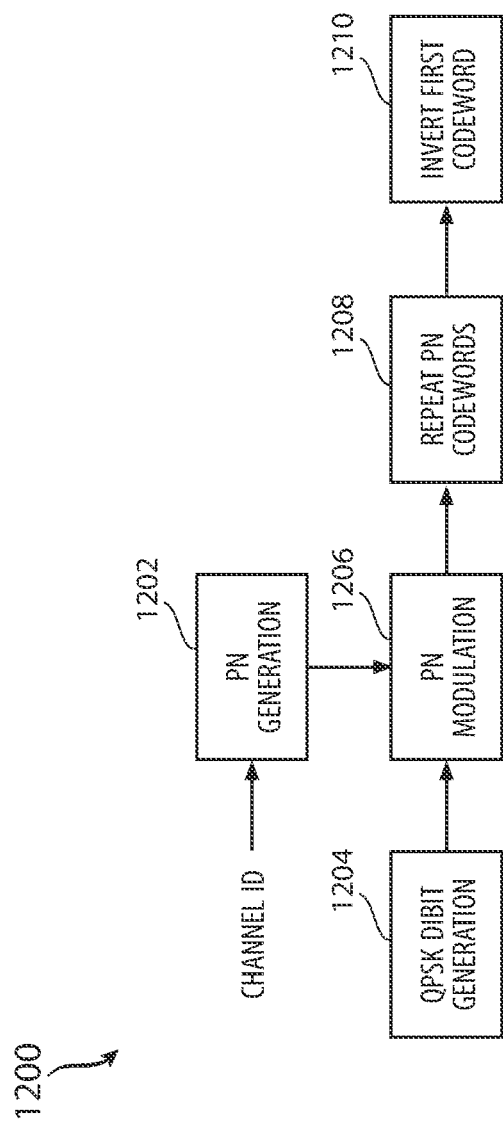
FIG. 12 illustrates a block diagram of a unique word generation process.

In one embodiment, the transmitter 502 can support various CPP lengths and this is one of the parameters that is configurable in the modem 500. The time-domain cyclic guard band inserted after the IFFT is split evenly between a cyclic prefix and a cyclic suffix. The cyclic guard band provides protection against ISI and symbol alignment errors or uncertainty. After the time-domain cyclic guard band is inserted, a time-domain unique word (UW) symbol 634 is added or prepended to the data structure 632 having the inserted CPP. FIG. 12 provides an example approach to generating the UW symbol 634.

Figure 11:
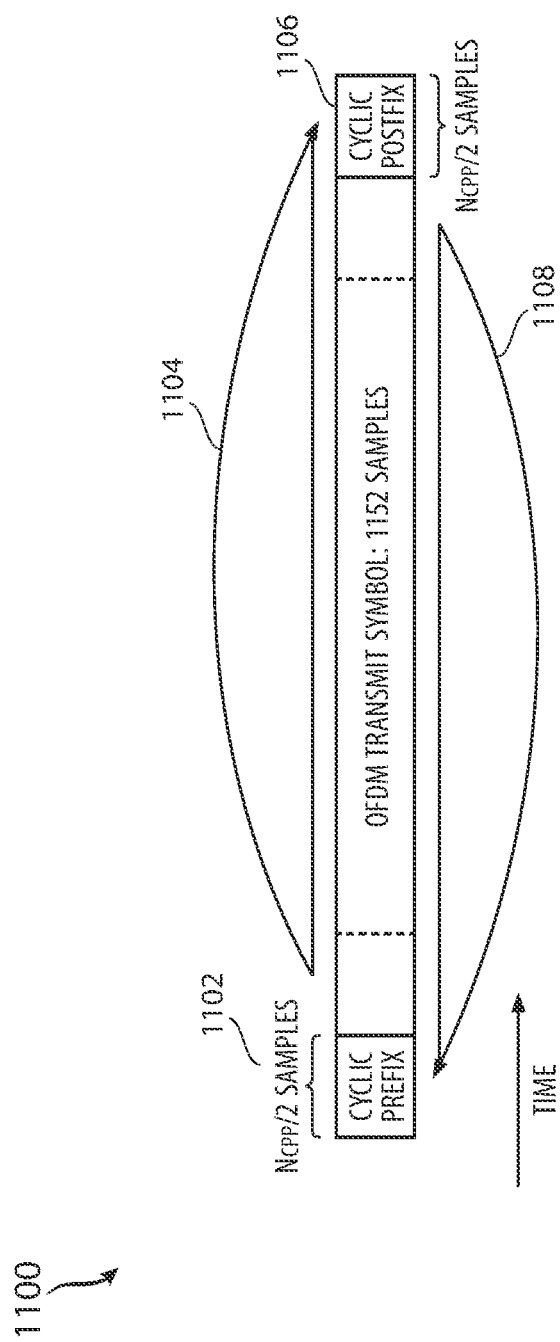
FIG. 11 illustrates a cyclic extension insertion process.

The CPP can also be called a cyclic extension and can be inserted for each OFDM symbol at the IFFT module 628 output as illustrated in FIG. 6A. FIG. 11 shows the cyclic extension 1100 in more detail. The extension 1100 can include both a cyclic postfix 1106 and a cyclic prefix 1102, each of which are respectively copied 1104, 1108 from the $N_{CPP}/2$ samples at the beginning position 1102 and end position 1106 of the OFDM symbol, respectively. In one aspect, the modem 500 can provide a configurable cyclic extension that provides a time domain guard band.

This disclosure now returns to FIG. 6A. Parallel-to-serial (P/S) processing 636 next occurs and a resampling component 638 generates a signal which is frequency shifted via a frequency shifter 640 to further be processed by an interpolation block 642 which can be a 2× Polyphase interpolation finite impulse response (FIR) filter. The interpolation block 642 can include a UT-mode Farrow filter for managing sampling frequency offset (SFO). As would be known in the art, a Farrow filter structure enables arbitrary resampling of a time series of data by employing low order piecewise polynomials to approximate segments of the impulse response of a prototype low-pass filter from which samples of an arbitrary interpolator filter can be computed. The time domain component of the modulator can include the frequency shifter 640 for carrier-frequency offset (CFO) pre-compensation, a spectral shaping filter for power spectral density (PSD) mask enforcement and can include the spectral mask shaping or resampling filter 638, interpolation blocks 642, crest factor reduction (CFR) 645 and dual channel processing 604 (depending on the use case). The resampling filter 638 provides PSD control between a Nyquist frequency and an IFFT band edge. The output signal from the interpolator 642 is provided to a set of components as a modulation layer 602 including a summer 644 that sums the output signal with data from the uplink duel channel transmitter 604 (if applicable) and the CFR module 645 that applies CFR to the resulting signal, followed by digital pre-distortion (DPD) 646 and digital-to-analog conversion (DAC) 647 for transmission via an antenna 648 (not shown).

Figure 13A:
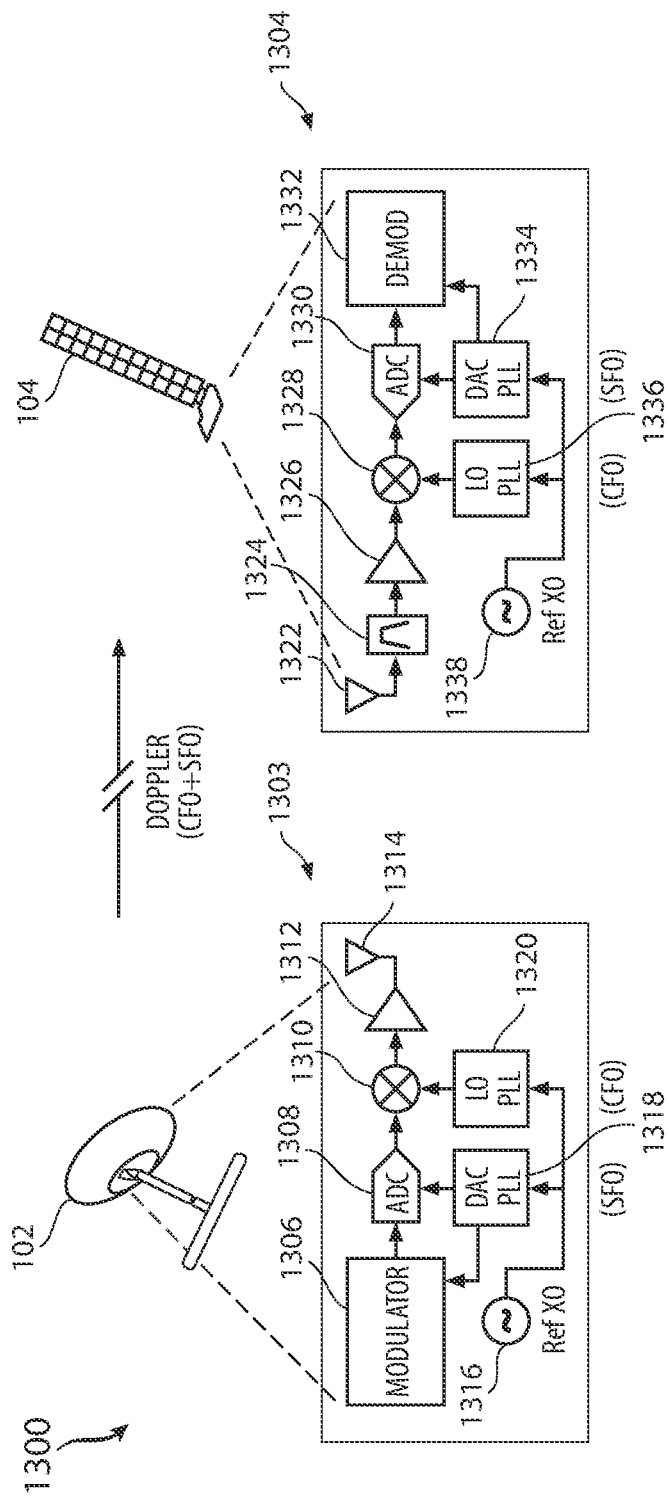
Figure 13B:
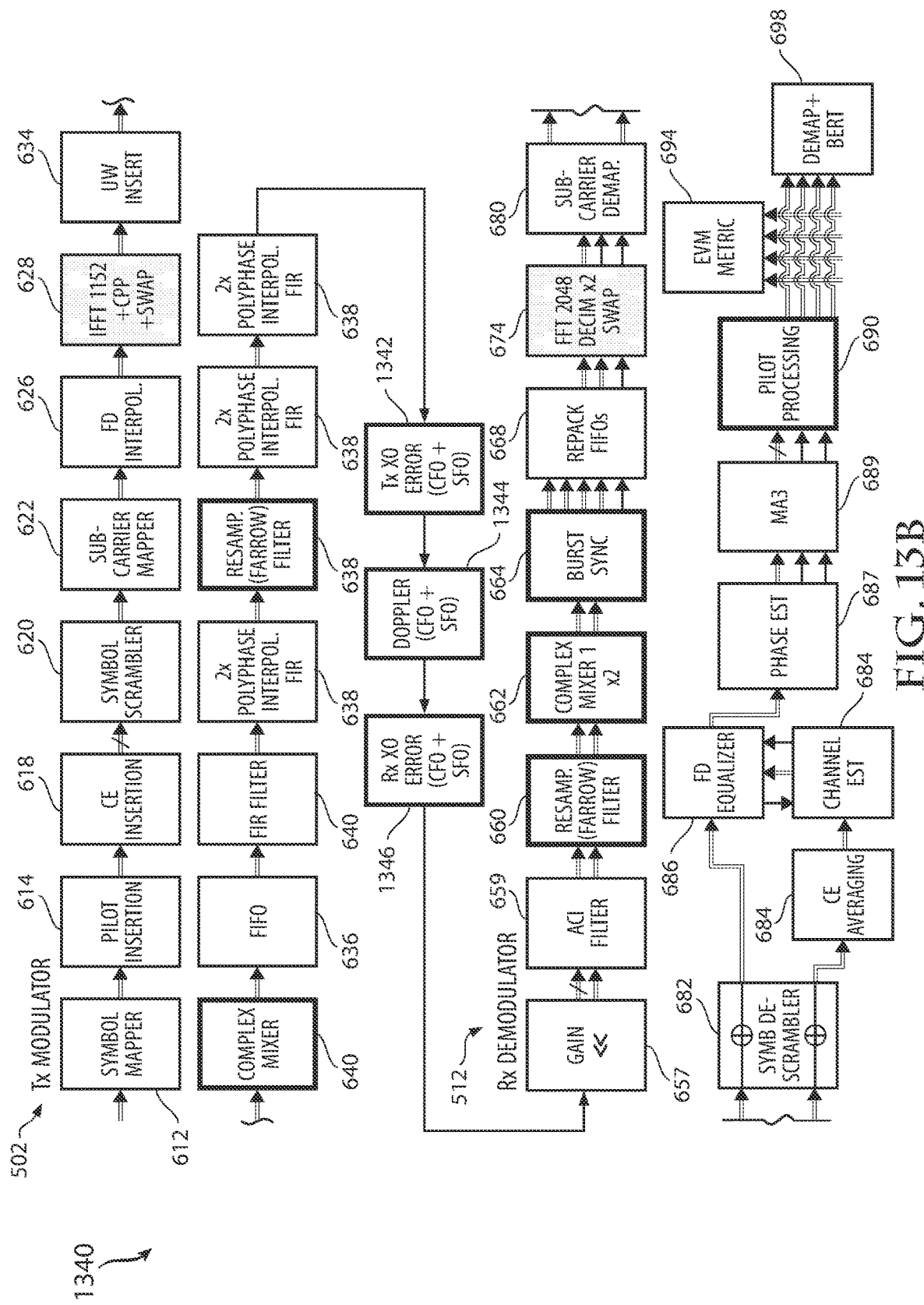

The output of the "DAC" block 647 of the transmitter 502 is configured to electrically couple 648 with an antenna or antenna system (e.g., antenna, FIG. 13B, front-end module, digital phased array, power amplifier, etc., not shown in FIG. 6A). The system can switch between the DAC 647 processing and SERDES processing 649 which provided signals to a digital beam former (DBF) 650. The interpolation block 642 can increase a sample rate by a factor of two in order to facilitate resampling and to match a sampling rate in the DAC 647. The DAC 647 in one example can be oversampled to limit unwanted images. The interpolation block 642 can include filters for upsampling the signal for protocol digital beam forming (DBF) operations as well as operation with the Farrow filters 638, CFR 645, and DPD 646 processes discussed above. The modulation layer 602 of the transmitter 502 can output complex baseband samples to a digital beam former module (not shown in FIG. 6A). In certain use cases, the modulator output may drive an RF/analog front-end.

The transmitter 502, also referred to as an OFDM transmitter, includes, among other things, a first set of components 600 and a second set of components 602. The definition of which components can combine into the sets of components can vary. The first set of components 600 can include a coding layer portion including at least the encoder 610 and a modulation layer or portion including at least the IFFT 628. The dual channel-mode transmitter 604 can be used in the UT-SAT UL channel in order to provide enhanced service with two channels at the same frequency that are frequency division multiplexed. The dual channel mode is how the bandwidth described in the dual-channel mode for the UL can be 2×62.5 MHz. This approach can enable multiple users to combine their respective data resource blocks in an UL burst to the SAT. The structure of the multi-user radio frame will be illustrated in FIG. 10 and discussed more fully below.

As discussed below, the pilot symbols 614 and CE symbol block 618 shown in FIG. 6A are configured to generate and encode into the appropriate portions of a radio frame respective pilot symbols and CE symbol(s). The payload data symbols are also encoded into the radio frame as denoted in FIG. 6A. This figure among other things, shows a unique word (UW) symbol block 634 configured to generate and encode into the appropriate portion of the radio frame a UW symbol. The UW insertion can enable far end (receiver 512) burst detection 664 and is preferable for multi-user UL bursts.

Alternatively, portions of the transmitter 502 can be configured in other ways. Additional block(s) and/or different ordering of the blocks within the transmitter 502 are contemplated and within the scope of the present disclosure. For example, without limitation, a mask filter block can be disposed between the resample block 638 and the frequency shift block 640 in FIG. 6A.

A portion of the set of components 600 can include a coding layer including bit scrambling 608, LDPC coding block 610, and the constellation mapping block 612 as shown in FIG. 6A. The modulation layer can include pilot processing 614, channel estimation 618, rotational scrambling 620, user mapping 622, FFT/IFFT modulation 628, synchronization or frequency shifting 640, and digital filtering via the interpolation block 642. A second set of components 602 can be characterized as a digital front-end and can include blocks for up/down-sampling 638, dual-mode combining 604, crest factor reduction 645 (to reduce or control OFDM signal peaks), and digital pre-distortion 646.

Note that in some cases in cellular base stations, for example, there is often a digital front-end (which can be a field-programmable gate array) and a separate baseband processor. The baseband processor generally refers to the original frequency range of a transmission signal before modulation. In FIG. 6A, the transmitter 502 can represent a single chip that combines the digital front-end and any baseband processor. The same combination of components can also occur in the receiver 512 shown in FIG. 6B.

An embodiment of the satellite-based broadband communications system 100 uses a burst mode orthogonal frequency division multiplexing (OFDM) physical layer modem 500. SAT-SAG links 208 provide backhaul access to the network 108 via the SAGs 106. The UT-SAT links 206 provide multi-user UL access channels to end customers with devices on the network 202. The UT-SAT links 206 operate using orthogonal frequency division multiple access (OFDMA) via both time domain and frequency domain multiplexing. OFDM, also known as multicarrier modulation, transmits data over a bank of orthogonal subcarriers harmonically related by the fundamental carrier frequency. For computational efficiency, fast Fourier transforms (FFT) are used for modulation 628 and demodulation 674. Gateway links 208 between the SAT 104 and the SAG 106 serve as dedicated, point-to point radio links.

In an embodiment, the OFDM signal structure includes multi-carrier symbols with 1024 available subcarriers. FIG. 7 illustrates time and frequency domain properties of the OFDM signal structure 700 in accordance with some embodiments of the present disclosure. Each radio frame includes preamble and payload symbols. The preamble portion or block of a radio frame 720 includes a unique word portion or unique word (UW) symbol 702 and a channel estimation (CE) portion or CE symbol(s) 704. The UW symbol 702 is used for burst detection, symbol alignment, and carrier frequency offset (CFO) estimation. The CE symbols 704 provide a preview of channel characteristics for use in channel estimation and equalization. The payload symbols 709, 711 of the radio frame 720 (also referred to as data symbols) are located within a payload portion/block of the radio frame 720, as shown in FIG. 7. The payload portion can also be referred to as resource blocks that have the user data.

The CE symbols 704 may be located between the UW symbol 702 and the resource blocks 709, 711 along the time axis of a burst 706. In other words, in the time domain, the UW 702 occurs first in a first time period and across the frequency spectrum or across all of the set of frequencies of the radio frame, followed by the CE symbol 704, which is in a second time period and covers at least part of the frequency spectrum. Next are the resource blocks 709, 711 configured in a third time period of the radio frame. An OFDM signal allows certain subcarriers to be inactivated, and a configurable number of subcarriers can be disabled in order to avoid the region of spectrum around DC (also referred to as the DC, center, null, or zero subcarrier region 710). The UW symbol 714, CE s 716, resource blocks 718, 719, a DC null 721, pilot sub-band offsets 723, 725, pilot subcarriers 724, 726 are shown for a burst 728 in the next radio frame 722.

Pilot subcarriers 708, 712 in the radio frame 720 are used to provide and track amplitude, timing, and phase changes throughout the burst 706. Two pilot sub-bands 708, 712 are defined, each offset from the band edges by a specified number of subcarriers. FIG. 7 shows the two pilot sub-bands 708, 712 located distal to each other in the frequency domain (e.g., closer to respective channel bandwidth edges than the DC sub-band). The size or number of the pilot sub-bands 708, 712 and the offset from the band-edges 705, 707 are both configurable. The pilot sub-band offsets 705 can be nulls or can be a groups of pilot signals, subcarriers or tones configured at a top of a frequency range for the radio frame 720 and at a bottom 707 of the frequency range for the radio frame 720. In another aspect, the group of pilot symbols 708, 712 can be positioned near the band edges and adjacent to offsets 705, 707 which can represent an offset between the respective edge and the respective group of pilot sub-band symbols. For wide channel bandwidths, the information provided within the pair of pilot sub-bands for a given radio frame 720 can be the same or differ from each other. A DC sub-band 710 separates a first set of resource blocks 709 and a second set of resource blocks 711. Since the group of pilot symbols 708, 712 are near the band edges, they can be used for linear interpolation across the set of frequencies associated with the radio frame as disclosed herein. See, for example, FIG. 16B, for more details about linear interpolation using the pilot subcarriers 708, 712.

All OFDM payload symbols have two pilot sub-bands, each with half of the OFDM pilot allocation. Pilot sub-bands or subcarrier allocations are configured per channel in the frequency domain in order to track amplitude and phase variation over the course of the burst 706, 728. The two pilot sub-band offsets 705, 707 are located near the upper and lower band edges of the channel. For the multi-user UL channel, each user channel includes two pilot sub-bands offsets 705, 707. For example, in the case of four users simultaneously sharing a single channel, there would be eight pilot bands configured. Furthermore, each pilot sub-band is offset 705, 707 from the band edge by a configurable number of subcarriers. A configurable number of subcarriers located at the center of the passband can be applied or disabled.

Packet header and payload constellation symbols are sequentially assigned to active subcarriers starting from the lowest available subcarrier in each OFDM symbol to the highest. If the last OFDM symbol is partially loaded with payload data, pseudo random constellation padding symbols are used to fill the remaining subcarriers. For the multiuser use case, data symbols are assigned to the user channel allocation in the same manner.

The CE symbols 704, 716 include reference information used for channel probing, and it is transmitted immediately in time after the UW 702, 714. The initial channel estimate is subsequently used to calculate frequency domain equalizer taps. The number of CE symbols (which may be one or more symbols) together with the UW, forms what is called the preamble of the radio frame.

In an embodiment, a Golay sequence or algorithm is used to generate the CE symbols 704, 716. As an example, a CE symbol 704, 716 is generated using a length 1024 Golay sequence. A Golay sequence is a particular type of number sequence that would be known to those of skill in the art. In some embodiments, the CE symbols 704, 716 may also be generated using a random sequence generator.

The OFDM signal frame structure is configured for flexible bandwidth and/or flexible mode use. The OFDM signal frame structure of FIG. 7 can be used to transmit OFDM signals having a variable channel bandwidth. The same OFDM signal frame structure can be used to communicate signals between different nodes (SAT 104, UT 102, SAG 106) of the wireless communication system of FIG. 1. The OFDM signal frame structure allows high flexibility and parameterization for static and run-time configuration. OFDM signals or waveforms configured in accordance with the frame structure of FIG. 7 are also operable in low signal-to-noise ratio (SNR) regimes.

The general modem characteristics that are possible in view of the structure of the radio frame shown in FIG. 7 includes that the bandwidth is changed by changing the sampling rate with the FFT/IFFT size fixed to provide a certain number of available subcarriers. The subcarrier spacing can change as the sampling rate changes. The modulation and coding rates can also depend on the channel SNR conditions and target error rates. The subcarrier user allocation is partitioned into resource blocks 709, 711 (excluding unloaded sub-bands 710) for multi-user (MU) UL use. The MU-UL utilizes both time divisional multiplexing (TDM) and frequency division multiplexing (FDM). TDM is a method of putting multiple data streams in a single signal or radio frame by separating the signal into many time segments, each having a very short duration. FDM is a technique by which the total bandwidth available in a communication medium is divided into a series of non-overlapping frequency bands, each of which is used to carry a separate signal.

The radio frame structure of FIG. 7 further enables the waveform parameters to be configurable. For example, the time-domain cyclic guard band is configurable, the resource block 709, 711 block size can be configurable and variable per burst 706. The user allocation amongst users in a multi-user uplink (MU-UL) mode such that, in one example, one to four users can have user data added to a radio frame 720. The radio frame size can be adjustable as well as the CE symbols 704, 716. The pilot symbols 708, 712, the pilot sub-band offset 705, 707, and pilot averaging are also configurable. The DC guard band 710 is configurable, as well as the modulation and coding scheme. The DC guard band 710 is associated with a null subcarrier or a direct current (DC) subcarrier. In OFDM and OFDMA PHY layers, the DC subcarrier 710 is the subcarrier whose frequency is equal to the RF center frequency of the transmitting station. It corresponds to a frequency zero (DC) if the FFT signal is not modulated.

In an example case, the number of DC subcarriers can be four, the number of resource blocks can be twenty and the number of pilot subcarriers can be fifty-one. This arrangement can enable up to four concurrent users. Other arrangements can be used as well. For example, there could be zero DC subcarriers, sixteen resource blocks and sixty-four pilot subcarriers. In another example, there could be sixteen DC subcarriers, sixteen resource blocks and sixty-three pilot subcarriers. These values are adjustable.

In one example, the uplink user mapping between the UT 102 and the SAT 104 can first depend on the resource block structure, which is specified by the number of DC subcarriers.

Figure 8:
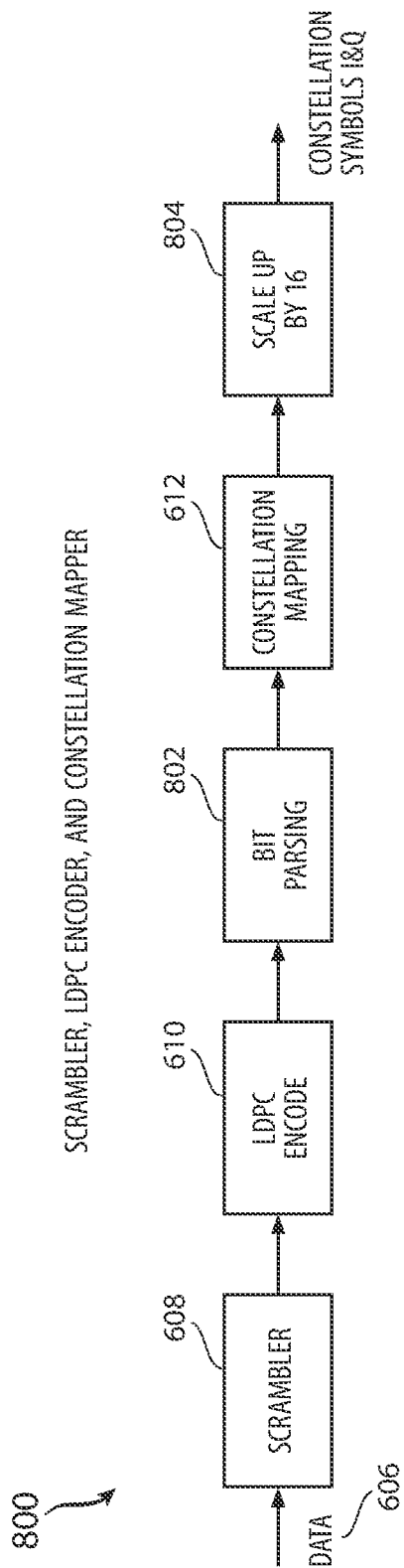
FIG. 8 illustrates a block diagram of various components in the transmitter related to scrambling, encoding and mapping.

FIG. 8 illustrates a block diagram associated with the encoder layer 800 in accordance with some embodiments of the present disclosure which can provide more detail regarding the scrambler 608, encoder 610 and mapper 612 of FIG. 6A. The payload data bits 606 are provided to the transmit bit scrambler 608, which transmits its output to transmit encoder or LDPC encoder 610, after which the bits can be parsed by a bit parser 802 and mapped to constellations by a constellation mapper 612 and then scaled up 804 by a number such as 16. Constellation definitions for BPSK, QPSK, 8QAM, 16QAM, 32QAM, and 64QAM may also be specified. Binary Phase Shift Keying (BPSK) is a two phase modulation scheme, where the 0's and 1's in a binary message are represented by two different phase states in the carrier signal: $\theta=0°$ for binary 1 and $\theta=180°$ for binary 0. In digital modulation techniques, a set of basis functions are chosen for a particular modulation scheme. Quadrature Phase Shift Keying (QPSK) is a form of Phase Shift Keying in which two bits are modulated at once, selecting one of four possible carrier phase shifts (0, 90, 180, or 270 degrees).

QPSK allows the signal to carry twice as much information as ordinary PSK using the same bandwidth. QAM (Quadrature Amplitude Modulation) is the combination of analog and digital modulation method. In order to transmit two analog message signals/two digital bit streams, it modulates the amplitude of the two carrier waves with the help of amplitude shift keying (ASK). There are different orders of QAM as seen above and there is a balance to be made between the data rate and QAM modulation order, power and the acceptable bit error rate. Further error correction can be introduced to mitigate any deterioration in link quality, this will also decrease the data throughput.

The unique word (UW) symbol 634 is used for burst detection, OFDM symbol alignment, power estimation, and carrier frequency offset (CFO) estimation. Different unique words can differentiate among users in the case of user uplink, different satellites in the case of user downlink (e.g., in the case of multiple satellites transmitting to the same area on the ground for reliability and obstruction avoidance), or differentiating polarization in the case of gateway links, In one example, a UT 102 or a SAG 106 does not know where the SAT 104 is in space, plus the fast speed of the SAT 104 causes large Doppler shifts. Normally in cellular communications where the base station is stationary and cellular phones move at most at slow speeds, Doppler effects do not need to be taken into account in OFDM communication. However, the SAT 104 context disclosed herein requires addressing Doppler effects. The digital compensation disclosed herein accounts for Doppler effects and different types of correction are implemented. Absent proper compensation, no communication would be possible using the traditional cellular OFDM protocols in the context of the satellite communication system 100.

In one aspect, of the UT 102 or the SAG 106 knows where a SAT 104 is, and software can compute the proper compensation for the Doppler effect. However, where the UT 102 or the SAG 106 do not know where the satellite is, the burst detector 664 (shown in FIG. 6B) is used to detect the UW at the beginning of every radio frame burst. The structure of the waveform with the UW configured at the beginning of each burst enables the receiver 512 to detect the Doppler offset and implement corrections in block 666 shown in FIG. 6B.

The first embodiment described above focuses on the modem 500 and its structure that is configurable to provide proper transmission and reception for any node in the satellite communication network 100. The second through fourth embodiments focused on specific UT-SAT UL/DL characteristics and the SAT-SAG UL/DL characteristics. Additional particular details of the second-fourth embodiments are discussed next with respect to protocol data unit (PDU) features and radio frame signal features for each respective embodiment.

Waveform Structure for UT-SAT UL Communications

The second embodiment of this disclosure relates to the details of the UT-SAT UL communications. The multi-user mapping operation 604 of FIG. 6A maps user resource block frequency allocations to the band plan at the input of the IFFT 628. In some embodiments, the multi-user (MU) UL resource block configuration depends on the number of DC blocking bins. Each user's (each respective UT 102) block allocation can include contiguous resource blocks as will be shown in FIG. 10.

FIG. 10 illustrates an example multi-user uplink (MU-UL) radio frame configuration 1000 (including OFDM signal structure symbols and characteristics) and MU signal structure with overhead, respectively, in accordance with the second embodiment of the present disclosure. The radio frame configuration 1000 is particularly applicable to the UT-SAT UL channel because, as will be shown, the radio frame 1088 includes resource blocks from more than one UT 102. The "x" axis represents a radio frame 1088 having a time period of 1.5 ms, for example. The time period is configurable at the modem 500 and 1.5 ms is only an example time frame.

The "y" axis is the channel bandwidth which in this example is 62.5 MHz. In one example configurable structure, the 62.5 MHz channel includes 20 resource blocks, each with a 3.125 MHz channel width enabling 2.999 MHz bandwidth and 51 subcarriers. FIG. 10 illustrates the user spectrum allocation for users in various bursts 1002, 1026, 1056 and provides the details regarding the overhead 1086 including the unique word (UW) 1004, 1058 in a first time period 1011 of a first burst 1002 of the radio frame 1088, the channel estimation (CE) symbols 1006, 1060 (in a second time period 1013), and the pilot subcarriers (e.g., subcarriers 1003, 1005, 1007, 1009) and the respective resource blocks in a third time period 1015 of the first burst 1002 of the radio frame 1088. The second time period 1013 covered by the CE symbol 1006 can be adjacent to the first time period 1011 and the CE symbol 1006 can be associated with user data in one or more resource blocks 1008 and cover a channel estimation symbol set of frequency resources that coincide with, for example, a group of pilot subcarrier can be associated with a set of resource blocks 1008. For example, CE symbol ("CE4" in FIG. 10) 1006 (in the second time frame 1013) covers the same set of frequencies that a pilot subcarrier 1003 at a high end of the set of frequencies, the RBs 17-20 1008 and the pilot subcarrier 1005 at a low end of the set of frequencies. The RBs 17-20 1008 can be the user data for one UT 102 of a group of up to four UTs 102 that combine their user data in the first burst 1002 of the radio frame 1088.

The resource blocks of each burst 1002, 1026 1056 in FIG. 10 are allocated to four different users or data from four different UTs, as denoted by four different identified sections within the burst 1002, for example. Each of the four users is allocated contiguous resource blocks (RBs) and CE symbol(s) immediately adjacent to the allocated RBs. The first burst 1002 has a unique word (UW) 1004 and different CE symbols 1006, 1010, 1018, 1022 associated with different groups of user data in RBs. For example, a first user has a first CE symbol (CE1) 1022 associated with a group of RBs 1024 (shown as RBs 1-9) in the first burst 1002. The group of RBs 1024 can represent a number of RBs that are mapped between respective pilot subcarriers (1021, 1023) for including in the burst 1002. A second CE symbol (CE2) 1018 is associated with RB 10 1020 (user data for a second UT) and includes two pilot subcarriers on either side. A third CE symbol (CE3) 1010 is associated with RBs 11-16 1012 (user data for a third UT) and pilot subcarriers 1007, 1009. A fourth CE symbol (CE4) is associated with RBs 17-20 1008 (user data for a fourth UT) and pilot subcarriers 1003, 1005. Each group of RBs has an associated set of pilot subcarriers that are used to define the group of RBs for each UT 102. In one example mapping, 20 resource blocks can be mapped using 51 pilot subcarriers to respective bursts 1002, 1026, 1056.

A null CE symbol section 1014 is adjacent to a DC null 1016. Depending on the payload sizes for the respective users, the number of RBs may differ between the users. Also note the flexibility in allocations between the users from burst 1002 to burst 1026. If fewer than four users is supported in a given burst, at least some of the RBs and adjacent CE symbol sections can be empty (or otherwise denoted as empty or null), as noted above.

Not shown in FIG. 10 are the pilot sub-band offsets that are positioned at the high frequency edge of the channel and the low frequency edge of the channel. These however can be considered as included in the radio frame configuration 1000 shown in FIG. 10. In one aspect, there is simply an offset from the frequency of the channel to prevent interference and in another aspect, pilot sub-band offsets are inserted at the band edges as described above. FIG. 16B shows the use of the pilot sub-band offsets 1624, 1636 at the band edges.

A second burst 1026 has an associated unique word (UW) 1018 and first, second, third and fourth user data from different UTs in different groups of RBs as shall be explained next. The users of the first burst 1002 may or may not be the same four users with data in the second burst 1026. Accordingly, each burst will be discussed with first through the fourth users but they may not be the same users across the bursts 1002, 1026, 1056.

In the second burst 1026, a first user has a first CE symbol (CE1) 1052 for a first group of RBs 1-7 1054 with pilot subcarriers 1051, 1053. Pilot subcarrier 1053 is shown near the lower band edge of the radio frame 1088, which will have a configurable offset (like offset 707 shown in FIG. 7). Although not shown in FIG. 10, each burst may have a set of pilot subcarriers near the band edge but with the offset 705, 707 as illustrated in FIG. 7 or the pilot sub-band offsets 1624, 1636 at the band edges in FIG. 16B.

A second user has a second CE symbol (CE2) 1040, 1048 associated with a second group of RBs 8-11 1050 in the second burst 1026. Note that for the second user, the CE symbol (CE2) 1040, 1048 is not contiguous with a CE symbol null 1044 configured in between a first portion of the CE symbol CE2 1040 and a second portion of the CE symbol CE2 1048. A DC null 1046 is configured between the second user RB11 1042 and RB10 1049. A third user has a third CE symbol (CE3) 1036 and associated RBs 12-13 1038 and pilot subcarriers 1035, 1037. A fourth CE symbol (CE4) 1032 is associated with a fourth group of RBs 14-20 1034 for a fourth user and includes pilot subcarriers 1031, 1033.

A third burst 1056 has a UW symbol 1058 and a first CE (CE1) 1080 associated with a first group of RBs 1-3 1082 for a first user and pilot subcarriers 1079, 1081. A second user has a second CE symbol (CE2) 1076 and an associated second group of RBs 4-10 1078 for a second user, with pilot subcarriers 1075, 1077. A third user has a third CE symbol (CE3) 1068 and an associated third group of RBs 11-16 1070 and pilot subcarriers 1071, 1073. A DC null 1074 is provided as well as a CE symbol null 1072 between the CE2 1076, CE3 1068 and pilot subcarrier 1073 and pilot subcarrier 1077.

A fourth CE symbol (CE4) 1062 has a fourth group of RBs 17-20 1066 for fourth user data with pilot subcarriers 1014, 1015. The radio frame 1088 can consist of any number of bursts 1002, 1026, 1056. Typically, one to four users have their data configured within a respective burst either contiguously as shown in bursts 1002, 1056 but in some cases non-contiguously as shown in the second user RBs 8-11 of the second burst 1026.

Having introduced the concepts outlined above, additional details regarding the UT-SAT UL mode are provided next. The UT-SAT UL mode is discussed with respect to the services provided in this mode, the protocol data unit (PDU) structure and the signal or radio frame structure for this mode.

SAT-UT UL MODE

The second embodiment described herein relates to the SAT-UT UL mode as shown in FIG. 10. The SAT-UT UL mode PDU and signal structure details are discussed next. The service includes the modem PHY (L1) being configured to provide PDU carrying services to one MAC/Network (L2/L3) entity per beam to a remote stack of L1/L2/L3 peers. Each modem beam can be configured to be independently configurable for signal generation parameters.

The PDU details are as follows. The PDU can be configured to be a signaling PDU or generic (data carrying) PDU. A signaling PDU can be configured to be a certain number of bits long and is used for MAC-to-MAC peer messaging. The signaling PDU can be configured to be of different types such as a RACH (random access channel) type. A generic PDU (PDU henceforth) can be configured to be the data bearing PDU. Each PDU can be configured to include at least one codeword with MCS signaled by the MCS value.

Each PDU can be configured to include a generic MAC header (GMH) to allow transmitter 502 (and receiver 512) to know the number of MCS values and the number of codewords for each MCS value. The transmitter 502 (and receiver 512) can be configured to comply with the GMH parameters as per a UT-SAT MAC Interface. PDU details are configured to be communicated between L2 (MAC) and L1 (PHY) using a container structure. The PDU container can be configured to include the RF that the PDU needs to go on. The PDU is configured to be transmitted in a "burst". A burst includes a time-frequency allocation of spectrum signaled from MAC to PHY where the user UL data shall be sent. It is a concept specific to UT-SAT UL.

The PDU container can be configured to include metadata to indicate the burst parameters. The metadata can be configured to also include the channel (up to two channels) the PDU is intended for. One PDU is configured to be sent on the same burst.

A user may have multiple burst allocations 1002, 1026, 1056 in the same RF 1088. In the event of multiple bursts in one RF, the allocations between the bursts are configured such that they do not collide. The metadata can be configured to include the following parameters to describe a burst with their meanings as per UT-SAT interface: preamble index, preamble event counter, start offset, allocation symbol duration, start frequency resource, and/or frequency resource allocated.

The signal details for the SAT-UT UL mode are as follows. The basic unit of MAC-PHY synchronous operation includes a radio frame (RF) 1088. The RF 1088 can be configured to be started (a logical concept as it may not be associated with data transmission) synchronously to timing parameters set by L2 and L1 FW and with the RF numbering set by the MAC. The basic unit of the transmit signal includes a burst 1002, 1026, 1056. Data transmission can be configured to be driven by the RF and burst parameters tied to the data (in the container structure).

To accommodate the concept of a burst, the frequency resources can be configured to be partitioned into resource blocks (RB) 1008, 1012, 1020, 1024, etc. In a synchronous mode, the (logical) RF can be configured to be initiated when a counter value reaches REF_TIME and continue periodically every DELTA_TIME thereafter, REF_TIME and DELTA_TIME are registered values.

In the synchronous mode, the (logical) RF can be configured to be initiated at a particular register value. In the synchronous mode, registers are configured to be updatable at next available opportunity or at a specific time signaled through what is called the ACTION TIME register. In the synchronous mode, DELTA_TIME can be configured to be updatable at next available opportunity.

The L2/L3 data can be configured to be back pressured to the networking blocks if internal 4K TX buffers are full. Each (logical) RF 1088 can be configured to include one or more OFDM symbols. Each (logical) OFDM symbol can be configured to be padded with a plurality of null bins on each end (pilot sub-band offsets as shown in FIG. 16B) and converted to the time domain with a multi-point IFFT as shown in FIG. 6A.

Each OFDM symbol can be configured to be pre and post-pended by a certain number of samples on each end post-IFFT in the time domain. The number of OFDM symbols in the RF 1088 can be configured to be signaled with a particular register. The size of the RF can be configured to be the time occupied by the symbols plus the time to transmit the UW 1011, 1028, 1058. Each (logical) OFDM can be configured to include a particular number of "sub-carriers" that can be used. The subcarriers are configured to be either unoccupied (DC Null) 1016, 1046, 1074 or burst data. The allowed (size) ranges for the programmable signal parameters can be pre-set values or dynamic values and can include the DC Null and the CPP.

Each (logical) OFDM symbol can be configured to be made up of a fixed or variable number of resource blocks (RBs) 1008, 1012, 1020, 1024, etc. The number of RBs can be configured to be a function of the number of DC Null subcarriers. Each RB can be configured to include an equal number of subcarriers.

For example, for a DC Null of 0, there can be 16 RBs and a pre-set or dynamic number of subcarriers per RB. For a DC Null of four, there can be 20 RBs and a pre-set or dynamic number of subcarriers per RB. FIG. 10, bursts 1002, 1026, 1056, each show 20 RBs in the respective burst which could thus correspond to a DC Null 1016 of four. For a DC Null of 16, there can be 16 RBs and a pre-set or dynamic number of subcarriers per RB.

The (logical) OFDM symbol can be configured to be partitioned into the RBs by first removing the DC NULL subcarriers and then dividing the remaining subcarriers into the number of RB per the data above. The RB subcarriers are configured to be pilot subcarriers or data subcarriers coded and modulated using the one signaled in MCS value. The subcarriers of the first (logical) OFDM symbol of the assigned burst can be configured to be a channel estimate (CE) symbol 1006, 1010, 1018, 1022, 1032, 1036, 1040, 1048, 1052, 1062, 1068, 1076, 1080. There may be one or more CE symbols per time period and each CE symbol can correspond to a group of RBs for a user.

The allowed size ranges for the programmable signal parameters can have pre-set values or dynamic values as follows: pilot subcarriers, pilot sub-band offsets, and/or CE symbols.

The time domain signal can be configured to be streamed to the digital beam former (DBF) on the transmission PHY interface with a 67.5 MHz sample rate. The 67.5 MHz sample rate signal can be the 9/8 oversampled signal that is achieved by taking 1152 pt IFFT on a 1024 pt signal—of the 60 MHz signal. This is nominally referred to as the 62.5 MHz BW signal.

The signal generation is consistent with the information provided above. The digital baseband (DBB) signal can be configured to be constructed in accordance with the mask requirements with no further filtering assistance from the DBF.

The transmitter signal may be pre-compensated for Doppler frequency offset (CFO) and sampling clock offset (SFO) and sampling clock offset (SFO) that are the consequence of local and remote reference oscillator differences and the Doppler effect due to SAT 104 primarily and potentially in case of UT 102 movement as well.

The transmitter signal may be conditioned for crest factor reduction (CFR) 645 and/or digital pre-distortion (DPD) 646 to assist with power amplifier (PA) linearity, efficiency, and/or power consumption for a given signal quality.

UW Generation

Having introduced the details regarding the radio frame configuration 1000 in FIG. 10, this disclosure further discusses the generation of the unique word (UW) sequences as shown in FIG. 12. Distinct orthogonal UW sequences can be used for different UL user channels. The UW symbol 634 (See FIG. 6A) can be a time domain signal generated using a 128 sample BPSK code word, PN-rotated into QPSK, and repeated eight times within a length of 1024 symbols. As shall be explained below, the eight repetitions of the UW sequence can be used to estimate frequency offset and to correct for Doppler effects. FIG. 12 illustrates a block diagram 1200 showing sub-blocks included in the UW symbol 634 of FIG. 6A in accordance with some embodiments of the present disclosure.

A channel identification (ID) can be provided to a PN generator module 1202. A QPSK dibit generation component 1204 provides data to a PN modulator 1206. A dibit can be any one of four patterns from two consecutive bits: 00, 01, 10 or 11. The dibits can be stored in memory or generated by a linear-feedback shift register, for example with a Gold Code primitive polynomial. The PN modulator 1206 also receives a PN from the PN generator module 1202. The output of the PN modulator 1206 is repeated a number of times, such as eight, within a length of 1024 symbols to generate a group of code words. The first of the eight code words can be inverted by an inverter 1210 for use in burst detection. The use of eight repeated code words can vary and is configurable. The last six code words are used for carrier frequency offset (CFO) estimation as shown in FIG. 14C by tracking a change in phase over time for the series of code words.

UW generation can use a 7-bit linear feedback shift register (LFSR) to calculate PN sequences according to pre-defined initialization values and LFSR generators for respective channels. UW generation can begin with a periodic sequence of dibits 00, 01, 11, 10, 00, 01, 11, 10, etc. The dibit symbols are mapped to QPSK by the PN modulator 1206 in accordance with a pre-defined UW constellation definition mapping.

The generation of the output from FIG. 9 can also be used for generating unique words. The general idea is that the produced UWs are orthogonal to each other similar to a code-divisional-multiple access (CDMA) approach. Where there are multiple users, the UWs need to be unique and orthogonal to each other and FIG. 9 illustrates one example approach of generating unique and orthogonal UWs for use in the respective bursts of radio frames. For example, the PN generation approach of FIG. 9 can be used in the PN generation component 1202 of FIG. 12.

When multiple users are transmitting data, for example on the UL between UTs 102 and the SAT 104, then different UWs are utilized. However, in another aspect, for point-to-point communication between the SAT 104 and the SAG 106, the same UW word can be used over and over and in this sense, the UW word may not be "unique" or different in every burst of a radio frame.

Having introduced the details of the radio frame structure in FIG. 10 and discussed the generation of the group of UW generation in FIG. 12, this disclosure returns to the discussion of the transmitter 502 in FIG. 6A and the receiver 512 in FIG. 6B. In one aspect, a set of transmit synchronization blocks can include the resampling filter 638 and the frequency shifter 640 shown in FIG. 6A. The resampling filter 638 can be configured for the UT-SAT UL channel, and it can precompensate for sampling frequency offset (SFO) due to Doppler shifting and modem oscillator error. FIGS. 13A-13F discuss in more detail the handling and correction for SFO and carrier frequency offset (CFO).

The digital front-end 602 can include multiplexing, dual-channel combining 644, crest factor reduction (CFR) 645, and digital pre-distortion (DPD) 646. IQ compensation can also be performed in the digital front-end 602. IQ compensation relates to an amplitude and phase imbalance in a waveform with respect to in-phase (I) and quadrature (Q) signal paths that require correction. Note that the digital front-end 602 configured on the same chip as the other blocks shown in FIG. 6A illustrates an innovation of this disclosure where typically the digital front-end 602 is separate from other components.

The output from any gain control provided by the DPD 646 is provided to the digital-to-analog conversion (DAC) block 647 for transmission to a receiving node. The DPD 646 operation attempts to invert the non-linear power amplifier (PA) gain transfer function. There are a number of different digital pre-distortion techniques the can be used, as are outlined in several of the provisional patent application in the priority claim of the present case. Broadband OFDM signals have large peak-to-average power ratios (PAPR) resulting from the summation of a large number of subcarriers causing large yet infrequent signal peaks. The large peaks cause the PA to be driven into the non-linear region of its gain transfer characteristic and can cause saturation of digital output. This in turn reduces the PA efficiency. The CFR module 645 methods reduce PAPR and allow the modem to drive the PA with higher power signals. Gain control through the CFR module 645 and/or the DPD 646 can be used to compensate for weather issues and phase array loss as well, which can be a function of the steering angle used to direct the beam of energy in a certain direction.

In an embodiment, a peak cancellation scheme or technique can be utilized in the present disclosure system to achieve CFR. Any CFR technique implemented in the system is configured to maximize the peak reduction while satisfying EVM (error vector magnitude) and spectral mask constraints. The peak cancellation technique detects signal peaks above a specified threshold followed by cancellation of each individual peak using a spectrally compliant estimate.

Digital pre-distortion techniques implemented by the DPD 646 can be used to linearize the PA input-output gain characteristic. Although traditionally considered a memoryless non-linear device, for wideband RF communications applications, memory-based PA models are common. A digital pre-distortion module 646 can be configured in the RF transmitter 502 and further details of various digital pre-distortion approaches are found in the applications incorporated by reference above.

The UT UL transmitter 502 can be configured with a bandwidth of 62.5 MHz in the Ku band. A radio frame may contain multiple bursts, each supporting up to four simultaneous users as shown in FIG. 10. Other numbers of users greater than or less than four are also contemplated. Multi-User mapping as described above illustrates how the OFDM channel is configured to support the MU UL channel. Ground station pre-compensation is used to ensure that all four users' signal arrive at the satellite receiver properly aligned and synchronized. This requires a combination of resampling, frequency shifting, and/or delay timing. FIGS. 27-28 describes a delay timing associated with a group of UTs 102 communicating with a SAT 106. The resampling and frequency shifting compensation values are calculated using a combination of the Doppler estimate and the modem clock frequency offset estimate. The delay timing scheme provides the transmitter with a kick-off signal based on the timing of the DL signal received from the satellite, the GPS location of the user terminal, and satellite ephemeris information.

In one aspect, an adjustment in the delay timing can also be made to account or correct for any delays related to changes in the environment and thus radio frequency (RF) components in a node of the network, drift due to the aging of power amplifiers, or other reasons that can be related to a phased array antenna, or the distribution of data on the phased array (e.g., SERDES delay).

In the SAT to UT transmitter 502, the Ku band DL can include a single 250 MHz channel broadcast to all users in a beam spot. The SAG to SAT transmitter 502 uses a single 500 MHz channel in the Ka band. The SAT to SAG transmitter 502 also uses a single 250 MHz Ka band channel. These are example bands and other bands could also apply.

FIG. 6B illustrates a block diagram showing at least a portion of a receiver 512 configured to receive, decode, and reconstitute OFDM signals or waveforms in accordance with some embodiments of the present disclosure. The receiver 512 (or a portion of the receiver) shown in FIG. 6B may be included in the modem 500, a modem chip, an IC chip, a system on chip (SoC), a UT 102, a SAT 104, a SAG 106, a component of the wireless communication system, and/or the like. The input of the ADC 655 of the receiver 512 is configured to electrically couple 654 with an antenna or antenna system (e.g., antenna, power amplifier, front-end module, etc.). Note that in many typical instances, some of these components are on separate boards or chips. In one aspect, this disclosure includes an integrated DAC 647 and ADC 655 for use with analog front-ends for both a receiver 512 and a transmitter 502 on the same processor board or chip and in the same modem 500 physical configuration. Where the system switches to digital processing, the receiver 512 can receive from the digital beam former (DBF) 656 a signal at the SERDES module 657 which can transmit the signal to the multi-rate component 658.

The example OFDM receiver 512 is shown with a demodulation layer 652 and a demodulation and decode layer 653. In one aspect, the demodulation layer 652 performs initial processing as an OFDM receiver and processes all user signals simultaneously. For example, in the DL from the SAT 104 to a group of UTs 102, each burst in the radio frame (see FIG. 10), can include multiple user data. The initial demodulation layer 652 of the receiver 512 can process all of the user data in a respective burst simultaneously before the demodulation and decoding layer 653 performs per-user processing and one to four instances of this layer can be operational at any one time.

In an embodiment, the OFDM receiver 512 demodulates and decodes the signals for all use case configurations. The faster Fourier transform (FFT) demodulator 674 runs at a sampling rate of two times the Nyquist rate for each case. Therefore, as the channel bandwidth changes, the receiver sampling rate changes accordingly. The OFDM receiver 512 can operate in single user or multi-user mode. The time domain signal processing is the same for both cases. In multi-user mode, up to four user signals are frequency domain multiplexed and processed independently in the frequency domain section of the receiver.

The receiver 512 front-end 652 is designed to operate with both analog and digital beamforming used in conjunction with different RF front-ends. As such, a multi-rate filtering block 658 can be used to match the sampling rates from the RF front-end to that of the receiver 512. Multi-rate filters are used to implement fixed ratio resampling for cases when the receiver input sampling rate does not match the signal path over-sampled by a certain rate. The multi-rate filtering block 658 can be a multi-tap FIR poly phase filter. In one aspect, the multi-rate filtering block 658 can use 16/9 interpolation to match the receiver digital beam-forming sampling rate with the FFT sampling rate used by the FFT 674. The FFT 674 can be configured with the receiver 512 and deployed on a SAT 104 can be a common FFT that demodulates multiple UT-UL OFDMA (orthogonal frequency division multiple access) symbols, which is a multi-user version of OFDM (orthogonal frequency division multiplexing).

An analog/RF front-end 652 associated with the receiver 512 can include the antenna (not shown), a low noise amplifier (LNA) (not shown), a down converter (not shown) an analog-digital converter (ADC) 655, an IQ imbalance compensation block 659 and an analog low pass filter (LPF)

660. The signal or waveform received from the ADC 655 can be transmitted to the IQ imbalance compensation block 659. In an embodiment, the IQ imbalance compensation block 659 can be included in the OFDM receiver 512. IQ imbalance can result from a slight error in complex down conversion. IQ imbalance can occur due to mismatches between the parallel sections of the receiver chain dealing with the in-phase (I) and quadrature (Q) signal paths. This causes a magnitude and phase mismatch downstream of the mixer, which results in a complex conjugate image impairment in the frequency domain. The imbalance can be modeled by a first matrix and corrected by a second matrix.

More complex solutions can rely on frequency dependent compensation. IQ delay imbalance may occur as noted above due to component variation between the two parallel paths. This can include an antenna delay that needs correction. A Farrow filter in the receiver 512 can compensate for IQ delay imbalance using an additive fixed delay in one of the IQ paths, which can also compensate for sampling frequency offset (SFO).

The integration of various components onto the same configurable chip can include specifically the integration of the DAC 647 with the ADC 655 on the same chip. Usually these are separate components depending on the particular application. However, both these features are combined into the same configurable modem 500 in this disclosure.

A channel filter suppresses adjacent channels for the case when the receiver input sampling rate is over sampled by a certain factor. A multi-tap FIR (finite impulse response) LPF (low-pass filter) 660 may be included in the OFDM receiver 512, in accordance with some embodiments of the present disclosure.

A programmable frequency offset correction can be applied via the complex mixer or frequency shifter 662 and the resampling (Farrow) filter 661. The resampling blocks 638 (in the transmitter 502), 661 (in the receiver 512) correct for two types of SFO error: The first type of error that is corrected is where, within a single symbol, spectral compression/expansion (frequency shift proportional to subcarrier frequency) causes inter-carrier-interference (ICI). The second type of error is an accumulating timing error that accumulates across the radio frame and eventually consumes time-domain samples of the cyclic prefix and postfix (CPP) symbol or value for later OFDM symbols, causing inter-symbol-interference (ISI). Details of the ISI issue are shown in more detail in FIG. 13F.

To correct both of these errors the resampling blocks 638, 661 in the modem 500 disclosed herein perform a true time-domain sample rate conversion using a Farrow fractional delay structure and timing controller. One of skill in the art will understand the Farrow structure to be applied for correction of these errors.

In some embodiments, one or more frequency shifters 662 are included in the receiver 512. A first frequency shifter 662 can be used to remove gross carrier frequency offsets (CFOs) caused by an error in the local oscillator (LO) frequency relative to the near end LO, as well as the Doppler frequency shift at the LO frequency. Modem software may provide the settings for this frequency shifter 662 for each radio frame.

A burst synchronization block 664 provides burst detection, symbol alignment, power estimation, sampling frequency offset (SFO), carrier frequency offset (CFO) estimation, and channel ID detection. Burst detection 664 utilizes the inserted UW to detect the beginning of each burst in the radio frame (see FIG. 10 as well as FIG. 14C).

Note that FIGS. 13A-13F will discuss in more detail handling the SFO and CFO issues. The need for correction due to Doppler shifts is primarily because the satellites 104 move at approximately 7.8 km/sec and the carrier frequencies are high, such as in the range of 12-30 GHz. These parameters naturally lead to offsets (timing and frequency) when attempting to synchronize radio frames between nodes in the satellite network.

FIG. 13A illustrates the Doppler impact and differences in a crystal oscillator (Ref. XO) 1316, 1338 at either side of a communication channel. The system 1300 in FIG. 13A includes a UT 102 having a modem 1303 (similar to modem 500) that has a modulator 1306, a digital to analog converter 1308, a combining component 1310, a power amplifier 1312 and an antenna 1314. The modem 1303 also includes a reference oscillator (XO) 1316, digital-to-analog converter phased-lock loop (PLL) 1318 and a local oscillator PLL 1320. The signal transmitted from the UT 102 to the SAT 104 experiences a Doppler shift causing both CFO and SFO. The SAT 104 includes a modem 1304 (similar to modem 500) with an antenna 1322, a signal processor 1324, a power amplifier 1326, a combiner 1328, an analog-to-digital converter 1330, a demodulator 1332, a digital-to-analog PLL 1334, a local oscillator PLL 1336 and a Ref. XO 1338.

Frequency offsets are produced by relative-motion Doppler and/or differences in the respective crystal oscillator (Ref. XO) 1316, 1338 frequency on either side of the communication link. In any case, the effect is a speeding up or slowing down of the RF signal as measured by the receiver compared with what was transmitted. If the RF signal is a modulated waveform with some center carrier frequency, it is convenient to consider the effect on the carrier and the modulated waveform separately as (1) a carrier frequency offset (CFO) or a shift in the received frequency by a fraction of the LO RX frequency and/or as (2) a sampling frequency offset (SFO) or a change in the rate of modulated baseband samples, symbols, and frames as seen by the receiver 512. The impact of these two effects can be analyzed somewhat independently. With the OFDM waveform disclosed herein, the CFO and SFO can cause different types of inter-carrier interference (ICI) and other degradation that lowers achievable data throughput if not corrected.

FIG. 13B illustrates in simplified form the various components of FIGS. 6A and 6B. This figure shows that the transmitter 502 can apply a correction for CFO and SFO in one or more of the complex mixer 632, the resampling component or Farrow filter 638. The effects introduced in the process include the transmission XO error (CFO+SFO) 1342, the Doppler error (CFO+SFO) 1344 and the receive XO error (CFO+SFO) 1346. On the receiver demodulator 512, one or more of the resampling filter 661, complex mixer 662 and burst synchronization block 664 are the components that perform correction for CFO and SFO.

The output of each transmitter 502 has a firmware-programmable frequency offset correction (CFO pre-compensation). The complex mixer block 632 can be programmed to pre-compensate for Doppler and/or local XO offset calculated by firmware. The complex mixer 632 is also used by default for ½ bin offset (to achieve spectrum symmetry). The TX frequency shifter (which can occur in the complex mixer 632) should not exceed +/−8 subcarriers or else the spectrum can be shifted enough to get filtered by the TX mask FIR filter 640.

In FIG. 13A, the UT 102 is transmitting to the SAT 104 which is moving away from the UT 102 (for the line-of-sight component of its velocity). The relative motion causes a Doppler shift and the SAT 104 receives a lower-frequency and lower-rate waveform than what was transmitted. If the SAT 104 is transmitting instead, the UT 102 also receives a lower-frequency and lower-rate waveform by the same factor (Doppler is reciprocal). In one example, the length between the SAT 104 and the UT 102 can be 550 km in a low Earth orbit links and the Doppler impact can range from −21 ppm (parts per million) to +21 ppm during a pass. As shown, the transmission from the transmitter 502 to the receiver 512 can cause, as is shown in FIG. 13B, TX XO error (CFO+SFO) 1342, Doppler error 1344, and RX XO error (CFO+SFO) 1346.

A crystal oscillator error gives almost the same effect if the LO and converters are locked to a reference oscillator 1316, 1338. The effect is identical to Doppler except that the shift will be in opposite directions for UL versus DL.

Crystal frequency error is introduced by variations in manufacturing, aging defects, and especially changes in temperature. Errors in the +/−1 ppm to +/−10 ppm level are typical for temperature compensated crystal oscillators (TCXOs). A small change in clock rate is also caused by special (motion) and general (gravity) relativistic effects—but it is quite small in low Earth orbits (about 0.2 ppb or parts per billion).

FIG. 13B illustrates a combination 1340 of the transmitter 502 and the receiver 512 that shows the components previously introduced in FIGS. 6A and 6B and that highlights in bold the components that compensate for CFO and SFO. As many of the components in FIG. 13B are already discussed in FIGS. 6A and 6B, and have corresponding call-out reference numbers, a few of the components that particular pre-compensate and post-compensate for CFO and SFO are discussed below. For example, CFO and/or SFO compensation can occur at least in part via one or more of the complex mixer 632 and the resampling (Farrow) filter 638 to pre-compensate for Doppler error 1344 and/or local transmitter XO offset 1344.

On the receiver 512, gain control 657 can be provided to compensate for weather and/or phase array loss, which can be a function of a steering angle. The gain block 657 can also apply a coarse gain to set an operating point of a demodulator datapath with respect to full scale level to minimize downstream quantization.

The channel between the SAT 104 to the UT 102 or a SAG 106 does not have multi-path issues but it does have slow variations due to clouds or other changes in the atmosphere. Electromagnetic signals propagate or attenuate through water or clouds differently based on the frequency. Some compensation is used to correct for this. The power can be increased at gain block 657 to compensate for such attenuation. The phase array antennas, as the system steers the beam off a broadside view, or as the beam becomes more slanted, the nature of the phase array is such that the transmit and the receive gain goes down. The natural result of the adjustment of the angle of the beam (called cosine loss) can be accounted for through an increase in gain at the gain block 657.

Path loss can also occur due to the movement of the SAT 102 between the UT 102 or the SAG 106. The system can calculate the distance associated with this path loss, which can be related to the waveform decay due to this path loss. The system can therefore seek to account for this path loss as well. Note that the adjustments made for Doppler, path loss, or any other losses or offset can be compensated for both in whole or on part on a transmitter 502 and/or a receiver 512 of the modem 500 no matter what the node in the system 100.

As shown in FIG. 13B, on the receiver 512, an adjacent-channel-interference (ACI) filter 659 can be used to identify the margins on either side of the band to identify any adjacent channel interference. The ACI filter 659 can also be used to digitally reject adjacent channel interference from other satellites, terrestrial sources, etc. The ACI filter 659 can also prevent FFT leakage into pilot sub-band offset 705, 707. Four components are shown in bold in FIG. 13B on the receiver 512 for correcting for CFO and SFO. The first three bolded components are the resampling (Farrow) filter 661 that resamples the signal, followed by the application of a programmable frequency offset correction by the complex mixer 662. Next, burst detection can occur by the burst detector 664. These components can be used to post-compensate for the Doppler error 1344 and/or the local receiver XO offset 1346 calculated by firmware on the modem 500. The fourth component in the receiver 512 that corrects for CFO and SFO is the pilot processing block 690 discussed below.

FIG. 13B illustrates an output of the FEQ block 686 processed by a phase estimation block 687 that estimates the phase of the pilot subcarriers and which is used for tracking residual Doppler and phase noise. A 3-pt moving average (MA3) block 689 calculates a 3 point moving average in time of the pilot estimates to improve their estimation at lower signal-to-noise levels. Pilot processing is shown in block 690 of FIG. 13B. After the FFT module 675, and throughout the radio frame, pilot symbols are employed to track subcarrier phase and amplitude variations (from LO phase noise, and residual SFO and CFO that still exists after channel estimation 684). Pilot symbols consist of known pseudo-random or pseudo-noise (PN) QPSK points that are measured by the demodulator 652. Any measured phase or amplitude error is removed and the same correction is applied to all data subcarriers in the given time-domain symbol (after linearly interpolating the correction between upper and lower pilots over frequency). Note that a respective group of pilot subcarriers 708, 712 adjacent to the pilot sub-band offsets 705, 707 (shown in FIG. 7) can be used for linear interpolation across the frequency band. Pilot processing can be optimized for low-Earth orbit (LEO) satellite channels. The pilot processing block 690 can perform phase interpolation across the band to track delay variation. Pilot groups can be optimized to track phase noise as well.

Preferably, pilot subcarriers 708, 712 adjacent to the pilot sub-band offsets 705, 707 are used for linear interpolation across the frequency band. However, any two pilot subcarriers in a burst of a radio frame could be chosen for interpolation. Other interpolation analysis other than linear could also be used.

There is a benefit to the UT 102 to SAT 104 channel over traditional cellular channels where cell phones communicate with base stations. The system in the UT to SAT context can make assumptions about the line-of-sight channel in order to simplify the analysis. One reason for this is that between a ground station (UT 102 or SAG 106) and a SAT 104, there is typically less multipath scattering compared to normal cellular communications (3GPP) or other WiFi communication between a base station and a cellular phone. The waveforms disclosed herein assume a line-of-sight signal. For example, the channel estimations in a channel estimation block 684 are done once at the beginning of the burst, and then the system assumes that any variations in the channel are based on two simple effects. One is that the phase offset between the transmitter 502 and receiver 512 can change over the duration of the burst, and the other effect is a large delay change that can occur over time. Both these effects come from Doppler impacts, which are dramatic in the links disclosed herein.

The pilot processing 690 modules are designed to assume that a phase offset may change from OFDM symbol to OFDM symbol. Phase change can also come from phase noise due to changes in a local crystal oscillator 1316, 1338 on both a transmitter 502 and a receiver 512 that generates the reference clock. The crystals on each oscillator are different and temperature can impact them. The output of the oscillator is also multiplied by a phased-lock loop (PLL) 1320, 1336 so that there is an analog circuit that multiplies the signal up to the RF frequency, which can be up to 12-30 GHz. In this case, the phase error gets scaled up further due to the use of the PLL. The modem 500 needs to track this large phase change or phase noise between the transmitter 502 and the receiver 512. The pilot sub-band symbols are independently estimated on every OFDM symbol to address this high phase noise due to these factors (oscillator issues and Doppler issues) which manifests as phase error in time or delay error in time.

As noted above, the receiver 512 can also do a linear interpolation over frequency using the pilot sub-band symbols. Two pilot groups are established. As shown in FIG. 7, one pilot sub-band offset 707 is at a low frequency in the frequency band and the other pilot sub-band offset 705 is at the high frequency in the frequency band. Adjacent to each offset is a few pilot symbols 708, 712 in different bins, and each pilot sub-band is a typically QPSK sequence. The pilot symbols 708, 712 are used to estimate the current phase offset between transmit and receive and the system can average it locally for the high frequencies and separately for low frequencies and can thus identify a high frequency phase error and a low frequency phase error separately. The system then assumes it can linearly interpolate over the band using the high frequency phase error and the low frequency phase error across all of the frequencies in the radio frame. The receiver 512 can calculate a linear slope of phase in the frequency domain. The linear slope can correspond to a delay in the time domain (per the FFT). The phase correction process uses the pilot subcarriers adjacent to the pilot sub-band offsets 705, 707 at the band edges and a simple linear slope over frequency to account for and identify the phase error. It is a simple use of the pilot symbols 708, 712. The system can ignore other impacts and since the Doppler impact causes a large delay and phase change, this approach can be used to correct for these changes. In one aspect, the use linear interpolation across the set of frequencies can adjust for the residual error identified after the corrections made for the channel estimation that occurs from the channel estimation block 684. For more details, FIG. 15 illustrates a method of processing channel estimation symbols. FIG. 16B also illustrates the use of pilot subcarriers 1626, 1634 for linear interpolation over a number of symbols.

Note that in some cases there are multiple sets of pilot symbols used to differentiate each respective group of resource blocks for different users. Where the system is performing a linear interpolation across the set of frequencies, the system can choose any two sets of pilot symbols and may choose pilot symbols 1031 and 1053 as shown in FIG. 10 as they are the groups of pilot symbols near the band edges (with the offsets which are not shown in FIG. 10).

Pilot tracking via the pilot processing block 690 corrects and eliminates (1) residual CFO causing a growing phase rotation error over time between symbols; (2) SFO causing a linear phase error slope over subcarriers that also grows steeper over time with later symbols; and (3) any phase noise which may afflict TX or RX local oscillators.

FIG. 13C illustrates a table 1350 that shows the various sources of error and the impacted subsystem, as well as whether the issue is CFO or SFO. Specifically, as shown, in some cases the error source is the transmitter Ref. XO 1316 and the impacted subsystems can include the baseband DSP and DAC sampling rate which impacts the SFO. The error source can also the transmitter Ref. XO 1316 and the impacted subsystems can include the local oscillator upconversion frequency, which causes the CFO. When the error source is the relative motion (Doppler effect) between a UT 102 and the SAT 104, it can impact the RF propagation and can cause both CFO and SFO. When it is the receiver XO 1338 as the error source, it can impact the local oscillator downconversion frequency and cause CFO. Also, when the receiver XO 1338 is the error source, it can impact the baseband analog to digital converter and digital signal processing sampling rate and cause SFO.

The CFO and the SFO can be derived using values such as $\epsilon_{TX}$ which can equal the Ref. XO error ppm/$10^6$, $\epsilon_{Doppler}$ which can equal the relative velocity of the signal divided by "c" or the speed of light in a vacuum, and $\epsilon_{RX}$ which can equal the Ref XO error ppm/$10^6$. The total error can be: $\epsilon=\epsilon_{TX}+\epsilon_{Doppler}-\epsilon_{RX}$. Thus, the SFO can equal $\epsilon \times Fs$ (the sampling frequency times the error value) and the CFO can be $\epsilon \times f_{LO}$ (the frequency of the local oscillator times the error value). There are any number of different ways in which the SFO and the CFO can be derived.

Figure 13D:
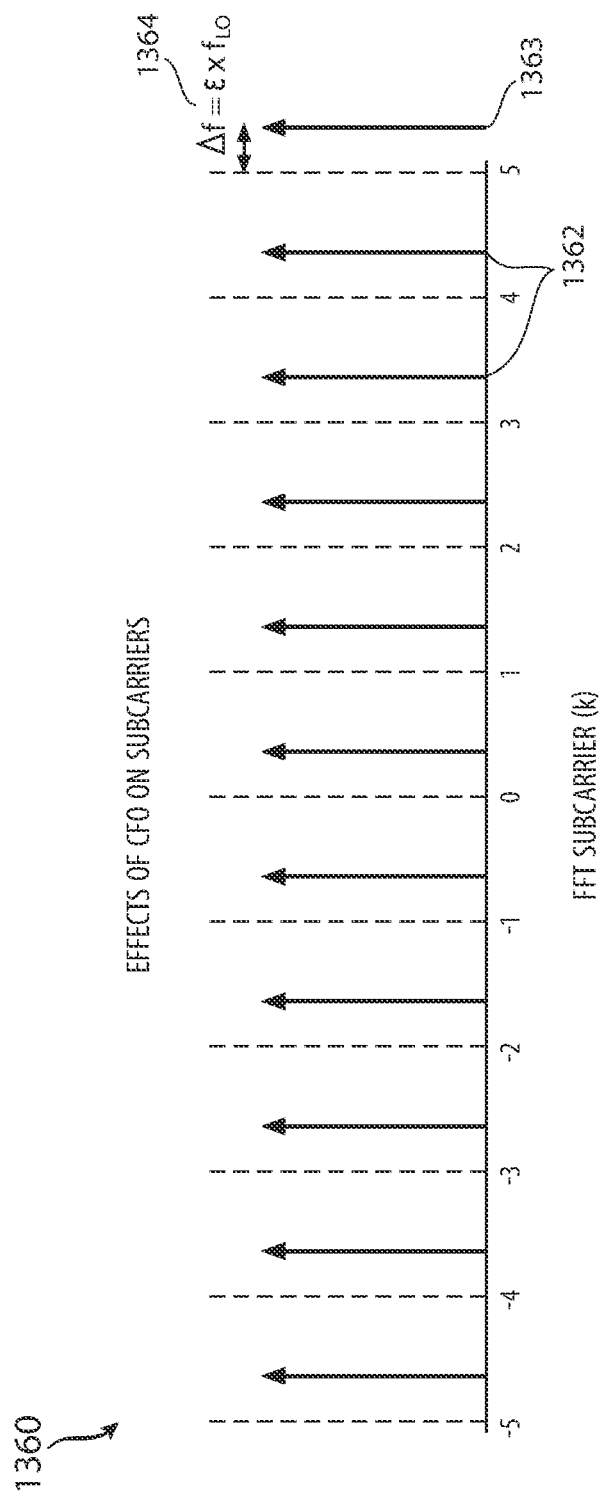

FIG. 13D illustrates the effect of CFO on subcarriers in graph 1360. A CFO causes a shift of $\epsilon \times f_{LO}$ 1364 in the frequencies of each subcarrier 1362 in an OFDM waveform. Subcarrier 1363 is shown as being shifted. The shift has a few effects on the output of the demodulator FFT 674. First, it causes a minor reduction in amplitude received for a given subcarrier. Next, a phase shift (independent of subcarrier) can occur that will accumulate in subsequent FFT frames. Third, a significant inter-carrier interference (ICI) can occur due to the offset subcarriers being inexactly orthogonal with the FFT bases.

The first two effects are corrected by pilot tracking undoing phase and amplitude errors, but the third effect (the ICI) is not easily corrected after the FFT is performed. Therefore, the CFO should be pre-corrected in the time domain to limit the CFO to a tolerable level of ICI. The amount of ICI caused by any residual CFO can be calculated and the impact on per-subcarrier SNR derived as an effective signal-to-interference-plus-noise-ratio that is due to both additive noise and the ICI. An example derivation can be found in the article: Moose, Paul H., "A technique for orthogonal frequency division multiplexing frequency offset correction", IEEE Transactions on communications 42.10 (1994): 2908-1914, incorporated herein by reference. There is a dB penalty or loss caused by the ICI as a function of the frequency offset e and the operating Es/No (the energy per symbol to noise density ratio, which is similar to the SNR). If the ICI error is approximated as independent (white) additive Gaussian noise, the predicted loss (dB) for different operating Es/No levels can be shown and in simulation at 18 dB and 24 dB operating Es/No, and found to agree within about 0.02 dB.

One example can apply to the UL between the UT 102 and the SAT 104. In the UT-SAT UL, the channel bandwidth can be 60.0 MHz, or the subcarrier spacing is 60 MHz/1024=58 KHz. If the uplink SNR is nominally 18 dB, the effective SNR with a frequency offset error is found by plotting the formula above from the Moose reference above across various values of a UT frequency error in KHz. In one example, the target residual offset should be no more than ±645 Hz to limit SNR loss to less than 0.1 dB. In another example, the target residual offset should be no more than ±1 KHz to limit the SNR loss to less than 0.23 dB.

Two other effects of CFO that can be discussed. A first is the shifting of the waveform outside of filter bandwidths. In the receiver 512, an adjacent-channel-interference (ACI) filter 659 (shown in FIG. 13B) has about +/−23 subcarriers of margin on either edge of the band (before a 1 dB rolloff). More significantly, a transmit mask filter only has +/−8 subcarriers of margin. This must be considered if pre-shifting a transmit waveform with the transmitter Freq-Shifter 640 because the mask filter is applied after the shift.

Another impact of CFO is the effect on LO leakage. LO leakage is caused by feedthrough of the local oscillator signal into the transmit waveform (which is radiated over the air). LO leakage can also be caused in the receiver 512 where self-downconversion of the LO causes an erroneous DC term at baseband. The same LO leakage effects can also be caused by DC offsets in the baseband DACs 647 or ADCs 655. It is noted that frequency offsets can affect LO leakage differently than the rest of the OFDM waveform—moving the LO term relative to the OFDM and causing interference on data subcarriers.

The following Table 1 outlines the different frequency shifting sources 1-5 and whether the respective source shifts OFDM signals relative to the TX LO leakage and/or the RX LO leakage.

TABLE 1

| Frequency Shifting Source | Shifts OFDM relative to TX LO Leakage? | Shifts OFDM relative to RX LO Leakage? |
|---|---|---|
| 1. Digital TX Freq. Shifter | Yes | Yes |
| 2. TX Ref XO Freq. Error | No | Yes |
| 3. Doppler | No | Yes |
| 4. RX Ref XO Freq. Error | No | Yes |
| 5. Digital RX Freq. Shifter | No | No |

The issue with shifting sources 1 and 5 in Table 1 can be controlled by firmware. One observation is that uncontrollable effects of shifting sources 2-4 from Table 1 shift the OFDM relative to the RX LO leakage. Whereas only the first item, the digital TX frequency shifter, shifts the OFDM relative to both TX and RX LO leakage.

If both TX and RX LO leakage are present, this effectively limits the amount of frequency shift that can be compensated before the LO leakage term lands on data subcarriers. In modes with 16 DC subcarriers reserved, the limit on correctable frequency shifts can be +/−8 subcarriers.

The SFO causes the baseband waveform to compress or expand in time, which affects the waveform in different ways than the CFO. Given an OFDM baseband modulator waveform, a frequency error factor represented as "$\epsilon$" affects the baseband waveform as which corresponds to a frequency error of $\epsilon$ x subcarrier frequency which can be $\epsilon \times BW$ (k/1024), wherein BW is the bandwidth and k is the $k^{th}$ subcarrier. This frequency error can be applied to each subcarrier.

Figure 13E:
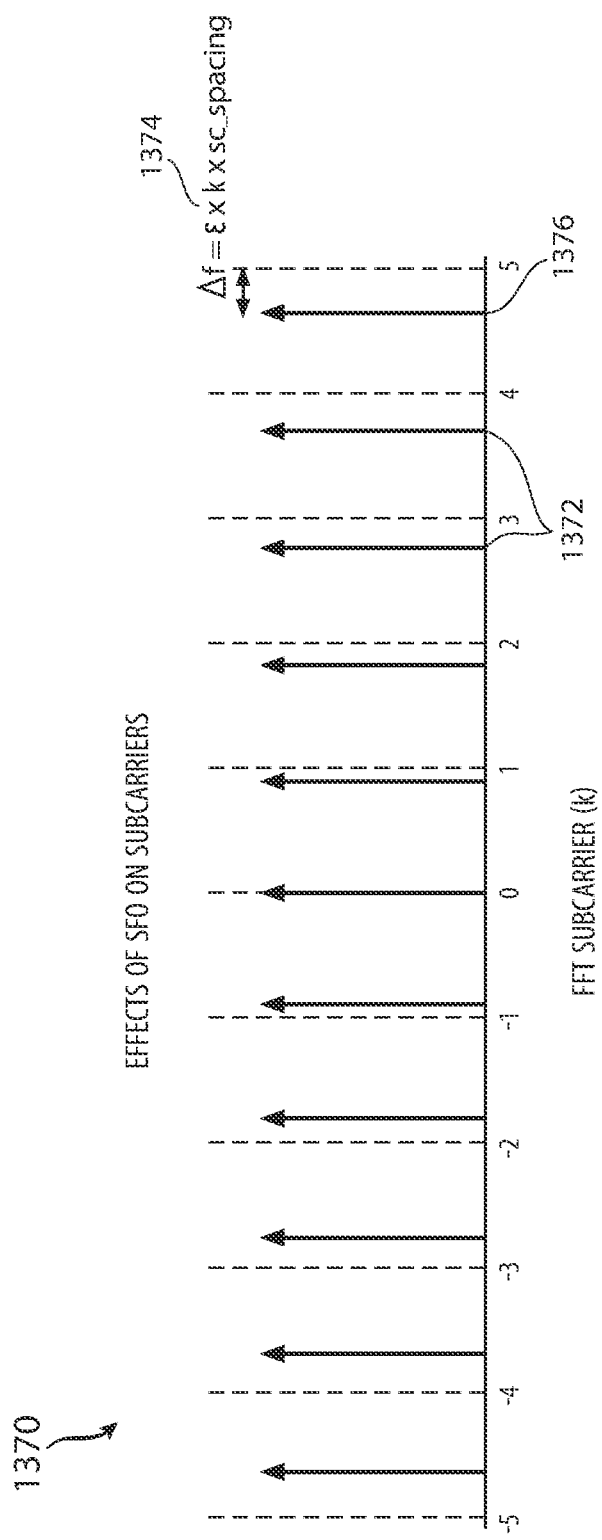

Furthermore, the system can calculate the frequency error as a percent of the subcarrier spacing as percent subcarrier (SC) Error=($\epsilon \times BW$ (k/1024))/(BW/1024)×100 or $\epsilon \times k \times 100$, which shows that the frequency error grows linearly with the subcarrier index. FIG. 13E illustrates a graph 1370 of the subcarriers 1372 and the frequency error 1374 for one subcarrier 1376.

The main impacts of SFO upon OFDM are first, a variable frequency shift increases proportional to the subcarrier frequency. This manifests as (1) a small amplitude error in the FFT that worsens for edge subcarriers but is constant over time; (2) a phase shift error that increases linearly with subcarrier frequency and accumulates in time; and (3) a small amount of inter-carrier-interference (ICI) that varies over the band with the largest impact on the edge subcarriers.

The second main impacts of SFO on OFDM waveforms is a symbol timing rate change that can cause the FFT window of the demodulator to become misaligned with the symbols increasingly with time. The impact is initially small but quickly becomes severe ISI when the misalignment exceeds the CPP of the OFDM symbols.

Calculating an impact on the modem waveform with respect to the ICI effect identified above (item (3)), the frequency error as a percent of the subcarrier spacing is percent subcarrier error=$\epsilon \times k \times 100$ as derived above. In the system 100, the operating frequency error can be up to +/−30 ppm with about +/−21 ppm frequency error coming from Doppler and another +/−9 ppm from crystal oscillator offset. With this error, the edge subcarriers (k can be about 512), experience a maximum frequency shift of $30/10^6 \times 512 \times 100 = 1.5\%$.

Looking up a 1.5% error in the above indicates that the ICI corresponds to about −0.175 dB loss when operating at 18 dB SNR. Because this is the worst-case (edge) subcarrier, the average SNR impact is only about −0.09 dB, which can generally be regarded as negligible. This calculation as a fraction of subcarrier spacing holds independently of the bandwidth mode (60, 240, 480 MHz). Thus, in one aspect, correcting SFO-induced ICI is non-critical in the modem 500 in all modes within the operating envelope (less than 18 dB SNR, less than 30 ppm total frequency error).

Figure 13F:
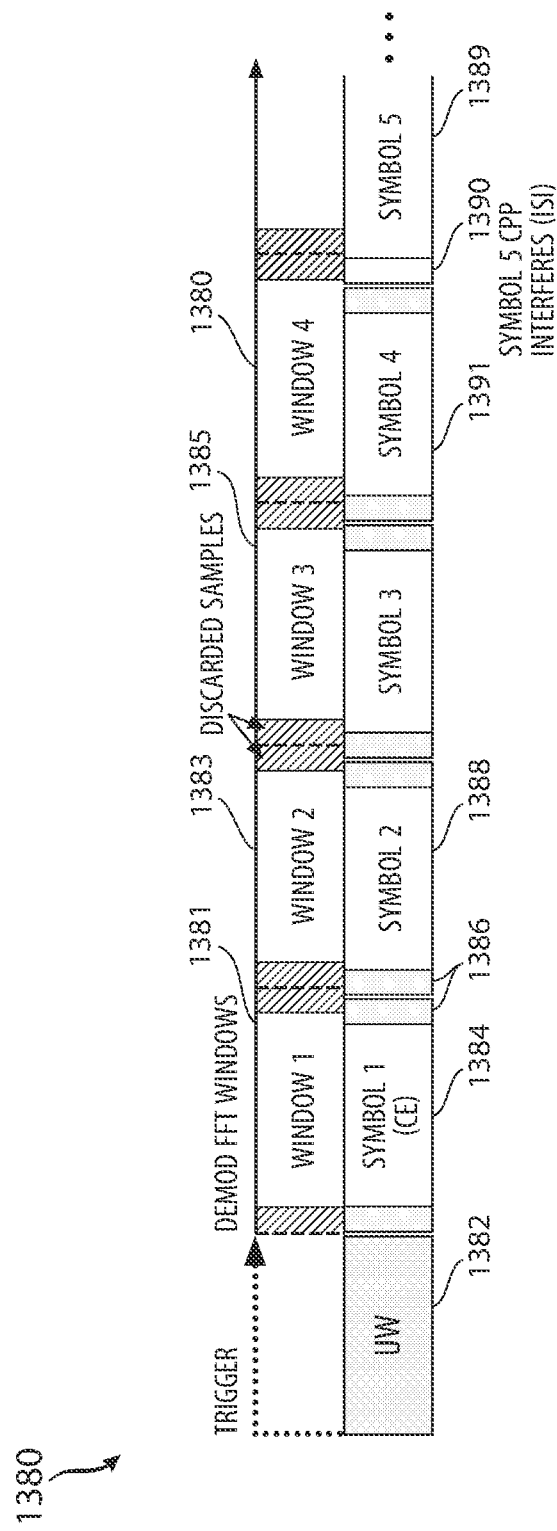

The other important effect of SFO is drift in the symbol timing. FIG. 13F shows a graph 1380 illustrating a demodulation FFT and how it is timed based on unique word (UW) detection 1382, FFTs are thereafter computed in windows 1381, 1383, 1385, 1387 spaced regularly at the nominal symbol rate. CPPs 1386 are shown in connection with a first symbol 1384 and a second symbol 1388, lined up respectfully with the first window 1381 and the second window 1383.

When SFO is present, the CPP symbols 1386 come faster or slower and do not line up with the windows 1381, 1383, 1385, 1387. The misalignment grows with time, and eventually the cyclic prefix 1390, which should be connected with symbol 5 1389, is actually intruding on the fourth window 1380 which should be associated with the fourth symbol 1391. At this point, there is significant inter-symbol interference (ISI) that degrades decoder performance. Therefore it is important to not go too long between UWs unless a resampler or sample-slip is introduced.

With a 30 ppm SFO, there is about 1 (RX rate) sample adjustment per 16 OFDM symbols or 1 (TX rate) sample per 29 OFDM symbols. Table 2 illustrates for different BW modes the current CPP value for TX samples and RX samples, the maximum frame length in symbols, the maximum frame length in milliseconds, and the frame length used in milliseconds.

TABLE 2

| BW Mode | Current CPP Value (TX samples) | Current CPP Value (RX samples) | Maximum Frame Length (Symbols) | Maximum Frame Length (milliseconds) | Frame Length Used (milliseconds) |
|---|---|---|---|---|---|
| UT-UL (60 MHz) | 27 + 27 | 48 + 48 | 768 | 8.7 ms | 1.333 ms |
| UT-DL (240 MHz) | 18 + 18 | 32 + 32 | 512 | 2.2 ms | 1.333 ms |
| GW-UL/ GW-DL (480 MHz) | 9 + 9 | 16 + 16 | 256 | 0.55 ms | 0.667 ms |

Note that the example values shown in Table 2 illustrate the configurable parameters (frame length, CPP value, etc.) in the modem 500 disclosed herein that can be established based on which node the modem 500 is configured on. The multi-user UL channel is special in that multiple users are demodulated together at the SAT 104. The burst detector will detect one or more user UWs simultaneously and use the average frequency and time estimate as described above to begin the FFT demodulation window sequence. In one example, only one UT user UW is used. This leads to a second user (satellite moving away from) and a third user (satellite moving towards) to have ICI due to the imprecise alignment with the demodulation subcarrier grid. Users who have full freq. allocations (e.g., the second user) still can experience ICI between its own subcarriers. The situation does not change even if all three user UWs are detected and averaged, because the average coincides with the timing from the first user. Averaging is still preferred because it can moderately help limit the worst user ICI in other situations.

Because the UT-SAT UL case has the smallest subcarrier spacing (58.5 KHz), the sensitivity to CFO is particularly high. The system needs users within approximately 1 KHz for less than 0.25 dB ICI loss.

For this reason, all UTs 102 can pre-compensate their transmissions for expected Doppler frequency shift as well as their own crystal oscillator error in order for the satellite to receive consistent frequency offset among users within 1 KHz.

Doppler can be accurately predicted using the UT 102 GPS (global positioning system) position and the SAT 104 position from a downlink ephemeris, which is a table or data file giving the calculated position of the SAT 104 at regular intervals. The user crystal oscillator offset can be estimated using pulse-per-second from an on-board GPS receiver, or by using the estimated frequency offset from the satellite downlink frames.

Differences in the DAC 647 and ADC 655 clocks on either end of a link and Doppler time compression/expansion in the channel both cause the SFO to occur. A modem register can include a parameter to implement operation of the resampling block 638 shown in FIG. 6A for the transmitter 502 or the resampling block 661 on the receiver 512 in FIG. 6B. The resampling block 638, 661 corrects for two types of SFO error: The first type of error that is corrected is where, within a single symbol, spectral compression/expansion (frequency shift proportional to subcarrier frequency) causes inter-carrier-interference (ICI). The second type of error is an accumulating timing error that accumulates across a radio frame and eventually consumes time-domain samples of the CPP for later OFDM symbols, causing inter-symbol-interference (ISI), see FIG. 13F.

To correct both of these errors the resampling block 638, 661 in the modem 500 disclosed herein performs a true time-domain sample rate conversion using a Farrow fractional delay structure and timing controller.

Before the burst detector 664 on the receiver 512, a programmable frequency offset correction can also be applied. As noted above, this can be used to post-compensate Doppler and/or local receiver XO offset calculated by firmware. The block 664 can also be used for ½ bin offset removal.

Table 3 illustrates the various possible corrections for the Ku band and for communication on the DL and UL between the SAT 104 and the UT 102. The table lists both the DL requirement and the UL requirements and various corrections that can be provided to achieve the respective requirements. In this case a "cell" constitutes a region of the Earth surface illuminated by a satellite beam and/or a predefined subset of that area.

TABLE 3

| Downlink Requirements | | Uplink Requirements |
|---|---|---|
| (250 MHz @ Fc < 12.7 GHz) | Frequency Error Components | (62.5 MHz @ Fc < 14.5 GHz) |
| Burst detect needs: <18.5 ppm | Sat XO: ±4.5 ppm | Burst detect needs: <6.8 ppm |
| LO Leakage limit (DC = 4): <30 ppm | UT XO: ±9.0 ppm | LO Leakage limit (DC = 16): <30 ppm |
| CPP Loss: ±12 TX samples | Doppler: ±20.0 ppm | CPP Loss: ±3 TX samples |
| SFO ICI Loss: 0.1-0.2 dB | Total: ±31.5 ppm | SFO ICI Loss: 0.1-0.2 dB |
| Downlink Corrections | | Uplink Corrections |
| Satellite TX: | | Satellite RX: |
| CFO: Satellite XO error (4.5 ppm) + (optional Doppler to cell center) | | CFO: Satellite XO error (4.5 ppm) |
| SFO: Not supported | | SFO: Correct Sat XO (4.5 ppm) |
| User RX: | | User TX: |
| CFO: Burst detect auto-corrects remaining CFO & used to estimate UT XO error. +(optional – UT XO error) | | CFO: Both Doppler and UT XO (need <1 KHz difference across users) |
| SFO: Resampler should correct for Doppler once ephemeris known. | | SFO: Correct with Timing Advance (not Farrow) |

With the multi-user UL, any ICI will occur over the air between UTs 102 and cannot be easily post-compensated by the SAT 104 receiver. Therefore, CFO from Doppler and UT XO offset must be pre-compensated by the UTs 102 as noted above in Table 3. The Doppler frequency offset is predicted using the UT GPS position and the satellite ephemeris (or the position and velocity of the SAT 104). The UT XO is estimated from the frequency error reported by the DL UT burst detector 664. Alternatively, the UT GPS pulse-per-second (PPS) can estimate UT XO offset. The SAT XO offset can be pre-and-post-compensated by the SAT 104 from its own GPS 1PPS. For example, the SAT 104 TX on the DL can pre-compensate for the satellite XO offset using GPS+PPS. The UT 102 RX on the DL uses burst detection 664 to automatically remove residual frequency offset which includes both the DL Doppler and UT XO offset. The UT 102 RX can record the measured frequency offset (which can be converted to Hz), and a UT XO correction factor can be estimated. An averaging of the estimation can be used over the last X radio frames (such as 10, for example), which will reduce estimate variance, and then the average can be used for UT-UL TX pre-compensation.

On the UL, the SAT 104 RX can post-compensate for SAT XO offset using GPS+PPS. The UT 102 TX can pre-compensate for UT XO offset and UL Doppler offset. These various corrections are shown in Table 3.

Table 4 illustrates the various corrections possible for the Ka band and for communications on the DL and UL between the SAT 104 and the SAG 106. This table lists both the DL requirement and the UL requirements and various corrections that can be provided to achieve the respective requirements. Note in some cases that SFO and CFO, that both pre-compensation (i.e., compensation within the transmitted waveform) and post-compensation (i.e., compensation of a received waveform) are performed and in other cases only one or the other is performed.

TABLE 4

| Downlink Requirements | | Uplink Requirements |
|---|---|---|
| (500 MHz @ Fc < 19.3 GHz) Burst detect needs: <24.3 ppm LO Leakage limit (DC = 4): <40 ppm CPP Loss: ±9 TX samples SFO ICI Loss: 0.1-0.2 dB | Frequency Error Components Sat XO: ±1.0 ppm GW XO: ±1.0 ppm Doppler: ±21.0 ppm Total: ±23.0 ppm | (500 MHz @ Fc < 30.0 GHz) Burst detect needs: <30 ppm LO Leakage limit (DC = 4): <30 ppm CPP Loss: ±9 TX samples SFO ICI Loss: 0.1-0.2 dB |

| Downlink Corrections | Uplink Corrections |
|---|---|
| Satellite TX: CFO: Pre-compensate for Doppler SFO: Not supported | Satellite RX: CFO: Post-compensate for Doppler +(optional SAT XO error) SFO: Resampler post-compensation for Doppler (RF length is 0.66 ms so CPP loss will be +− 9 samples). |
| Gateway RX: CFO: None SFO: Resampler post-comp for Doppler (RF length is 0.66 ms so CPP loss will be +− 9 samples) | Gateway TX: CFO: None SFO: Not supported |

In one aspect, the amount of digital CFO correction that the modem 500 can perform on the UT 102 transmitter 502 may be limited to +/−8 subcarriers (which is +/−468 KHz or +/−30 ppm). This limit is with the maximum 16 DC subcarriers masked to protect from TX LO leakage. However, the total of XO and Doppler offset can exceed this amount. Therefore, one solution is to require partial compensation on both the SAT 104 and the UT 102. By partially correcting frequency offset on both ends of the link, the system limit the amount of correction to under +/−30 ppm for any modem transmitter 502 or receiver 512.

Table 5 illustrates the maximum correction required from a modem 500 as disclosed herein and some notes on each row of data. The different modem configurations include the SAT TX and RX, and the UT TX and RX.

TABLE 5

| Modem Configuration | Maximum correction required from Modem | Notes |
|---|---|---|
| Satellite TX | ±4.5 ppm | 4.5 ppm from satellite XO offset w.r.t GPS. |
| User Terminal RX | ±29 ppm | 20 ppm from remaining Doppler, +9 ppm from UT XO offset (temperature & aging). |
| User Terminal TX | ±29 ppm | 20 ppm from remaining Doppler, +9 ppm from UT XO offset (temperature & aging). |
| Satellite RX | ±4.5 ppm | 4.5 ppm from satellite XO offset w.r.t GPS. |

Feedback of multi-burst frequency measurements to UTs 102 is possible. The SAT 104 could potentially report back its multi-burst frequency offset measurements to the UTs 102 so that they can correct more accurately in the next frame by pre-subtracting this error. This approach would require the MAC layer on the SAT 104 to be able to read burst frequency offset measurements from a register and communicate it with the UTs 102. These error estimates are accurate at the moment of measurement but Doppler changes at 2 KHz/sec or 130 ppb/sec during a satellite pass. Multiple measurements would likely be needed to project forward accurately enough. This technique would not be available for initial network entry (INE) or during initial hand-off between SATs 104.

In another aspect, frequency domain-per user correction is possible. The satellite 104 can potentially compensate for ICI on a per-user basis with a frequency-domain correction. For small frequency offsets, ICI can be modeled as delta_f*dsinc(t)/dt. This can be compensated in the frequency-domain by convolving with [−½, 1, 0, −1, ½] *delta_f. Using just these 5 taps reduces ICI by more than 6 dB. Special care is taken at the frequency boundaries between users when this approach is used.

In another aspect, estimates of CFO can be used for estimating SFO (after scaling by $Fs/F_{LO}$) assuming that the same reference clock drives the converter PLL and RF LO PLL 1320, 1336 shown in FIG. 13A. Likewise, Doppler effects cause an equivalent proportional effect to LO and sample rate. Thus a single parts-per-million (ppm) estimate can be used for both CFO and SFO.

This disclosure now returns to the receiver 512 of FIG. 6B. The burst synchronization block 664 is, in connection with other components, a compensation scheme for synchronizing impairments due to these factors. The burst synchronization block 664 detects the start of a burst using the UW symbol 634 and calculates the proper symbol alignment and then calculates the residual CFO. The burst synchronization block 664 uses a correlation method to search for the UW symbol 634 described above.

The functional blocks within the burst synchronization block 664 are shown in more detail in FIGS. 14A-B in accordance with some embodiments of the present disclosure. First, as shown in the component 1400 in FIG. 14A, the time-domain symbols are de-rotated 1402 to convert QPSK back to BPSK. A matched PN code word correlation block 1404 generates a series of peaks, from which differential metrics 1406 are formed. The generated correlation peaks correspond to the pre-set number of PN codewords. FIG. 14C illustrates the series of peaks and how they are used for determining a phase rotation.

As shown in FIG. 14C, the first peak 1432 is inverted, proving an indication of burst detection and symbol alignment. Threshold detection 1408 is applied to the differential metrics and power estimation 1410 is provided for threshold detection 1408 in order to locate the start of a burst, and the remaining peaks are used for CFO estimation 1412 by measuring the phase change between the peaks as shown in FIG. 14C. The CFO estimation is output from the CFO component 1412 and the output of the threshold detection component 1408 is the detected UW.

FIG. 14B illustrates in more detail some of the components of FIG. 14A and the burst detection and synchronization process. The purpose of the module 1400 shown in FIG. 14B is to detect the preamble UW that indicates the beginning of each burst within the received waveform. A precise start sample index of the burst and an estimate of the frequency offset is determined. These parameters are used to trigger the proper symbol FFT timing and frequency correction in the downstream demodulator.

The received input waveform is first derotated, via a de-rotation block 1402, by 0, −90, −180 and −270 degrees in order to undo the pi/2-BPSK modulation of the preamble (converting the received symbols to regular BPSK). The output of the de-rotation block 1402 is then correlated by the correlation block 1404 against the known BPSK unique word sequence of length 256 samples (oversampled by 2×). A delayed version of the waveform 1405 is conjugate multiplied by the original signal (1407, 1409) to form a differential correlation metric 1406, which distinguishes the first two (first inverted) repetitions from the other (non-inverted) six repetitions of the code word as shown in FIG. 14C. This differential correlation metric 1406 is compared via a magnitude block 1418 in magnitude against a separate estimate of the instantaneous average power of the signal which is calculated with an IIR low-pass filter 1415 applied to the squared magnitude of the signal from a squared magnitude block 1413. The squared magnitude block 1413 and the IIR low-pass filter 1415 combine to form the mixer 1310 of FIG. 13A. The modulator 1306 can include the component that generates the delayed version of the waveform 1405, the component that generates the conjugate 1409 and the component that performs a complex multiplication 1407 of the conjugate 1409 to form the differential correlation metric 1406.

A group delay of the IIR filter 1415 is matched to the delay of the correlation. The average power 1414 is output from the IIR filter 1415. An estimate of the current power is further provided to the embedded processor for software monitoring block 1422 to generate the power estimate in dB. The comparison between the differential metric magnitude 1406 and the average power 1414 output from the IIR filter 1415 is performed by a threshold detection block 1408. Any peak in the differential metric (defined as samples exceeding both a prior and later sample) as detected by a peak indicator block 1420 that also exceeds a parameterized multiple of the average power is declared a detection. The detection further triggers a comparison of the subsequent peaks at known sample offsets. The phase rotation of these subsequent peaks as shown in FIG. 14C is used to form a carrier frequency offset (CFO) estimate 1412 by estimating the slope of the phase rotation via a least-squares calculation or some other mathematical approach. Both the CFO estimate 1412 and a detection sample index (not shown) can be passed to subsequent demodulation stages.

Burst detection 664 of frequency offset can occur in the frequency estimation block 1412 shown in FIG. 14A. For a residual CFO that is not pre-or-post-compensated by firmware, the burst detector 1400 uses the UW to estimate RX signal frequency offset.

The UW in one example is composed of eight repetitions of a PN sequence. Measuring the relative phase rotation of the last six repetitions over time gives an estimate of CFO. The phase rotation of the repetitions of the PN sequence is proportional to the CFO and thus the phase rotation can be used to estimate the CFO. Once estimated, the CFO can be removed by tuning a second demodulator or complex mixer (FreqShift2) 662 shown in FIG. 13B and FIG. 6B and applying it to the received waveform before the FFT block 674.

FIG. 14C illustrates a graph 1430 of the rotation of the phase over time as measured. For example upon detection of the UW 1432, the first instance of the PN sequence is inverted 1432 for detection and the second PN sequence or phase is initially vertical 1434, and then the following six PN sequences slowly rotate as shown in phases 1436, 1438, 1440, 1442 and 1444. Measuring the relative phase rotation of the last six repetitions over time is used to provide the CFO estimate. After CFO correction is applied, the burst synch achieves a frequency error of less than 0.5% of the subcarrier spacing. This value can be slightly worse when phase noise is included. To achieve a loss of less than 0.1 dB, the target for residual error post-burst-detector must only be less than 1.1% subcarrier spacing.

In one aspect, two types of configurations are available for the burst synch: a "Low CFO" mode and a "High CFO" mode. In the low CFO mode, this mode supports CFO up to ±1 subcarrier spacing, and about 1.7 subcarrier empirically. This mode is most robust to false triggering and uses the polarity of the differential metric (see feature 1406 in FIG. 14B) to distinguish the first peak 1432. The High CFO mode supports CFO up to ±4 subcarrier spacing. This mode is not as robust to false triggering because it ignores differential metric polarity (see feature 1406 in FIG. 14B).

A channel estimate (CE) symbol processing scheme 1500 is shown in FIG. 15 in accordance with some embodiments of the present disclosure. The scheme 1500 can be implemented by the CE block 684. The CE block 684 receives CE symbols including one or more symbols in order to calculate the channel estimate at the start of a respective burst. If the link is configured to use more than one CE symbol (see FIG. 10), the plurality of CE symbols can be averaged 1502 (across frequency and time) to form a final channel estimate with an improved signal-to-noise ratio. Golay sequence removal 1504 follows CE symbol averaging, whereby symbols corresponding to a Golay sequence value of 1 are sign inverted. Processes can also be implemented which remove and restore fractional delay from the reference symbol 1506. A moving average (MA) filter 1510 can be used across subcarriers in the frequency domain to further minimize the effect of noise on the channel estimate. For example, a MA frequency domain filter 689 (as shown in FIG. 13B) having 32 taps can be used to calculate a moving average 1510. The output of the moving average filter 1510 is inverted and the delay can be restored 1512 as a final step to provide an inverted channel estimate. MA block 689 in FIG. 13B can be referenced for more information on calculating the moving average of the received signal.

A pilot processing block 690 uses pilot tones or subcarriers to track signal phase changes over the full bandwidth after initial channel estimation 684. After the CE block 684 estimates the channel, there are residual phase or time delays that still can exist in the channel. Pilot subcarriers are described above in connection with FIG. 7 and also shown in FIG. 10. Two configurable pilot sub-bands offsets 705, 707 (for example) are located in each channel offset from the band edges. FIG. 16B shows these offsets 1624, 1636 as well. The pilot tone amplitude and phase estimates are used for frequency domain tracking after initial channel estimation 684 and FEQ calculation 686. Resource blocks 688 are output from the FEQ block 686 and are provided to the pilot processing block 690. The pilot processor 690 forms an output of 1008 data symbols 692 after applying the phase and amplitude corrections from the pilots, and extracting sixteen or more pilots. Other numbers of pilots as well can be extracted.

Tracking may be required due to changes in transmission conditions and hardware behavior, as well as errors in synchronization parameter estimation. Synchronization errors cause phase issues over the direction of a radio frame. The pilot phase is unwrapped in order to provide robustness in severe phase distortion conditions. Residual CFO results in constant frequency and phase errors across all the subcarriers at each particular symbol. The time progression of CFO rotates all the constellations over symbol time. Sampling frequency offset (SFO) causes a delay in the time domain and an equivalent linear phase profile in the frequency domain. As shown in FIG. 16B, the pilot estimates for the high 1634 and low pilot sub-bands 1626 are used to interpolate phase estimates for all the payload subcarriers 1628, 1632 or the resource blocks. In one example, phase estimates are averaged (via a moving average) over 3 or 5 symbols. This disclosure is not limited to a specific number of symbols over which the moving average can be calculated to determine a phase estimate. In one aspect, pilot phase estimates at pilot high 1634 and low frequency sub-bands 1638 (which can be near the upper or lower band edges) are used to interpolate across the spectrum. In this regard, a group of pilot symbols 1634 (near pilot sub-band offsets 1636) at a high frequency portion at the edge of the set of frequencies 1622 associated with the radio frame are used to obtain a high frequency average 1640 over that group of pilot sub-band offsets. A group of pilot symbols 1626 (near the pilot sub-band offsets 1624) at a low frequency portion at the edge of the set of frequencies associated with the radio frame are used to obtain a low frequency average 1638. The approach can include performing a linear interpolation across the set of frequencies using the high frequency average 1640 and the low frequency average 1638. This linear interpolation is possible or made more simply by assuming little or no multi-path scattering in the channel due to the nature of the link being a line-of-sight channel rather than a channel having many objects as in a cellular context. The interpolation can be used to track delay variation and the pilot groups can be optimized as well to track phase noise.

The pilot processing block 690 is shown in more detail in FIG. 16A in accordance with some embodiments of the present disclosure. The delay compensation block 1610 shown in FIG. 16A can be included within or associated with the pilot processing block 690. The delay compensation block 1610 looks at the phase slope correction of the current pilot processing and when it grows steeper than the amount corresponding to a +/−1 sample time delay error, it applies that time correction as a sample-drop or sample-add in the time domain. This drops the pilot phase error slope back down and also improves the timing window of the FFT demodulator 674. This feature can correct for the sample-time misalignment caused by SFO (prevents loss of the CPP margin and subsequent ISI).

The complex differential metric peaks are phase-rotated by the CFO across the 128 (over-sampled to 256) sample span of the PN code words. Following the first peak and/or second peaks shown in FIG. 14C, which can be used for burst detection, the subsequent six peaks are accumulated and scaled in order to form a CFO estimate 1412. The range of offsets over which the block can calculate valid estimates depends on the symbol period and channel bandwidth.

The CFO estimate 1412 is used by the frequency shifter block 666 to compensate for the impairment as shown in FIG. 6B.

Next is discussed the symbol alignment, cycler extension striping process and the FFT demodulation process. Unique word detection in the burst synchronization block 664 provides proper symbol alignment for demodulation of the channel estimation symbol and all the remaining payload symbols in the burst. Serial to parallel (S/P) processing 668 occurs after the frequency shift 666 processes the signal. The cyclic extension or cyclic prefix and postfix (CPP) is stripped from symbols 670 to generate a set of symbols 672 at the multi-point FFT block 674 input by indexing past the cyclic prefix and ignoring the cyclic postfix. The set of symbols 672 can be characterized as a 2048 sample time domain vector which is processed by the 2048-pt FFT 674. The CPP samples are discarded based on the best estimate of the OFDM symbol timing from the burst synch 664. The number of samples being 16/9 times the number of CPP samples inserted in the modulator 632 due to the differing sample rates between the modulator 610 in the transmitter 502 and demodulator 696 in the receiver 512.

In one aspect, in order to demodulate frames reliably, a total timing difference for each UT-UL burst and for each symbol received at the SAT 104 is configured to be less than +/− half of a CPP period. For example, the FFT block 674 can provide 2048 point FFT demodulation. The FFT block 674 transforms the signal from the time domain to the frequency domain, after which channel estimation and equalization are used to establish coherences. As long as synchronization is maintained, symbol alignment for subsequent payload symbols includes counting samples in order to index to the start of each symbol. In some embodiments, the demodulator included in the OFDM receiver 512 is configured to perform the above functions (also referred to as a FFT or FFT transformer) includes a multi-point, multi-stage mixed radix FFT.

The multi-user channel mapping is defined above for the MU-UL use case between the UTs 102 and SAT 104. Individual user channel resource blocks 676 are output from the FFT 674. The user channel resource block 676 is a length 2048 vector of which the upper and lower 512 subcarriers are discarded (corresponding to out-of-band content from oversampling). The user channel resource block 676, after discarding the 512 subcarriers, forms resource blocks 678 which are input to the multi-user (MU) de-mapper 680 to perform the inverse mapping operation that parses the individual user channel resource blocks for up to four simultaneous users. The resource block 678 is a 1024 subcarrier vector corresponding to the same 1024 subcarriers formed in the modulator 610. The (MU) de-mapper 680 can perform the de-mapping in the frequency domain. Following the MU de-mapper 680, individual user channels are processed independently by the remaining demodulator and decoder blocks 653.

Following the FFT 674 and the MU de-mapper 680, the receiver 512 performs rotational descrambling by a symbol descrambler 682. The symbol descrambler 682 can use single-tap subcarrier complex multiplications that reverse the rotational scrambling specified above in the symbol scrambler 620. The rotational scrambling affects all the frequency domain symbols and subcarriers, including the channel estimation symbol and the pilot subcarriers. The pilot processing scheme can depend on the rotational scrambling block to randomize the pilots as they are all initialized to a constant value. In multi-user UL mode, the user ID specifies a unique PN sequence (See FIG. 9) to be used for the PN rotations for each user.

A channel estimation (CE) block 684 uses a known reference signal to probe the effective channel frequency response from the point of CE symbol insertion to the FFT output in the receiver 512. The phase array antenna on a SAT 104, for example, can have fairly static impairments (frequency variations) that occur due to how the respective antennas in the array of antennas couple with one another. The CE block 684 can correct for the bulk of the impairment issues in the channel due to the static impairments. The CE is used in the subsequent frequency equalization (FEQ) block 686 to flatten the channel response such that the constellations on all active subcarriers are properly rotated and scaled. For example, the FEQ block 686 uses subcarrier PN (pseudo-noise) de-rotation to unwind the transmit side subcarrier scrambling. The CE block 684 can use the CE symbol as a reference signal to calculate an estimate of the amplitude and phase of the channel at each subcarrier frequency. The CE is inverted to form a bank of single-tap complex frequency domain equalizer coefficients. As a result, the equalizer output at the CE symbol time instant is flattened and counter-rotated such that the constellations across all the subcarriers can be uniformly (hard or soft-decision) sliced (via a slicer 694) over a single reference grid. The CE block 684 can also perform frequency domain equalization (FEQ) 686 to flatten the channel at the CE symbol.

One or more FEQ taps can be included via a FEQ block 686 in the receiver 512 to implement pilot processing at the pilot processing block 690 in which variations in magnitude and phase throughout the burst can be tracked. The FEQ block 686 is then fixed for the duration of the burst. The pilot symbol processing block 690 compensates for time variation in channel or signal conditions for the payload symbols 688 which include the remainder of the burst. As noted above, the main impairment issues with the channel can be corrected by the CE block 684 but there are residual effects which can be further corrected using the pilot processor block 690. The pilot processor block 690 corrects for primarily Doppler effects plus some phase error issues raised due to the local oscillators 1316, 1338 (shown in FIG. 13A) on the transmitter 502 and receiver 512 and which can take into account some assumptions based on the line-of-sight nature of the communication channel (i.e., without multi-path scattering so prevalent in cellular communications).

The FEQ block 686 forms an output of 1024 channel-equalized subcarriers 688. The pilot reference subcarriers are described above. The receiver 512 operates in an open-loop mode in which pilot estimates or tones are used for burst tracking and to compensate for phase and amplitude variation throughout the payload-bearing subcarriers over the course of the burst. An item of interest after the initial channel estimation 684 is phase variation due to CFO, SFO, and/or phase noise.

The demapping/decoding set of blocks 694, 696, 698 includes a soft-decision slicer 694 that outputs data for use in a belief-propagation, an LDPC decoder 696 configured using the coding parameters describe above, and a bit descrambler 698 that can correspond or provide complementary functions to the transmit-side scrambler 608.

Variations exceeding a pre-set range may be adjusted, as necessary, in accordance with subsequent signal processing to be performed. The receiver 512 is able to process 1, 2, or 4 CE symbols at the start of each burst.

This disclosure returns to the discussion of the pilot processing block 690 in more detail as shown in FIG. 16A. Data symbols are provided to a pilot sub-band amplitude and phase estimate block 1602. Each received pilot subcarrier is subject to additive noise as well as the impairments mentioned above. After removing the π/4 QPSK signal rotation, the real and imaginary components of each pilot sub-band are separately averaged to minimize the effect of the noise on the pilot estimates via the pilot phase unwrapping block 1604. The rectangular in-phase/quadrature result is converted to polar coordinates so that magnitude and phase compensation can be done independently. A pilot estimate time block 1606 can estimate times associated with each pilot subcarrier using a moving average (MA) as described herein.

A pilot amplitude compensation and phase compensation or interpolation block 1608 can calculate an amplitude correction factor from the pilot amplitude estimates. Such amplitude correction factor can be applied to both pilot sub-bands or to the overall average amplitude for each symbol. The pilot amplitude compensation and phase compensation or interpolation block 1608 can also be configured to have a pilot phase delay component 1610 that compensates for linear phase impairments such as sampling frequency offset, carrier frequency offset, and symbol delay.

FIG. 16B further illustrates the structure 1620 of the pilot subcarriers and the moving average concept across 3 or 5 symbols. A burst 1622 can include N subcarriers 1622 including a first 16 tone (subcarrier) pilot sub-band offset from a band edge 1624 at a low end of the frequency spectrum and a second 16 tone pilot sub-band offset from another band edge 1636 at a high end of the frequency spectrum. A group of pilot subcarriers 1626 can be processed via a moving average (MA) filtering process over 3 or 5 symbols 1638 to establish a low frequency pilot amplitude and phase estimate. User resource blocks 1628 can be configured between pilot subcarriers 1626 and a DC sub-band 1630. User resource blocks 1632 can be configured between the DC sub-band 1630 and pilot subcarriers 1634. The group of pilot subcarriers 1634 can be processed via a moving average filtering process over 3 or 5 symbols 1640 to establish a low frequency pilot amplitude and phase estimate. Offsets 1624 and 1636 can correspond to the offsets 705, 707 shown in FIG. 7.

The receiver 512 can include one or more pilot delay compensation blocks 1610. Pilot delay is associated with Doppler scaling and sampling frequency offset which can cause an error in the receiver sampling rate relative to the transmitter. This error can accumulate over time to cause a shift in OFDM symbol alignment. The receiver 512 can be configured to detect and measure the amount of delay present in the signal relative to current symbol alignment, and to compensate the signal to address the detected/measured delay.

In one aspect, time and frequency averaging can be performed by the receiver 512 to reduce the variance of the pilot estimates. Another option is to boost the power over the pilot sub-bands relative to the nominal power of the payload subcarriers.

A packet header decoding layer can include a slicer 694, a decoder 696 and a descrambler 698 shown in FIG. 6B. Packet header decoding begins with maximum likelihood decoding of the rate ⅓ convolutional code. As would be known to those of skill in the art, a convolutional code is a type of error-correcting code that generates parity symbols via the sliding application of a boolean polynomial function to a data stream. The convolutional code is non-recursive and non-systematic. The code has 6 single bit registers which results in 64 possible states. A Viterbi decoder (or other decoder) can calculate path metrics based on the received octal symbols 692. For each 3 bits, the path metrics are used in add/compare/select pruning operations in order to update state metrics from bit to bit. Trace back operations corresponding to each decision bit establish the final decoded bit values.

A PHY header parsing component can extract the fields such as the modulation coding scheme (MCS), MCS length, partial, and sequence number fields.

The decoding process uses soft decision bit metrics via the log likelihood ratio in slicer 694. For each received I/Q point, the slicer 694 generates 1 to 6 log-likelihood ratios (LLRs) depending on modulation scheme (BPSK to 64-QAM).

For each bit, the log likelihood ratio is defined as $$LLR(b_i) = \log\left(\frac{P(b_i = 0|y)}{P(b_i = 1|y)}\right),$$

where y=the received symbol with Gaussian distributed noise. Using probabilistic iterative decoding can be based on belief propagation and $P(b_i=k/y)$ can represent the probability that bit $b_i$ is equal to k after reception of the constellation point y. FIG. 17 shows an example LLR calculation 1700 using a 16QAM constellation for the least significant bit (LSB), showing points with the LSB equaling 0 (1702, 1708), and showing points with the LSB equaling 1 (1706), with a "y" value 1704 in accordance with some embodiments of the present disclosure.

Using the Euclidean error metric, the LLR for bit $b_0$ associated with the received point y can be approximated as:

$$LLR(b_0) = \frac{1}{2\sigma^2}\left(\min_{i \in S_1}|y - si|^2 - \min_{j \in S_0}|y - s_j|^2\right)$$

One of skill in the art will understand that use of the 16QAM constellation for calculating the LLR as shown in FIG. 17.

An LDPC decoder 696 introduced in FIG. 6B is shown in more detail in FIG. 18. The decoder 696 receives I, Q values in a demapper block 1802 and outputs LLRs (as calculated above) are provided to a decoder core 1804. The LDPC decoder 696 uses probabilistic iterative decoding based on belief propagation. During iteration, messages are passed between variable nodes and check nodes (such as a register block 1806 and a decoder memory 1808) until either the parity check is satisfied or the maximum number of iterations have completed. The output is a series of bits from the decoder core 1804. One of skill in the art will understand the details of the decoder 696 as shown in FIG. 18.

SAT, SAG, UT Configurations

The SAT 104, SAG 106, and UT 102 configurations and usage of the modem 500 are discussed next. The UT-SAT UL receiver 502 operates in a 62.5 MHz mode, for example without limitation, either in single channel or dual channel mode. In the dual channel mode, the bandwidth is 2×62.5 MHz. Each channel uses a dedicated receiver 512. Furthermore, each channel supports up to four simultaneous users per burst, with each user's associated data occupying non-overlapping contiguous (or in some cases non-contiguous) resource block allocations as shown in FIG. 10. MAC headers precede each code word. Multiple bursts are supported in each radio frame. The first burst in the radio frame includes the UW symbol for each user. Subsequent bursts can be configured either with or without the UW. All the bursts in an UT-SAT UL radio frame are back-to-back. The UTs 102, 102a, 102b are configured to manage synchronization and timing between all the UT transmissions in the radio frame. This includes adjusting for SFO, CFO, Doppler scaling (affecting both SFO and CFO), and the start time of transmission. Without these timing and synchronization issues configured and pre-compensated on the ground, the UT-SAT UL receiver 512 (on the SAT 104) may not function correctly and with optimum or acceptable performance.

The time domain signals for all the users occupying a radio frame within a single channel are combined over the air, RX beam formed, and pass through the receiver blocks up to the FFT 674. Beam forming supplies the complex signal with a resolution of 6-10 bits per component sampled at 67.5 MHz. It is subsequently interpolated up to a 120 MHz sampling rate required by the FFT 674. At the output of the FFT, the frequency division multiplexed user channels are separated by user de-mapping 680 for independent frequency domain processing by the rotational descrambler 682, CE estimation 684, FEQ 686, pilot processing 690, and decoding blocks 694, 696, 698.

The SAT-UT DL from the SAT 104 to the UT 102 receiver 512 is discussed next.

The SAT-UT DL 206 includes a single, broadcast 250 MHz channel, for example without limitation. RX beam forming supplies complex samples to the receiver 512 on the UT 102 at a sampling rate of 270 MHz. Each complex component has a resolution of 6-10 bits. The signal is up-sampled 661 to a rate of 480 MHz as required by the FFT 674. The SAT-UT DL receiver 102 compensates for one or more of a sampling frequency offset (SFO) in a frequency shifter 662 and carrier frequency offset (CFO), Doppler scaling, and/or residual symbol alignment error in a gain and frequency shifter component 666.

The SAG-SAT receiver 512 is discussed next. This embodiment relates to the modem 500 operating on the SAT 104 and receiving signals on the UL from the SAG 106. The SAG-SAT UL 208 includes a point-to-point 500 MHz channel, for example without limitation. Each code word transmitted in the SAG-SAT UL 208 is preceded by a PHY PDU header. The receiver 512 decodes and parses the header in order to obtain the modulation and coding scheme (MCS) and the symbol of payload symbols which contain the code word. Beam forming provides the receive signal at a sampling rate of 540 MHz with 6-10 bits of resolution. The receiver compensates for SFO, CFO, and Doppler issues. Single channel delay compensation maintains symbol alignment regardless of whether there is any residual SFO.

The SAT-SAG receiver 512 DL is discussed next in which the modem 500 is operating on the SAG 106 to receive signals transmitted from the SAT 104. The SAT-SAG DL 208 includes a point-to-point 250 MHz channel, for example without limitation. RX beam forming supplies the complex signal at a sampling rate of 270 MHz with 6-10 bits resolution per component, and it is up-sampled to 480 MHz as required by the FFT. PHY PDU headers precede each code word, and it is decoded and parsed to obtain the MCS as well as the length of the code word in symbols.

As can be appreciated, the various component described above can be implemented as a modem in a system-on-chip (SoC) configuration. FIG. 19 illustrates such a modem 1900 with various components such as a modem transmitter 1902 which can correspond to the transmitter 502 shown in FIG. 6A. The modem 1900 can include a networking interface 1906 for communication between a first high speed serial interface 1908 and a second high speed serial interface 1910, as well as an Ethernet interface 1912. The modem transmitter 1902 can provided data to a beamforming interface 1914 and a high seed serial interface 1916 for transmission of electromagnetic signals to another node in the network. A modem receiver 1904 can be similar to the receiver 512 shown in FIG. 6B which can receive signals received via the high seed serial interface 1916 and the beamforming interface 1914. Signals can then be provided to the networking interface 1906.

The modem 1900 can include an embedded processor 1918, which for example, can be an ARM processor developed by Advanced RISC Machines. Any processor can be utilized. The processor 1918 can run software for managing the configuration of the waveforms. The software can include one or more programmed firmware, such as MAC firmware which can include instructions to configure the chip for its particular task, implement the functions of any component, or mode as described herein. Instructions for operating the modem can be stored in a computer-readable storage medium or device and can be used to perform operations disclosed herein for configuration of the modem, establishing parameters and processing received signals and generating and transmitting signals.

The supported modes for the modem 1900 include SAT-SAG DL mode, a SAT-SAG UL mode, a SAT-UT DL mode and/or a SAT-UT UL mode. Each of these modes has different characteristics and the modem 500 disclosed herein can be configured to operate according to a desired mode.

FIG. 20 illustrates the supported modem configurations 2000 in a transmit configuration. A transmit configuration will be described for each node in the network including the UT 102, the SAT 104, and the SAG 106. For example, for the DL 202, a UT mode 2006 can include a Ku band transmit configuration at the SAT 2010 in which a networking component 2018 communicates with one or more modems 2020 to provide one or more beams 2022 at, for example, 250 MHz to a digital beamforming component 2024 for transmission. At a group of UTs 2012, a first UT 2013 can transmit Ku band signals from the UT using a networking component 2028 configured within a modem 2026 to provide a beam at 62.5 MHz to a digital beamformer 2032 on the first UT 2013. A second UT 2015 can include a networking component 2036, a modem 2034 that generates a beam at 62.5 MHz 2038 and provides the beam to its digital beamformer 2040 for transmission. The UL beams from various UTs are combined as described above in the air interface.

Note that for each UT 2026, 2034, there is a single modem configured that swaps between a transmit mode and a receive mode. The modems configured on the SAT 104 and the SAG 106 can both simultaneously transmit and receive but the UT 102 differs in that it in time only transmits or receives but not both.

The DL for a SAT to SAG or gateway mode 2008 can include a configuration on the satellite 2014 for Ka band transmissions. A networking component 2042 on a SAT 2014 provides signals to a group of modems 2044 which generate beams 2046 at 250 MHz which are passed to a digital beamformer 2048 for transmission to the SAG 2008. In the uplink mode 2004, a SAG 2016 can transmit in the Ka band to a SAT using a networking component 2050, one or more modems 2052 producing one or more beams at 500 MHz to a digital beamformer 2056. As noted above, the same modem structure can include all the various components shown in FIG. 20 such that the UT 2012, the SAT 2010, 2014 and the SAG 2016 can be deployed with the same modem structure which can then be configured for the respective proper usage.

FIG. 21 illustrates the supported modem configurations 2100 for receiving signals at one of the SAT, SAG or UT. Note that the component that will be described in FIG. 21 correspond to the same SAT, SAG and UTs introduced in FIG. 20. In a DL 2102, the UT mode 2106 can include receiving at a group of UTs 2012, Ku band signals from a SAT 2010 at a first digital beamformer 2032 associated with a first UT 2013. The beam is received with a channel bandwidth of 250 MHz and provided 2110 at 250 MHz to a networking component 2028 in a first modem 2026 of the first UT 2013. A second signal is provided to a second digital beamformer 2040 at 250 MHz with the second beam provided 2112 at 2×250 MHz to a networking component 2036 in a second modem 2034 of the second UT 2015.

In the UL 2104, the satellite 2010 receives signals in the Ku band at 62.5 MHz at a channel bandwidth and at a digital beamformer 2024. One or more user data can be received. The beams 2042 are provided to one or more modems 2020 on the satellite 2010 and a 4×1.25 Gbps bit stream can represent the data received at the satellite 2010 and provided to a networking component 2018.

On the DL 2102 in a SAG or GW mode 2108, in the Ka band, the SAG 2014 receives signals from the SAT 2016 at a digital beamformer 2048 and provides the beams of signals at 250 MHz 2144 to one or more modems 2044 which combine the data in a 2×2.5 Gpbs bit stream to a networking component 2042.

In the UL 2104, the SAT 2016 receives a Ka band signal at a digital beamformer 2056 and provides beams at 500

MHz 2146 to one or more modems 2052 which generate a 2×2.6 Gbps bit stream to pass the data to the networking component 2050.

Note that the number of models shown in FIGS. 19-21 is by way of example only. For example, the number of modems on any UL or DL connection from any node can vary. In one example, the Ku transmit from the satellite can have sixteen modems rather than the four modems 2020 shown in FIG. 20. The Ka transmit at the SAT in FIG. 20 shows two modems 2044, but that number can in one example be four. The Ka transmit at the gateway shows two modems 2052, but the gateway can include eight modems for transmission in the Ka band. Other numbers are contemplated as well for each node.

FIG. 22 provides a summary 2200 of the supported bands including the various use cases 2202 and transmit channel bandwidth 2204. These are provided by way of example and other frequency bands can be utilized as well. As shown, the SAT-UT DL (Ku band) is 250 MHz, the SAT-UT UL (Ku band) is 62.6 MHz, the SAT-UT UL (Ku band) can also be 2×62.5 MHz in a dual mode, the SAT-SAG DL (Ka band) is 250 MHz, and the SAT-SAT UL (ka band) is 500 MHz.

Waveform Structure for UT-SAT Downlink Communication

The concepts associated with the waveform structure of the UT-SAT DL relate to the third embodiment of this disclosure. FIG. 23A illustrates the radio frame 2300 structure for the SAT-UT DL mode. The radio frame 2300 is defined by symbol time in the "x" axis and frequency in the "y" axis. As shown, an example bandwidth for the DL communication channel is 250 MHz. A UW symbol 2302 is configured for frequency error estimation and is configured at the start of the radio frame 2300. The channel estimate symbol 2304 is also configured near the beginning of the radio frame as shown. The resource blocks 2306 are configured next and the pilot subcarriers 2308 are shown near the top and the bottom of the time axis of the radio frame 2300. The pilot sub-band offsets like offsets 705, 707 in FIG. 7 or offsets 1624, 1636 in FIG. 16B are not shown but are considered to be present. A DC null 2310 is configured at or near a center frequency of the set of frequencies making up the channel. The channel bandwidth can be, for example, 250 MHz. One or more pilot sub-band offset symbols 2312 can be provided at a top of the set of frequencies making up the channel and one or more pilot sub-band offset symbols 2314 can be provided at a bottom of the set of frequencies making up the channel.

Next is discussed the protocol data unit (PDU) structure and signal structure in the mode related to the DL between the SAT 104 and the UT 102.

SAT-UT DL MODE

The third embodiment disclosed herein relates to the SAT-UT DL mode and the characteristics of that mode. FIG. 23A illustrates the radio frame for the SAT-UT DL mode.

The service is that the modem PHY (L1) can be configured to provide PDU carrying services to one MAC/Network (L2/L3) entity per beam to a remote stack of L1/L2/L3 peers. Each modem beam can be configured to be independently configurable for signal generation parameters.

The PDU details are as follows. Each PDU is configured to include at least one codeword with MCS signaled by a MCS Value. Each PDU may contain a plurality of MCS Values and between one to many codewords for each MCS Value. The PDU can be configured to include a generic MAC header (GMH) to allow transmitter (and receiver) to know the number of MCS values and the number of codewords for each MCS value. The transmitter 502 (and the receiver 512) can be configured to comply with the GMH parameters as per UT-SAT MAC interface. The PDU details are configured to be communicated between L2 (MAC) and L1 (PHY) using a container structure. The PDU container can be configured to include the RF that the PDU needs to go on. The RF may be used depending upon the mode. The PDU container can be configured to include metadata to indicate number of subcarriers occupied by the PDU. Multiple PDUs can be sent on the same RF.

The last (and possibly only) PDU is configured to be marked in the container with a (two bit) "Last" indicator in the GMH. In case of multiple PDUs per RF, the GMH can be configured to tag them with as (two bit) "First, "Middle", "Last" Indicator. If a "First" PDU is signaled/indicated then a "Last" PDU with the same RF is also signaled/indicated. There may be one or more "Middle" PDUs between the "First" PDU and the "Last" PDU with the same RF. No PDU with the same RF is to be located after the PDU marked "Last".

The signal details are as follows for this mode. The basic unit of the transmit signal in time includes a radio frame (RF) 2300 as is shown in FIG. 23A. The RF signal can be configured to be sent in one of two modes: a synchronous mode or a semi-synchronous mode. In the synchronous mode, the RF can be configured to be imitated when L2 counter value reaches a certain register value and continue periodically every register time interval thereafter. In the synchronous mode, the RF can be configured to be initiated with a RF number of certain register value. In the synchronous mode, register values are configured to be updatable at the next available opportunity or at a specific time signaled based on another register value. In the synchronous mode, a register can be configured to be updatable at the next available opportunity.

In the semi-synchronous mode, the RF can be configured to be initiated at a periodic basis signaled in the register and L2/L3 date can be configured to be sent on the first available RF from time of arrival on the streaming interface. The L2/L3 data can be configured to be back pressured to the networking blocks if internal 4K TX buffers are full. Each RF can be configured to include one or more OFDM symbols. The first configurable number of OFDM symbol(s) in all RF can be configured to be the channel estimate (CE) symbol(s) 2304. Each OFDM symbol can be configured to be padded with a certain number of null bins on each end (as shown as offsets in FIG. 16A) and converted to the time domain with a multi-point IFFT as shown in FIG. 6A. Each OFDM symbol can be configured to be pre and post-pended by a certain number of samples on each end post-IFFT in the time domain. The number of OFDM symbols in the RF 2300 can be configured to be signaled with allocation symbol duration (ALC_SYM_DUR) register. The size of the RF can be configured to be the time occupied by the symbols plus the time to transmit the UW 2302 and or the CE symbol 2304.

The (ALC_SYM_DUR+1) equivalence in time can be configured to be less than or equal to the inter RF distance configured through DELTA_TIME. Each OFDM can be configured to include the number of "subcarriers" that can be used. The subcarriers are configured to be either unoccupied (DC Null) 2310 or pilot subcarriers 2308, CE subcarriers 2304 or data subcarriers 2309, 2311 coded and modulated using the one signaled in the MCS Value. The allowed (size) ranges for the programmable signal parameters can be as follows. The following parameters can have a pre-set value or a dynamic value: DC Null, pilot subcarriers, pilot sub-band offset, CE symbols and the CPP.

The signal is configured to be constructed in the frequency domain, then converted to the time domain with an IFFT operation. The UW 2302 can be configured to be added to the time domain signal prior to every RF. Each UW 2302 can be configured to be, in time, equal to one OFDM symbol duration. The UW 2302 also includes the CPP. The time domain signal may be further conditioned for peak reductions, etc. The time domain signal can be configured to be streamed to the DBF on the transmission PHY interface with a 270 MHz sample rate. The 270 MHz sample rate signal is the 9/8 oversampled signal which is achieved by taking 1152 pt IFFT on a 1024 pt signal—of the 240 MHz signal. This is nominally referred to as the 250 MHz BW signal. The signal generation is consistent with the information provided above.

FIG. 23B illustrates an example method embodiment 2350 associated with the SAT-UT DL mode. A method, practiced by a modem 500 on a UT 102 that is receiving a transmitted OFDM waveform from a SAT 104. The method can include receiving, at a receiver on a UT a transmitted waveform transmitted from a SAT (2352). The transmitted waveform can include one or more of: a unique word configured in a first time period of a burst in a radio frame, a first channel estimation symbol configured in a second time period of the burst of the radio frame, the second time period adjacent to the first time period, the channel estimation symbol being associated with first user data intended for the UT and covering a first channel estimation symbol set of frequency resources, a first pilot subcarrier at a first frequency in a third time period of the burst in the radio frame, and a second pilot subcarrier at a second frequency in the third time period of the burst in the radio frame. A first resource block of the first user data can be configured in the third time period and utilizes a first resource block set of frequency resources between the first pilot subcarrier and the second pilot subcarrier.

The waveform can include a second channel estimation symbol configured in the second time period of the burst of the radio frame, the second channel estimation symbol being associated with second user data intended for a second UT and covering a second channel estimation symbol set of frequency resources. A third pilot subcarrier can be included at a third frequency in the third time period of the burst in the radio frame. A fourth pilot subcarrier can be included at a fourth frequency in the third time period of the burst in the radio frame. A second resource block includes the second user data configured in the third time period and utilizes a second resource block set of frequency resources between the third pilot subcarrier and the fourth pilot subcarrier. The method can further include implementing a delay that causes the receiver to wait a delay time based on a distance of the UT from the SAT before extracting the first resource block from the burst in the radio frame (2354).

The transmitted waveform further can include a cyclic prefix and postfix, a DC null configured in the third time period, a first pilot sub-band offset configured in the third time period and at a third frequency and a second pilot sub-band offset configured in the third time period and at a fourth frequency.

In one aspect, the second UT can be further way from the SAT relative to the UT. The radio frame can include the first resource block in the radio frame intended for the UT and the radio frame can include the second resource block in the radio frame intended for the second UT. The delay time can include at least a minimal delay time related to a delay between when the radio frame was received by a second UT relative to when the radio frame was received by the UT to allow for the UT to extract the first resource block from the radio frame and the second UT to extract the second resource block from the radio frame.

FIG. 23C illustrates a method embodiment 2360 related to the SAT-UT DL mode. In this example, a method is performed by the SAT 104 for generating a transmission waveform for transmission to the UT 102. The method includes inserting a unique word in a first time period of a burst in a radio frame (2362), inserting a channel estimation symbol configured in a second time period of the burst of the radio frame, the second time period adjacent to the first time period, the channel estimation symbol being associated with a channel and covering a channel estimation symbol set of frequency resources (2364), configuring a first pilot subcarrier at a first frequency in a third time period of the burst in the radio frame (2366) and configuring a second pilot subcarrier at a second frequency in the third time period of the burst in the radio frame (2368). These various components are shown in FIG. 24A.

The method can further include configuring one or more resource blocks including user data for one or more users in the third time period within the burst of the radio frame, the one or more resource blocks including a resource block set of frequency resources between the first pilot subcarrier and the second pilot subcarrier (2370) and configuring a DC null configured in the third time period, wherein the burst is configured such that data intended for one or more of the UT, a second UT, a third UT and a fourth UT can be configured within the burst of the radio frame or other bursts within the radio frame (2372).

The burst may also include offset symbols in which case the method further includes inserting a first pilot sub-band offset configured in the third time period and at a third frequency (2374) and inserting a second pilot sub-band offset configured in the third time period and at a fourth frequency (2376).

In another aspect, the method can further include performing pre-compensation on the transmission waveform, the pre-compensation related to one or more of carrier frequency offset (CFO) and sampling frequency offset (SFO) (2378), performing crest factor reduction on the transmission waveform prior to transmission from the UT (2380) and performing digital pre-distortion on the transmission waveform that adjusts one or more of a power amplifier linearity, efficiency or power consumption for a given signal quality (2382). FIG. 28 illustrates the various resource blocks with respective user data (for three customers 2808) that is transmitted to the three UTs.

Waveform Structure for SAT-UT Uplink Communication

The concepts associated with the waveform structure for the SAT-UT UL relate to the second embodiment disclosed herein. FIG. 24A illustrates the SAT-UT UL mode transmit radio frame structure 2400 with a single user data in different sets of resource blocks and across different bursts 2402, 2412, 2420. Note that this figure illustrates the view of the UL from the standpoint of a single user or single UT 102. Thus, the UT only sees its data being mapper to respective bursts 2402, 2412, 2420, while other users will see their data mapped to different portions of the respective bursts in the radio frame. A radio frame 2400 is shown with a symbol time on the "x" axis and frequency on the "y" axis with, for example, a bandwidth of 62.5 MHz. A first burst 2402 includes several components including a unique word 2404, resource blocks 2408, a channel estimation symbol 2406, and pilot subcarriers 2410. The resource blocks 2408 represent the user data for one user. Note that other space is available in the burst 2402 for other user resource blocks as well. A second burst 2412 is shown with its UW 2414, channel estimation symbol 2418 and resource block 2416. A DC null 2417 is illustrated in the second burst 2412. A third burst 2420 also includes a UW symbol 2422, a channel estimation symbol 2424, a set of resource blocks 2426 and pilot subcarriers 2428 configured at the top and bottom end of the set of resource blocks 2426 for the respective user in the third burst 2420. The pilot sub-band offsets 2413 and 2415 can also be provided in each burst as shown in FIG. 24A. Note that the pilot sub-band offsets 2413 and 2415 may have adjacent to each of them a group of pilot subcarriers which can be used for linear interpolation across the bandwidth of the radio frame to correct for various errors as described herein.

FIG. 24B illustrates a method embodiment 2450 related to the SAT-UT UL mode. In this example, a method is performed by the UT 102 for generating a transmission waveform for transmission to the SAT 104. The method includes inserting a unique word in a first time period of a burst in a radio frame (2452), inserting a channel estimation symbol configured in a second time period of the burst of the radio frame, the second time period adjacent to the first time period, the channel estimation symbol being associated with a channel and covering a channel estimation symbol set of frequency resources; (2454), configuring a first pilot subcarrier at a first frequency in a third time period of the burst in the radio frame (2456) and configuring a second pilot subcarrier at a second frequency in the third time period of the burst in the radio frame (2458). These various components are shown in FIG. 24A.

The method can further include configuring a resource block including user data in the third time period within the burst of the radio frame, the resource block including a resource block set of frequency resources between the first pilot subcarrier and the second pilot subcarrier, the resource block being associated with the user data (2460) and configuring a DC null configured in the third time period, wherein the burst is configured such that data from one or more of a second UT, a third UT and a fourth UT can be configured within the burst of the radio frame or other bursts within the radio frame (2462). Note that in this example, the UT, the second UT, the third UT and the fourth UT can be the same UT or all different UTs.

The burst may also include offset symbols in which case the method further includes inserting a first pilot sub-band offset configured in the third time period and at a third frequency (2464) and inserting a second pilot sub-band offset configured in the third time period and at a fourth frequency (2466). These offsets can correspond to offsets 705, 707 in FIG. 7, offsets 1624, 1636 in FIG. 16B or offsets 2413, 2415 in FIG. 24A.

In another aspect, the method can further include performing pre-compensation on the transmission waveform, the pre-compensation related to one or more of carrier frequency offset (CFO) and sampling frequency offset (SFO) (2468), performing crest factor reduction on the transmission waveform prior to transmission from the UT (2470) and performing digital pre-distortion on the transmission waveform that adjusts one or more of a power amplifier linearity, efficiency or power consumption for a given signal quality (2472).

Waveform Structure for SAT-SAG Uplink and Downlink Communications

The fourth embodiment of this disclosure relates to the SAT-SAG UL and DL waveform structure and other concepts applicable to this channel. First, FIG. 25 is discussed with respect to its protocol data unit (PDU) structure, followed by the radio frame structure and associated methods for this fourth embodiment of the disclosure in FIGS. 26A-26C.

FIG. 25 illustrates a SAG mode transmit 2500 with a protocol data unit (PDU) 2502 that is mapped to a radio frame 2504 including a respective UW symbol 2506, channel estimation 2508 and resource block or protocol data unit (PDU) 2510. One example mapping is shown. The mapping can occur for a single PDU 2502 or a group of PDUs 2512 that are mapped to a group of PDUs 2512 that are mapped to one or more radio frames 2514. The radio frame 2504 can also be characterized as a burst 2504. The SAG mode transmit can have an asynchronous mode and a semi-synchronous mode. FIG. 25 shows an asynchronous mode in which there can be gaps between radio frames. A semi-synchronous mode can also be provided in which the mapping between the PDUs does not have to be fully synchronized with the structure of the radio frame. In this case, some radio frames may be back to back (synchronous) and in some cases only some radio frames may be back to back (semi-synchronous).

FIG. 26A illustrates the radio frame structure 2600 for communications between a SAT and a SAG for both the UL and the DL according to the fourth embodiment disclosed herein. The radio frame structure 2600 includes a UW symbol 2602 configured in a first time period of a burst 2612, a channel estimation symbol 2604 configured in a second time period of the burst 2612, and the resource blocks 2606 configured in a third time period of the burst 2612 within the radio frame. One or more bursts 2612 can be included within a single radio frame. A DC null 2608 can be included as well in the third time period of the burst 2612. The pilot subcarriers 2608, 2610 are shown as well in the third time period as well as frequency offsets or pilot sub-band offsets 2614, 2616 can also be positioned at each end of the frequency channel.

In one example, the pilot subcarrier 2608, 2610 can each represent a group of one or more subcarriers adjacent to the pilot sub-band offsets 2614, 2416 and can thus be used for linear interpolation across the band of the radio from to correct for various errors as disclosed herein.

Note that this radio frame does not require division into sub-sections for multiple user data in that in the radio frame there are not multiple users combining respective data in the air interface as occurs with multiple UTs and as is shown in FIG. 10. The radio frame structure 2600 can be used for the SAT-SAG DL as well as the SAT-SAG UL. A radio frame as shown in FIG. 26A can include the burst 2612 having the unique word symbol 2602, the channel estimation symbol 2604 and the resource blocks 2606 and pilot subcarriers 2608, 2610 configured in appropriate time periods and frequency ranges in the channel. The radio frame structure 2600 can be configured for an UL between the SAG and the SAT using a 500 MHz channel bandwidth or for a DL from the SAT to the SAT using a 250 MHz channel bandwidth. Otherwise, the radio frame configuration is similar for both the DL and the UL.

Next is discussed the protocol data unit (PDU) and signal details for the SAT-SAT UL and DL modes of the fourth embodiment, with the radio frame 2600 shown in FIG. 26A as an example.

SAT-SAG UL MODE

The fourth embodiment introduced above relates also to the SAT-SAG UL mode, or for communications from the SAG 106 to the SAT 104. The frame structure for this mode (as well as the SAT-SAG DL mode) is disclosed in FIG. 26A. The SAT-SAG UL mode can be summarized with respect to its PDU structure and signal structure as follows. The service provided in this mode includes the modem PHY (L1) being configured to provide PDU carrying services to one MAC/Network (L2/L3) entity per beam to a remote stack of L1/L2/L3 peers. Each modem beam can be configured to be independently configurable for signal generation parameters.

In the SAT-SAG UL mode, the signal details can be summarized as follows. Each PDU is configured to include one LDPC encoded codeword (CW) with allowed MCS values discussed above. PDU details are configured be communicated between L2 (MAC) and L1 (PHY) using a container structure. The PDU container can be configured to include metadata to indicate the MCS value. The header can be configured to include information needed for demodulation and decoding of the PDU at the receiver.

In the SAT-SAG UL mode, the signal details can be summarized as follows. The basic unit of the transmit signal in time is a RF 2600 as shown in FIG. 26A. The RF signal 2600 can be configured to be sent in one of two modes: an asynchronous mode or a semi-synchronous mode. In the asynchronous mode, the RF 2600 is configured to be initiated when L2/L3 data is streamed to the L1 and whose end is clearly indicated with a t_last signal on the streaming interface. In the semi-synchronous mode, the RF 2600 is configured to be initiated at a periodic basis signaled in the register and L2/L3 data is configured to be sent on the first available RF 2600 from time of arrival on the streaming interface. The semi-synchronous mode is configured to start the first RF when data is available to transmit. Subsequent RFs can be configured to be sent periodically.

The L2/L3 data can be configured to be back pressured to the networking blocks if internal 4K TX buffers are full. Each RF signal 2600 can be configured to include a certain number of I/Q symbols. The first configurable number of OFDM symbol(s) in all RF can be configured to be the channel estimate (CE) symbol(s) 2604. Each OFDM symbol can be configured to be padded with null bins on each end and converted to the time domain with a multi-point IFFT. Each OFDM symbol can be configured to be pre and post-pended by a certain number of samples on each end post-IFFT in the time domain. The number of OFDM symbols in the RF 2600 can be configured to be consistent with a register. The size of the RF 2600 is configured to be the time occupied by the symbols plus the time to transmit the UW 2602. Each OFDM can be configured to include a certain number of "subcarriers" that can be used.

The subcarriers can be configured to be either unoccupied (DC Null) 2608 or be pilot subcarriers 2608, 2620, CE subcarriers 2604 or data subcarriers 2606 coded and modulated using one signaled in MCS Value. The allowed (size) ranges for the programmable signal parameters can be as follows. Each of the following parameters can have pre-set values or dynamic values as well: The DC null 2608, the pilot subcarriers 2608, 2610, the pilot sub-band offset 2614, 2616, the CE symbols 2604, and the CPP.

The RF signal 2600 is configured to be constructed in the frequency domain, then converted to the time domain with an IFFT operation. The UW 2602 is configured to be added to the time domain signal prior to every RF transmission. Each UW 2602 can be configured, in time, to be equal to one OFDM symbol duration. The UW 2602 also includes the CPP. Two transmit beams on the same frequency, on using LHCP (left hand circularly polarized) and one using RHCP (right hand circularly polarized) are configured to be time aligned and use different UWs (PN sequences).

The time domain signal may be further conditioned for peak reductions, etc. The time domain signal can be is configured to be streamed to the digital beam former (DBF) on the XPHY interface with a 540 MHz sample rate. The 540 MHz sample rate signal is the 9/8 oversampled signal. The 9/8 oversampled signal can be achieved by taking 1152 pt IFFT on a 1024 pt signal—of the 480 MHz signal. This is nominally referred to as the 500 MHz BW signal. The signal generation is consistent with the information provided above. The transmitter may have the circuitry to enable pre-compensation of frequency error and sampling clock error.

SAT-SAG DL MODE

The fourth embodiment described above also relates to the SAT-SAG UL and DL radio frame structure and other concepts related to this communication channel as shown in FIG. 26A. The following discussion provides additional details about the SAT-SAG DL mode (the protocol data unit (PDU) structure, signal structure, etc.) in more detail. In the SAT-SAG DL mode, the service is provided in which the modem PHY layer 1 is configured to provide PDU carrying services to one MAC/Network (L2/L3) entity per beam to a remote stack of L1/L2/L3 peers. Each modem beam is configured to be independently configurable for Signal Generation Parameters.

The PDU details for this mode can include each PDU being configured to be communicated between L2 (MAC) and L1 (PHY) using a container structure, which can be a packet structure of any structure associated with a group of data. The PDU container can be configured to include metadata to indicate a modulation and coding scheme (MCS) value. The physical layer is configured to prepend each PDU with a 27 (for the first PDU of the radio frame) or a 23 (for all subsequent PDUs) bit PHY header. The number of bits required for the PHY header can vary from these numbers as well. The header is configured to include information used for demodulation and decoding of the PDU at the receiver 512.

In the SAT-SAG DL mode, the signal details can be summarized as follows. The basic unit of the transmit signal in time is the radio frame (RF) shown in FIG. 7 or FIG. 26A. The RF signal can be configured to be sent in one of two modes: asynchronous mode or semi synchronous mode. In the asynchronous mode, the RF frame is configured to be initiated when L2/L3 data is streamed to the L1 and whose end is clearly indicated with at last signal on the streaming interface. In the semi-synchronous mode, the RF 2600 is configured to be initiated at a periodic basis signal in a register and L2/L3 data is configured to be sent on the first available RF from time of arrival on the streaming interface. The semi-synchronous mode can be configured to start the first RF when data is available to transmit. A subsequent RF can be configured to be sent periodically. The L2/L3 data is configured to be back pressured to the networking blocks if internal 4K transmission buffers are full. Each RF can be configured to include a number of subcarriers. The first configurable number of OFDM symbols in all RFs 2600 can be configured to be the channel estimate (CE) symbols 2604. Each OFDM symbol is configured to be padded with null bins on each end or each edge of the frequency band 2614, 2616 and converted to the time domain with a multi-point IFFT. Each OFDM symbol is configured to be pre- and post-pended by a number of samples on each end post-IFFT in the time domain. The number of OFDM symbols in the RF 2600 can be configured to be consistent with a setting register. The size of the RF can be configured to be in the time occupied by the symbols plus the time to transmit a unique word (UW). Each OFDM symbol can be configured to include a certain number of subcarriers that can be used. The subcarriers are configured to be either unoccupied (DC null) 2608 or be pilot subcarriers 2608, 2610, CE subcarriers 2604 or data subcarriers 2606, 2619 encoded and modulated using the coding and modulation scheme included in the MCS value. The allowed size ranges for the program signal parameters are all preset, such as for the DC null 2608, the pilot subcarriers 2608, pilot sub-band offset 2614, 2616, CE symbols 2604 and CPP. These parameters are all introduced and discussed above.

The signal can be configured to be constructed in the frequency domain then converted to the time domain with an IFFT operation. The UW 2602 is configured to be added to the time domain signal prior to every RF transmission. Each UW 2602 is configured to be unique where users need to be differentiated and orthogonal. In some cases, where there are communications between the SAT 104 and the SAG 106, the UW 2602 actually does not have to be unique as there is no multiple user data that needs to be extracted as in the SAT 104 to UT 102 channels. Thus, the UW 2602 may not be unique in the SAT-SAG channel. Two transmits beams on the same frequency can be used, one using left hand circularly polarized and one using right hand circularly polarized. The two beams are configured to be time aligned and use different UWs or PN-sequences. The time signal may further be condition for peak reductions.

The time domain signal can be configured to be streamed to the digital beam former on the physical interface with a 270 MHz sampling rate. The 270 MHz sampling rate signal can be a 9/8 oversampled signal achieved by taking 1152 pt FFT on a 1024 point signal of the 240 MHz signal. This is normally referred to as the 250 MHz bandwidth signal. The transmitter may have the circuitry to enable precompensation of frequency error and sampling clock error.

FIG. 26B illustrates an example method 2620 for generating a waveform for transmission from modem configured on a SAG 106 to a SAT 104 or from a modem configured on a SAT 104 for waveforms transmitted to a SAG 106. The example method 2620 includes transmitting a first waveform for use in a channel between the SAT and the SAG and on either an uplink or a downlink (2622). The first waveform can include a unique word configured in a first time period of a burst in a radio frame, a channel estimation symbol configured in a second time period of the burst of the radio frame, the second time period adjacent to the first time period, the channel estimation symbol being associated with a channel and covering a set of frequency resources, a first pilot subcarrier at a first frequency in a third time period of the burst in the radio frame and a second pilot subcarrier at a second frequency in the third time period of the burst in the radio frame. One or more resource blocks can be configured in the third time period of the burst in the radio frame and configured to use the set of frequency resources between the first pilot subcarrier and the second pilot subcarrier. The method can further include receiving a second waveform via the uplink or the downlink (2624).

When the channel is the uplink between the SAG 106 and the SAT 104, the first waveform can have a bandwidth of 500 MHz and when the channel is the downlink between the SAT 104 and the SAG 106, the first waveform has a bandwidth of 250 MHz.

The method can further include, prior to transmitting the first waveform, configuring by a modem 500 one or more parameters associated with the first waveform, the one or more parameters including: a subcarrier spacing, a bandwidth, a time-domain cyclic guard band, a resource block size, a user allocation, a radio frame size, a channel estimation symbol, a first pilot sub-band offset, a second pilot sub-band offset, a pilot averaging approach, a DC guard band, and a modulation and coding scheme (2626).

The bandwidth can set by selecting a sampling rate with a fast Fourier transform/inverse fast Fourier transform size fixed to provide a number of subcarriers for the first waveform. In one aspect, the subcarrier spacing for the first waveform changes as the sampling rate changes.

Part of the process of receiving the second waveform further can include performing error correction on the second waveform to correct for one or more of a sampling frequency offset (SFO), a carrier frequency offset (CFO), a delay, an impact of weather on the second waveform, a phase array loss in the second waveform, a delay variation, and a Doppler effect due to movement of the SAT 104.

FIG. 26C illustrates another method 2630 related to the fourth embodiment of this disclosure. This method can be performed by a modem configurable to be implemented in the SAT 104 or the SAG 106. The method can include configuring, whether the modem is deployed on the SAT or the SAG, the modem to transmit or receive a waveform having a configuration (2632). The waveform can include a unique word configured in a first time period of a burst in a radio frame, a channel estimation symbol configured in a second time period of the burst of the radio frame, the second time period adjacent to the first time period, the channel estimation symbol being associated with a channel and covering a set of frequency resources, a first pilot subcarrier at a first frequency in a third time period of the burst in the radio frame and a second pilot subcarrier at a second frequency in the third time period of the burst in the radio frame. The configuration can further include a first pilot sub-band offset configured in the radio frame, a second pilot sub-band offset configured in the radio frame and one or more resource blocks configured in the third time period of the burst in the radio frame and configured to use the set of frequency resources between the first pilot subcarrier and the second pilot subcarrier.

The method can further include transmitting the waveform in a transmit mode (2634) and receiving the waveform in a receive mode (2636). When the channel is an uplink channel between the SAG and the SAT, the waveform can have a bandwidth of 500 MHz and when the channel is a downlink channel between the SAT and the SAG, the waveform can have a bandwidth of 250 MHz.

The method further can include, prior to transmitting the waveform when in the transmit mode, configuring by the modem one or more parameters associated with the waveform, the one or more parameters including one or more of: a subcarrier spacing, a bandwidth, a time-domain cyclic guard band, a resource block size, a user allocation, a radio frame size, a channel estimation symbol, a pilot averaging approach, a DC guard band, and a modulation and coding scheme (2638).

In one aspect, the step of receiving the waveform when in the receive mode further can include performing error correction on the waveform to correct for one or more of a sampling frequency offset (SFO), a carrier frequency offset (CFO), a delay, an impact of weather on the second waveform, a phase array loss in the second waveform, a delay variation, and a Doppler effect due to movement of the SAT (2640).

Performing error correction can further include performing a linear phase interpolation across the set of frequency resources using the first pilot sub-band offset and the second pilot sub-band offset.

In one aspect, receiving the waveform when in the receive mode further can include applying gain control to correct for one or more of weather impacts on the waveform and a phase array loss in the waveform. In another aspect, performing error correction further can include evaluating a repetition of the unique word to track a phase change to estimate a frequency offset.

Delay Factors in the MU-UL Embodiments

The second and third embodiments discussed above relate to the DL and UL of the UT-SAT communication channel. FIGS. 27-31 provide further details regarding the delay introduced by the different locations of respective UTs 102 in a region or cell and how these differences in distance introduce a delay requirement for synchronizing radio frame reception across the different UTs. FIG. 27 illustrates the multi-user UL time and frequency synchronization 2700 that occurs in the modem 500. In this figure, the SAT 104 is at a first position 2702 at time t and at this position, the satellite at position 2702 transmits a first signal 2720 to a first customer 2708 in a cell 2706 having different UTs represented as different customers 2708, 2710, 2712. The satellite at the position 2702 transmits a second signal 2722 to a second customer 2710 in the cell 2706. The satellite at the position 2702 transmits a third signal 2724 to a third customer 2712. Each customer is at a different location in the cell and the distances that the respective signals 2720, 2722, 2724 must travel will differ and thus arrive at the respective customer location within the cell 2706 at different times. At time t+T, the SAT 104 then moves to a new position 2704. At this position, assume that the various customers 2708, 2710, 2712 now have transmitted a signal back to the satellite at the position 2704. At position 2704, the SAT 104 receives a first signal 2714 from the first customer 2708, a second signal 2716 from the second customer 2710 and a third signal 2722 from the third customer 2712. The transmission time for each of these signals also will differ giver the different location within the cell 2706 of each of the customers and the time it takes for the signals to travel through the air interface. Given the distance between the SAT 104 (being in orbit at about 550 km above the Earth's surface) and the respective customers 2708, 2710, 2712, the difference in timing becomes important particularly in terms of the radio frame structure disclosed herein wherein on the UT-UL transmission from a group of UT's, the radio frame will combine data from up to four UTs 102.

In order to address the timing issue, all of the UTs will not transmit on the UL until they receive a DL radio frame as will be shown in FIG. 28. All of the UT UL radio frame transmission timings are determined based on reception times of UT DL radio frames. In one sense, this approach relaxes the UT so that the system does not require true time, or coordinated universal time (UTC) as is within the limits that OFDMA requires in a traditional cellular application. The UTs 2708, 2710, 2712 will use local delays to align radio frames and the delays are configured to be accurate.

FIG. 28 illustrates the delays discussed above and shows a block diagram 2800 of a series of satellite transmission radio frames 2802 and a group of the transmission radio frames organized in a fixed time 2804, which can be up to 20 ms or some other time frame. The various receive frames 2806 are shown along the bottom of this figure.

The locations of the different customers 2808 is described by way of example where customer 1 (which can correspond to customer 1 2708 of FIG. 27) is at a near edge of the cell 2706, customer 2 (which can correspond to customer 2 2710 of FIG. 27) is at a center area of the cell 2706 and customer 3 (which can correspond to customer 3 2712 of FIG. 27) is at a far edge of the cell 2706. As shown in FIG. 28, a first signal 2810 of TX frame 1 from the satellite 2702 is transmitted and then received by customer 1 within 3.8 to 5 ms as a RX frame 2816. The TX frame 1 is received as a second signal 2812 on the downlink (DL) at customer 2 as RX frame 1 2818 and the TX frame 1 is received as a third signal 2814 on the DL at customer 3 as RX frame 1 2820. Each customer receives the respective frame at a different time given their respective distance from the satellite 2702 as each customer is in a different part of the cell 2706.

In order for the UL radio frame (transmitted for example, in response to the RX frames 2816, 2828, 2820) to be synchronized in time such that it arrives as a single radio frame with data from customer 1, customer 2 and customer 3, the timing of the respective TX frame from the different customers also needs to be adjusted so that there is proper alignment in the air interface of the radio frame. Thus, customer 1 will wait a certain amount of time 2822 between a first time when it received the RX Frame 1 2816 on the DL until it transmits its TX frame 1 2830 on the UL. Note the various resource blocks in the radio frame 2830 that illustrates an example of how the data for customer 1 can be dispersed. A delay block or a delay component can be configured in the modem or the receiver for managing the delay time periods due to distances between the UT and the SAT.

The first time delay 2822 is based on the distance of a respective customer from the satellite 2702. In one aspect, the system also takes into account the fact that when the TX frame 2830 is received at the satellite 2702, the satellite will be in a new position 2704 relative to the first position 2702 when the TX frames were transmitted on the DL. Customer 2 will wait a second period of time 2824 between the time the RX frame 1 2818 was received on the DL to when customer 2 will transmit a TX frame 2832 on the UL. Customer 3 will wait a third period of time 2826 between the time the RX frame 1 2820 was received on the DL to when customer 3 will transmit a TX frame 2834 on the UL. These staggered times will account for the differences in distance between the respective UTs and the satellite at positions 2702/2704. There is a minimal delay time 2828 that can be used to enable all the customers time to respond. Then, over the air interface, as the UL radio frame is constructed from the different TX frames 2830, 2832, 2834 received from the respective customers, and given the different delays 2836, 2839 and 2840 on the UL, the satellite 2704 will receive the RX radio frame 2842 at the proper time alignment. The radio frame will be constructed and properly configured in time with the data from the various customers. Note also the user data for customer 2 configured in the radio frame 2832 and the user data for customer 3 in the radio frame 2834. The distributed respective user data is combined in radio frame 2842 which is transmitted to the satellite 2704.

FIG. 29 illustrates a method embodiment 2900 practiced by a respective UT in connection with the timing procedures shown in FIG. 28. The method is practiced by the UT and includes receiving, from a SAT, a first frame on a SAT-UT DL at a first time (2902), waiting a second of time based on a distance between the UT and the SAT (2904), and transmitting a second frame on a SAT-UT UL after the second of time (2906). Different UTs at different locations within a cell or a geographic area can receive DL frames at different times from a SAT and have different respective delay times before they transmit on the UL to a SAT.

FIG. 30 illustrates a method 3000 practiced by the SAT in connection with the timing concepts described in FIG. 28. In this regard, the method can include transmitting, from a SAT, a frame on a SAT-UT DL, wherein the frame is received at a first time at a first UT and at a second time at a second UT (3002) and receiving, at the SAT, a second frame including first UT data and second UT data, wherein the second frame includes the first UT data transmitted at a first delay time, relative to the first time, from the first UT and the second UT data transmitted at a second delay time, relative to the second time, from the second UT (3004).

FIG. 31 illustrates a method 3100 practiced by both the SAT and one or more UTs in connection with the timing concepts described in FIG. 28. In this regard, the method can include transmitting, from a SAT, a frame on a SAT-UT DL (3002), receiving the frame at a first time at a first UT and at a second time at a second UT (3004), implementing, at the first UT, a first delay relative to the first time (3006), transmitting, from the first UT, a first UT frame after the first delay (3008), implementing, at the second UT, a second delay relative to the second time (3010), and transmitting, from the second UT, a second UT frame after the second delay (3012).

The method includes receiving, at the SAT, a second frame including the first UT frame and the second UT frame, wherein the first delay and the second delay result in an alignment of the first UT frame and the second UT frame in the second frame such that the second frame is received at the SAT at a third time and contains the first UT frame and the second UT frame (3014).

FIG. 32 illustrates example computer device that can be used in connection with any of the systems or components of the parabolic antenna disclosed herein. In this example, FIG. 32 illustrates a computing system 3200 including components in electrical communication with each other using a connection 3205, such as a bus. System 3200 includes a processing unit (CPU or processor) 3210 and a system connection 3205 that couples various system components including the system memory 3215, such as read only memory (ROM) 3220 and random access memory (RAM) 3225, to the processor 3210. The system 3200 can include a cache of high-speed memory connected directly with, in close proximity to, or integrated as part of the processor 3210. The system 3200 can copy data from the memory 3215 and/or the storage device 3230 to the cache 3212 for quick access by the processor 3210. In this way, the cache can provide a performance boost that avoids processor 3210 delays while waiting for data. These and other modules can control or be configured to control the processor 3210 to perform various actions. Other system memory 3215 may be available for use as well. The memory 3215 can include multiple different types of memory with different performance characteristics. The processor 3210 can include any general purpose processor and a hardware or software service, such as service 1-3232, service 2-3234, and service 3-3236 stored in storage device 3230, configured to control the processor 3210 as well as a special-purpose processor where software instructions are incorporated into the actual processor design. The processor 3210 may be a completely self-contained computing system, containing multiple cores or processors, a bus, memory controller, cache, etc. A multi-core processor may be symmetric or asymmetric.

To enable user interaction with the device 3200, an input device 3245 can represent any number of input mechanisms, such as a microphone for speech, a touch-sensitive screen for gesture or graphical input, keyboard, mouse, motion input, speech and so forth. An output device 3235 can also be one or more of a number of output mechanisms known to those of skill in the art. In some instances, multimodal systems can enable a user to provide multiple types of input to communicate with the device 3200. The communications interface 3240 can generally govern and manage the user input and system output. There is no restriction on operating on any particular hardware arrangement and therefore the basic features here may easily be substituted for improved hardware or firmware arrangements as they are developed.

Storage device 3230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 3225, read only memory (ROM) 3220, and hybrids thereof.

The storage device 3230 can include services 3232, 3234, 3236 for controlling the processor 3210. Other hardware or software modules are contemplated. The storage device 3230 can be connected to the system connection 3205. In one aspect, a hardware module that performs a particular function can include the software component stored in a computer-readable medium in connection with the necessary hardware components, such as the processor 3210, connection 3205, output device 3235, and so forth, to carry out the function.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or processor-executable instructions, including routines executed by a programmable computer, processor, controller, chip, and/or the like. Those skilled in the relevant art will appreciate that the technology can be practiced on computer/controller systems other than those shown and described above. The technology can be embodied in a special-purpose computer, controller, or processor that is specifically programmed, configured or constructed to perform one or more of the computer-executable instructions described above. Accordingly, the terms "computer," "controller," "processor," or the like as generally used herein refer to any data processor and can include Internet appliances and hand-held devices (including palmtop computers, wearable computers, cellular or mobile phones, multi-processor systems, processor-based or programmable consumer electronics, network computers, mini computers, and the like). Information handled by these computers can be presented at any suitable display medium, including an organic light emitting diode (OLED) display or liquid crystal display (LCD).

In an embodiment, an orthogonal frequency division multiplexing (OFDM) signal frame structure is configured for flexible bandwidth and/or flexible mode use. The OFDM signal frame structure can be used to transmit OFDM signals having a channel bandwidth in the range of approximately 60-500 MHz, for example without limitation. The same OFDM signal frame structure can be used to communicate signals between different components of a wireless communication system, such as a non-geostationary orbit satellite (NGOS) system. The OFDM signal frame structure is configured for a plurality of use cases (also referred to as modes)—SAT 104, SAG 106, and UT 102 modes. The OFDM signal frame structure allows high flexibility and parameterization for static and run-time configuration. OFDM signals or waveforms configured in accordance with the frame structure described herein are capable of highly efficient data communication and also operable in a wide range of signal-to-noise ratio (SNR) regimes.

It is understood that frequency and bandwidth values set forth in the present disclosure are provided as examples only and are in no way meant to be limiting. The OFDM signal/waveform, transmitter, and/or receiver can be implemented using the same or different frequencies and/or bandwidths as set forth in the present disclosure.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Thus, although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and any combination of the components or functions disclosed herein for one or more of the transmitter 502, the receiver 512 and/or the modem 500 can be mixed and matched to achieve the waveform structure and processing described herein.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A modem configured to receive a transmitted waveform transmitted from a satellite (SAT) to a user terminal (UT), the modem comprising:
 a receiver, on the UT, configured to receive the transmitted waveform from the SAT, to extract user data from the transmitted waveform and to transmit the user data to a computing device, the transmitted waveform comprising:
  a unique word configured in a first time period of a burst in a radio frame;
  a first channel estimation symbol configured in a second time period of the burst of the radio frame, the second time period adjacent to the first time period, the first channel estimation symbol being associated with first user data intended for the UT and covering a first channel estimation symbol set of frequency resources;
  a first pilot subcarrier at a first frequency in a third time period of the burst in the radio frame;
  a second pilot subcarrier at a second frequency in the third time period of the burst in the radio frame;
  a first resource block comprising the first user data configured in the third time period and utilizing a first resource block set of frequency resources between the first pilot subcarrier and the second pilot subcarrier;
  a second channel estimation symbol configured in the second time period of the burst of the radio frame, the second channel estimation symbol being associated with second user data intended for a second UT and covering a second channel estimation symbol set of frequency resources;
  a third pilot subcarrier at a third frequency in the third time period of the burst in the radio frame;
  a fourth pilot subcarrier at a fourth frequency in the third time period of the burst in the radio frame; and
  a second resource block comprising the second user data configured in the third time period and utilizing a second resource block set of frequency resources between the third pilot subcarrier and the fourth pilot subcarrier; and
 a delay component that causes the receiver to wait a delay time based on a distance of the UT from the SAT before extracting the first resource block from the burst in the radio frame.

2. The modem of claim 1, wherein the transmitted waveform further comprises:
   a cyclic prefix and postfix;
   a DC null configured in the third time period;
   a first pilot sub-band offset configured in the third time period and at a third frequency; and
   a second pilot sub-band offset configured in the third time period and at a fourth frequency.

3. The modem of claim 2, wherein the transmitted waveform is transmitted from the SAT at a 270 MHz sampling rate or a 250 MHz sampling rate.

4. The modem of claim 3, wherein the 270 MHz sampling rate represents a 9/8 oversampled signal, achieved by taking a 1152 point inverse fast Fourier transfer on a 1024 point signal at 240 MHz.

5. The modem of claim 1, wherein the transmitted waveform is configured to contain the user data for up to four UTs.

6. The modem of claim 1, wherein the transmitted waveform is configured in one of a synchronous mode or a semi-synchronous mode.

7. The modem of claim 1, wherein the transmitted waveform is coded and modulated using a modulating and coding scheme value.

8. The modem of claim 1, wherein:
   the second UT is further way from the SAT relative to the UT;
   the radio frame comprises the first resource block in the radio frame intended for the UT and the radio frame comprises the second resource block in the radio frame intended for the second UT; and
   the delay time comprises at least a minimal delay time related to a delay between when the radio frame was received by a second UT relative to when the radio frame was received by the UT to allow for the UT to extract the first resource block from the radio frame and the second UT to extract the second resource block from the radio frame.

9. The modem of claim 1, wherein the modem further corrects the transmitted waveform for one or more of a sampling frequency offset (SFO) and a carrier frequency offset (CFO).

10. The modem of claim 1, further comprising:
    a burst detection component that utilizes pseudo-noise sequences with repetitions to estimate a frequency offset.

11. The modem of claim 10, wherein the burst detection component detects an individual frequency offset associated with the UT and not the second UT.

12. A method comprising:
    receiving, at a receiver on a user terminal (UT) a transmitted waveform transmitted from a satellite (SAT), to extract user data from the transmitted waveform and to transmit the user data to a computing device, the transmitted waveform comprising:
       a unique word configured in a first time period of a burst in a radio frame;
       a first channel estimation symbol configured in a second time period of the burst of the radio frame, the second time period adjacent to the first time period, the first channel estimation symbol being associated with first user data intended for the UT and covering a first channel estimation symbol set of frequency resources;
       a first pilot subcarrier at a first frequency in a third time period of the burst in the radio frame;
       a second pilot subcarrier at a second frequency in the third time period of the burst in the radio frame;
       a first resource block comprising the first user data configured in the third time period and utilizing a first resource block set of frequency resources between the first pilot subcarrier and the second pilot subcarrier;
       a second channel estimation symbol configured in the second time period of the burst of the radio frame, the second channel estimation symbol being associated with second user data intended for a second UT and covering a second channel estimation symbol set of frequency resources;
       a third pilot subcarrier at a third frequency in the third time period of the burst in the radio frame;
       a fourth pilot subcarrier at a fourth frequency in the third time period of the burst in the radio frame; and
       a second resource block comprising the second user data configured in the third time period and utilizing a second resource block set of frequency resources between the third pilot subcarrier and the fourth pilot subcarrier; and
    implementing a delay that causes the receiver to wait a delay time based on a distance of the UT from the SAT before extracting the first resource block from the burst in the radio frame.

13. The method of claim 12, wherein the transmitted waveform further comprises:
    a cyclic prefix and postfix;
    a DC null configured in the third time period;
    a first pilot sub-band offset configured in the third time period and at a third frequency; and
    a second pilot sub-band offset configured in the third time period and at a fourth frequency.

14. The method of claim 12, wherein the transmitted waveform is transmitted from the SAT at a 270 MHz sampling rate.

15. The method of claim 12, wherein the transmitted waveform is configured to contain user data for up to four UTs.

16. The method of claim 14, wherein the 270 MHz sampling rate represents a 9/8 oversampled signal, achieved by taking a 1152 point inverse fast Fourier transfer on a 1024 point signal at 240 MHz.

17. The method of claim 12, wherein the transmitted waveform is configured in one of a synchronous mode or a semi-synchronous mode.

18. The method of claim 12, wherein the transmitted waveform is coded and modulated using a modulating and coding scheme value.

19. The method of claim 12, wherein:
    the second UT is further way from the SAT relative to the UT;
    the radio frame comprises the first resource block in the radio frame intended for the UT and the radio frame comprises the second resource block in the radio frame intended for the second UT; and
    the delay time comprises at least a minimal delay time related to a delay between when the radio frame was received by a second UT relative to when the radio frame was received by the UT to allow for the UT to extract the first resource block from the radio frame and the second UT to extract the second resource block from the radio frame.

20. A modem configured to transmit a waveform from a satellite (SAT) to one or more user terminals (UTs), the modem comprising:
a transmitter configured to receive user data and to generate, based on the user data, a waveform that includes the user data and to transmit the waveform from the SAT to one or more UTs, the waveform comprising:
a unique word configured in a first time period of a burst in a radio frame;
a first channel estimation symbol configured in a second time period of the burst of the radio frame, the second time period adjacent to the first time period, the first channel estimation symbol being associated with first user data intended for a first UT and covering a first channel estimation symbol set of frequency resources;
a first pilot subcarrier at a first frequency in a third time period of the burst in the radio frame;
a second pilot subcarrier at a second frequency in the third time period of the burst in the radio frame;
a first resource block comprising the first user data configured in the third time period and utilizing a first resource block set of frequency resources between the first pilot subcarrier and the second pilot subcarrier;
a second channel estimation symbol configured in the second time period of the burst of the radio frame, the second channel estimation symbol being associated with second user data intended for a second UT and covering a second channel estimation symbol set of frequency resources;
a third pilot subcarrier at a third frequency in the third time period of the burst in the radio frame; and
a fourth pilot subcarrier at a fourth frequency in the third time period of the burst in the radio frame; and
a second resource block comprising the second user data configured in the third time period and utilizing a second resource block set of frequency resources between the third pilot subcarrier and the fourth pilot subcarrier.

21. The modem of claim 20, wherein the waveform further comprises:
a cyclic prefix and postfix;
a DC null configured in the third time period;
a first pilot sub-band offset configured in the third time period and at a third frequency; and
a second pilot sub-band offset configured in the third time period and at a fourth frequency, wherein the one or more UTs utilizes the first channel estimation symbol and the second channel estimation symbol to estimate a channel and wherein the one or more UTs utilizes the first pilot sub-band offset and the second pilot sub-band offset to correct for delay variation due to SAT movement.

22. The modem of claim 20, wherein the unique word comprises a series of repeated pseudo-noise symbols that are tracked in phase over time by the first UT and the second UT to estimate a frequency offset.

23. The modem of claim 22, wherein the frequency offset comprises at least one of a sampling frequency offset and a carrier frequency offset.

24. The modem of claim 20, wherein the waveform further comprises:
a cyclic prefix and postfix;
a DC null configured in the third time period;
a first pilot sub-band offset configured in the third time period and at a third frequency;
a first group of subcarriers adjacent to the first pilot sub-band offset;
a second pilot sub-band offset configured in the third time period and at a fourth frequency; and
a second group of subcarriers adjacent to the second pilot sub-band offset, wherein the one or more UTs utilizes at least one of the unique word, first channel estimation symbol, the second channel estimation symbol, the first group of subcarriers and the second group of subcarriers to correct for one or more of Doppler effects, local oscillator effects, delay due to SAT movement, timing errors or frequency errors.

* * * * *